(12) United States Patent
Shibao

(10) Patent No.: US 12,049,386 B2
(45) Date of Patent: Jul. 30, 2024

(54) COUPLING DEVICE AND COUPLING METHOD FOR COUPLING SUBJECT MEMBER

(71) Applicant: RIKEN KOGYO Inc., Otaru (JP)

(72) Inventor: Yukihiro Shibao, Otaru (JP)

(73) Assignee: RIKEN KOGYO Inc., Otaru (JP)

( * ) Notice: Subject to any disclaimer, the term of this patent is extended or adjusted under 35 U.S.C. 154(b) by 0 days.

(21) Appl. No.: 17/928,814

(22) PCT Filed: Mar. 9, 2022

(86) PCT No.: PCT/JP2022/010294
§ 371 (c)(1),
(2) Date: Nov. 30, 2022

(87) PCT Pub. No.: WO2022/209664
PCT Pub. Date: Oct. 6, 2022

(65) Prior Publication Data
US 2024/0010471 A1    Jan. 11, 2024

(30) Foreign Application Priority Data

Mar. 29, 2021 (WO) .................. PCT/JP2021/013215

(51) Int. Cl.
*B66C 1/28* (2006.01)
*B64D 1/22* (2006.01)
(Continued)

(52) U.S. Cl.
CPC .................. *B66C 1/28* (2013.01); *B64D 1/22* (2013.01); *E01C 11/227* (2013.01); *E03F 5/06* (2013.01);
(Continued)

(58) Field of Classification Search
CPC .... B66C 1/28; B66C 1/30; B64D 1/22; E01C 11/227; E03F 5/06; E03F 2005/063; B64U 2101/60
(Continued)

(56) References Cited

U.S. PATENT DOCUMENTS 3,337,256 A * 8/1967 Shropshire, Jr. ........ B66C 1/127
24/372
3,582,128 A * 6/1971 Martelee ................... B66C 1/30
294/115
(Continued)

FOREIGN PATENT DOCUMENTS

| JP | 2004-257244 A | 9/2004 |
|---|---|---|
| JP | 2019-019551 A | 2/2019 |
| JP | 2020-159175 A | 10/2020 |

OTHER PUBLICATIONS

International Search Report and Written Opinion dated May 31, 2022 issued in PCT International Application No. PCT/JP2022/010294 (with English language translation of International Search Report attached).

*Primary Examiner* — Nkeisha Smith
(74) *Attorney, Agent, or Firm* — Amster, Rothstein & Ebenstein LLP

(57) ABSTRACT

This invention concerns a coupling device including a detachable member 20 that can be attached to and detached from a grille, a first coupling member 21 and a second coupling member 22 provided on the detachable member 20, and a connecting member 23 provided on the detachable member 20 so as to connect the first coupling member 21 and the second coupling member 22, wherein the first coupling member 21 and the second coupling member 22 respectively include elongated holes, arc-shaped portions 51a, 51b provided on respective outer peripheral lower portions of the first coupling member 21 and the second
(Continued)

coupling member 22, and semicircular arc portions that can be coupled to the grille, and the connecting member 23 includes a fixing shaft 24 that extends in a horizontal direction and is inserted into the respective elongated holes in the first coupling member 21 and the second coupling member 22.

17 Claims, 74 Drawing Sheets

(51) Int. Cl.
     *E01C 11/22*           (2006.01)
     *E03F 5/06*            (2006.01)
     *B64U 10/13*          (2023.01)
     *B64U 101/60*        (2023.01)

(52) U.S. Cl.
     CPC .......... *B64U 10/13* (2023.01); *B64U 2101/60* (2023.01); *E03F 2005/063* (2013.01)

(58) Field of Classification Search
     USPC ...................................... 248/205.1
     See application file for complete search history.

(56) References Cited

U.S. PATENT DOCUMENTS

| | | | | |
|---|---|---|---|---|
| 8,434,801 B2* | 5/2013 | LeBlanc | ............ | B66C 1/28 |
| | | | | 294/82.13 |
| 8,480,145 B2* | 7/2013 | Eastall | ............ | B66C 1/30 |
| | | | | 294/67.31 |
| 8,899,645 B2* | 12/2014 | LeBlanc | ............ | B66C 1/28 |
| | | | | 294/82.13 |

\* cited by examiner

COUPLING DEVICE AND COUPLING METHOD FOR COUPLING SUBJECT MEMBER

CROSS-REFERENCE TO RELATED APPLICATIONS

This application is a U.S. national stage entry under 35 U.S.C. § 371 of PCT International Patent Application No. PCT/JP2022/010294, filed Mar. 9, 2022, which claims priority to PCT International Patent Application No. PCT/JP2021/013215, filed Mar. 29, 2021, the contents of each of which are hereby incorporated by reference in their entirety.

TECHNICAL FIELD

This invention relates to a coupling device and a coupling method for coupling a coupling subject member using the coupling device.

BACKGROUND ART

Typically, on an expressway, a shallow drainage gutter is provided on the road shoulder part of the road for draining water such as rainwater. The drainage gutter is structured such that a rectangular drain and a grating covering the drain are provided on the drainage gutter at fixed distance intervals so as to drain water into a drainage pipe buried under the road shoulder part while preventing foreign matter from falling into the opening or the like. A device described in PTL 1, for example, is known as a coupling device for coupling and fixing the grating to the drainage gutter. In this coupling device, a reception frame connecting portion having nut members is disposed on a horizontal reception frame of a supporting reception frame provided on a drainage gutter, and the grating is placed on the supporting reception frame. The grating is then fixed to the drainage gutter by screwing fixing bolts inserted into respective lid-connecting plate portions provided on the grating to the nut members of the reception frame connecting portion.

CITATION LIST

Patent Literature

[PTL 1] Japanese Patent Application Publication No. 2018-17014

SUMMARY OF INVENTION

Technical Problem

Incidentally, in order to control the flow of water into the grating from the drainage gutter, a height difference filling member for filling in a height difference with a road surface in which the drainage gutter is formed may be mounted on the grating. This height difference filling member must be coupled to the grating by an appropriate coupling device in order to prevent the height difference filling member from moving along the road due to the effects of wind or water flow, contact with a vehicle, and so on. It may therefore be considered to use the coupling device described in PTL 1 to couple the height difference filling member to the grating.

However, when the coupling device described in PTL 1 is used to couple the height difference filling member to the grating, each time the height difference filling member is mounted on the grating, the reception frame connecting portion must be disposed on the grating and the fixing bolts inserted into the coupling member must be screwed to the nut members of the reception frame connecting portion, and therefore a problem exists in that a large number of operation processes are required to mount the height difference filling member on the grating.

This invention has been designed to solve the problem described above, and an object thereof is to provide a coupling device with which a grating and a height difference filling member can be coupled easily in a reduced number of steps.

Solution to Problem

A coupling device according to this invention includes: a detachable member that can be attached to and detached from a first coupling subject member; a first coupling member provided on the detachable member; a second coupling member provided on the detachable member; a connecting member provided on the detachable member so as to connect the first coupling member and the second coupling member; and a third coupling member connected to the detachable member and coupled to a second coupling subject member, wherein the first coupling member and the second coupling member each include: an elongated hole; a contact portion provided on an outer peripheral lower portion of the first coupling member and the second coupling member such that one end portion is positioned on the upper side of another end portion; and a hook-shaped portion provided on the one end portion of the contact portion so as to be connectable to the first coupling subject member, the connecting member includes at least one fixing shaft that extends in a horizontal direction and is inserted into the respective elongated holes in the first coupling member and the second coupling member, the first coupling member and the second coupling member are supported so as to be capable of rotating about the fixing shaft and moving relative to the fixing shaft, and when the detachable member moves toward the lower side while the first coupling member and the second coupling member are not coupled to the first coupling subject member, the respective contact portions of the first coupling member and the second coupling member are pressed by the first coupling subject member, whereby the first coupling member and the second coupling member rotate about the fixing shaft such that the one end portion of each of the contact portions moves toward the upper side, and move relative to the fixing shaft in a direction for reducing a distance from the contact portion of the first coupling member to the contact portion of the second coupling member, when the detachable member then moves further toward the lower side such that the first coupling subject member separates from the respective contact portions of the first coupling member and the second coupling member, the first coupling member and the second coupling member move relative to the fixing shaft in a direction for increasing the distance from the contact portion of the first coupling member to the contact portion of the second coupling member, and when the detachable member then moves toward the upper side, the respective hook-shaped portions of the first coupling member and the second coupling member are connected to the first coupling subject member such that the detachable member is coupled to the first coupling subject member.

Further, the first coupling member and the second coupling member may each include a release arm that is provided on the upper side of the hook-shaped portion and extends in a direction that intersects a direction extending along the contact portion, and when the detachable member moves toward the lower side while the respective hook-shaped portions of the first coupling member and the second coupling member are connected to the first coupling subject member, the respective release arms of the first coupling member and the second coupling member may be pressed toward the upper side from the lower side by the first coupling subject member, whereby the first coupling member and the second coupling member rotate about the fixing shaft such that the release arms move toward the upper side, when the detachable member then moves further toward the lower side such that the first coupling subject member separates from the respective release arms of the first coupling member and the second coupling member, the first coupling member and the second coupling member may rotate about the fixing shaft such that the release arms move toward the lower side, and when the detachable member then moves toward the vertical direction upper side, the respective release arms of the first coupling member and the second coupling member may be pressed toward the lower side by the respective coupling subject portions, whereby the first coupling member and the second coupling member rotate about the fixing shaft such that the release arms move toward the lower side, with the result that the coupling between the detachable member and the first coupling subject member may be released.

Furthermore, the first coupling member may include a first arc-shaped gear and the second coupling member may include a second arc-shaped gear, and the first arc-shaped gear and the second arc-shaped gear may be capable of meshing with each other when the first coupling member and the second coupling member rotate about the fixing shaft or move relative to the fixing shaft.

Further, the respective contact portions of the first coupling member and the second coupling member may be arc-shaped portions.

Furthermore, the respective contact portions of the first coupling member and the second coupling member may be rectilinear portions.

The coupling device may further include a joint member that has biaxial degrees of freedom and connects the connecting member to the third coupling member, the first coupling subject member may be a grating, and the second coupling subject member may be a height difference filling member for filling in a height difference between the grating and a road surface on which the grating is provided.

Further, the second coupling subject member may be a boom of a crane device.

Furthermore, the second coupling subject member may be a prize acquiring device.

Further, the second coupling subject member may be a drone, and at least two detachable members may be provided for each drone.

Further, the connecting member may include a guide bar member, and the first coupling subject member may include a guide member for guiding the guide bar member.

Further, spacers may be provided respectively between the connecting member and the first coupling member and between the connecting member and the second coupling member.

Furthermore, the third coupling member may be a telescopic mechanism.

The coupling device may further include a rope engagement member that connects the at least two detachable members, the third coupling member may be a rope that is formed by twisting together a plurality of strands and that extends in a vertical direction, the first coupling subject member may include an annular member configured such that a suspension subject is connected to a lower portion thereof and the detachable members can be attached to and detached from an upper portion thereof, and the rope engagement member may be engaged with the strands forming the outer shape of the rope.

Further, a rope fixing member may be provided on a lower end portion of the rope, and a subject fixing member that can be coupled to the rope fixing member may be provided on a lower portion of the suspension subject.

The coupling device may include a capsule member that is attached to the upper side of the rope engagement member so as to be openable and closeable, and is formed to be capable of housing the rope engagement member and the detachable members when closed.

The coupling device may further include a tubular member that extends in the vertical direction and houses the first coupling subject member, the rope engagement member may include a guide rail, and a screw portion formed to be screwable to the guide rail may be formed in a side wall of the tubular member on at least one of an inner side and an outer side of the side wall.

Furthermore, a coupling method for coupling a coupling subject member according to this invention is implemented using a coupling device including: a detachable member that can be attached to and detached from a first coupling subject member; a first coupling member provided on the detachable member; a second coupling member provided on the detachable member; a connecting member provided on the detachable member so as to connect the first coupling member and the second coupling member; and a third coupling member connected to the detachable member and coupled to a second coupling subject member, wherein the first coupling member and the second coupling member each include: an elongated hole; a contact portion provided on an outer peripheral lower portion of the first coupling member and the second coupling member such that one end portion is positioned on the upper side of another end portion; and a hook-shaped portion provided on the one end portion of the contact portion so as to be connectable to the first coupling subject member, the connecting member includes a fixing shaft that extends in a horizontal direction and is inserted into the respective elongated holes in the first coupling member and the second coupling member, and the first coupling member and the second coupling member are supported so as to be capable of rotating about the fixing shaft and moving relative to the fixing shaft, the coupling method including: a step in which, when the detachable member moves toward the lower side while the first coupling member and the second coupling member are not coupled to the first coupling subject member, the respective contact portions of the first coupling member and the second coupling member are pressed by the first coupling subject member, whereby the first coupling member and the second coupling member rotate about the fixing shaft such that the one end portion of each of the contact portions moves toward the upper side, and move relative to the fixing shaft in a direction for reducing a distance from the contact portion of the first coupling member to the contact portion of the second coupling member; a step in which, when the detachable member then moves further toward the lower side such that the first coupling subject member separates from the respective contact portions of the first coupling member and the second coupling member, the first coupling member and the second coupling member move relative to the fixing shaft in a direction for increasing the distance from the contact portion of the first coupling member to the contact portion of the second coupling member; and a step in which, when the detachable member then moves toward the upper side, the respective hook-shaped portions of the first coupling member and the second coupling member are connected to the first coupling subject member such that the detachable member is coupled to the first coupling subject member.

Advantageous Effects of Invention

According to this invention, a grating and a height difference filling member can be coupled easily in a reduced number of steps using a coupling device including a detachable member that can be attached and detached to and from a coupling subject member, a first coupling member and a second coupling member provided on the detachable member, and a connecting member for connecting the first coupling member to the second coupling member.

DESCRIPTION OF EMBODIMENTS

First Embodiment

A first embodiment of this invention will be described in detail below with reference to the figures.

Figure 1:
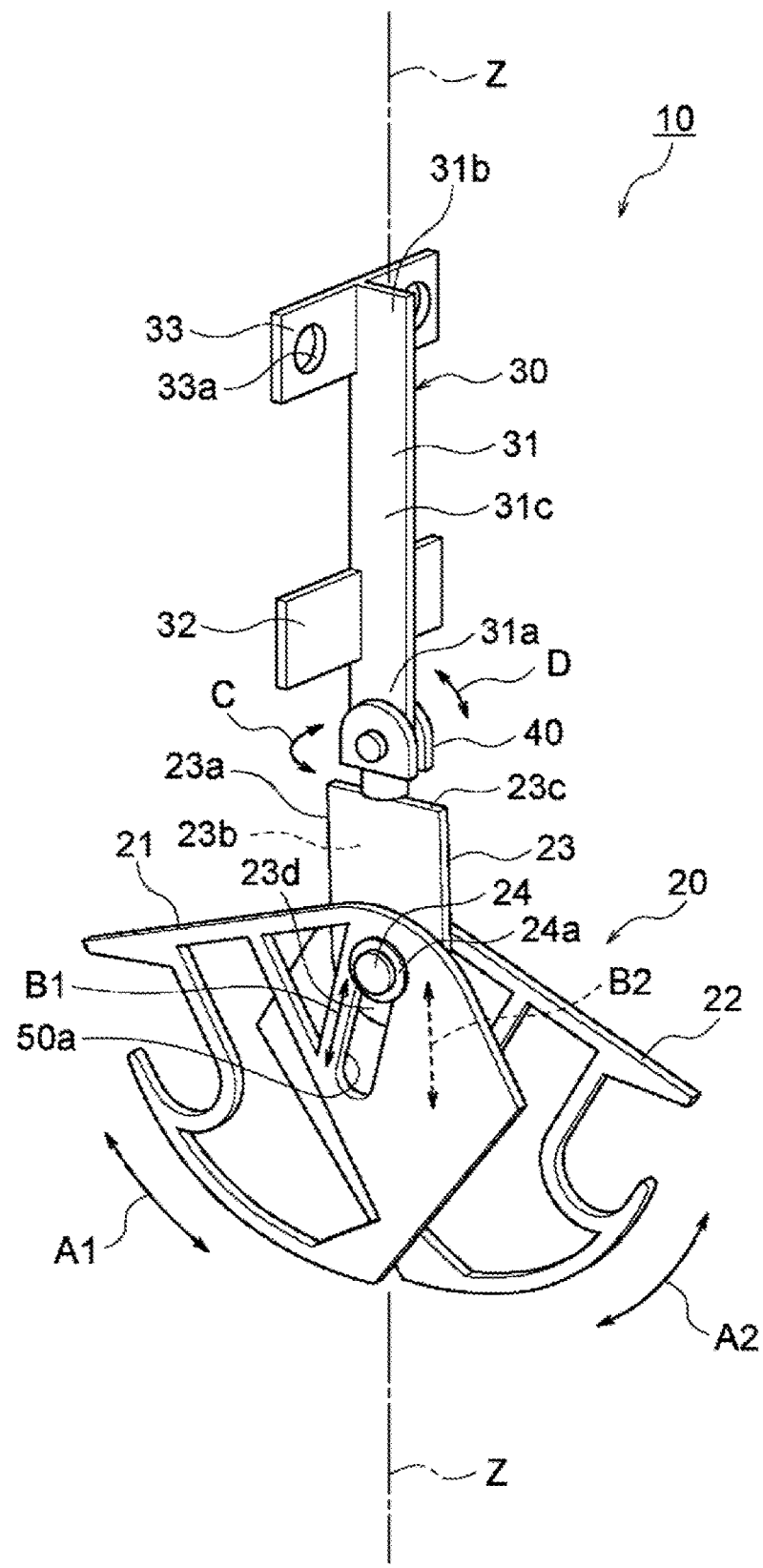
FIG. 1 is a schematic view of a coupling device according to a first embodiment.

FIG. 1 is a schematic view of a coupling device according to the first embodiment. As will be described in detail below, a coupling device 10 is used to couple a grating provided on a drainage gutter of a road or the like to a height difference filling member disposed on the grating. The coupling device 10 includes a detachable member 20 that is attached to and detached from the grating, a height difference filling member coupling member 30 provided on an upper side of the detachable member 20 and coupled to the height difference filling member, and a joint member 40 that connects the detachable member 20 to the height difference filling member coupling member 30. Further, the height difference filling member coupling member 30 constitutes a third coupling member.

The detachable member 20 includes a first coupling member 21, a second coupling member 22, and a connecting member 23. The first coupling member 21, second coupling member 22, and connecting member 23 are formed from a metallic material such as stainless steel, for example. A fixing shaft 24 formed from a metallic material such as stainless steel, for example, is provided on a lower end portion 23*d* side of the connecting member 23. An elongated hole 50*a* is formed in the first coupling member 21 so as to connect the front and rear surfaces thereof, and the fixing shaft 24, which is provided on the connecting member 23 so as to project from a front surface 23*a* of the connecting member 23, is inserted into the elongated hole 50*a*. As a result, the first coupling member 21 is connected to the front surface 23*a* of the connecting member 23. Furthermore, the fixing shaft 24 extends in a horizontal direction.

The second coupling member 22 is formed in the same shape as the first coupling member 21. Although not shown in FIG. 1, similarly to the first coupling member 21, an elongated hole is formed in the second coupling member 22 so as to connect the front and rear surfaces thereof. The fixing shaft 24, which is provided on the connecting member 23 so as to project from a rear surface 23*b* of the connecting member 23, is inserted into the elongated hole in the second coupling member 22. As a result, the second coupling member 22 is connected to the rear surface 23*b* of the connecting member 23. In other words, the first coupling member 21 and the second coupling member 22 are connected by the connecting member 23 such that the connecting member 23 is sandwiched therebetween. Furthermore, the second coupling member 22 is connected by the connecting member 23 so that when seen from the extension direction of the fixing shaft 24, or in other words an axial direction, the second coupling member 22 is left-right symmetrical to the first coupling member 21.

To prevent the first coupling member 21 and the second coupling member 22 from falling off, flanges 24a having a larger diameter than the width of the elongated hole 50a in the first coupling member 21 and width of the elongated hole in the second coupling member 22 are formed on the fixing shaft 24.

A width direction dimension of the elongated hole 50a is formed at a substantially identical dimension to the diameter of the fixing shaft 24 and formed so that the fixing shaft 24 can slide through the elongated hole 50a. Similarly to the elongated hole 50a, the width direction dimension of the second coupling member 22 is formed at a substantially identical dimension to the diameter of the fixing shaft 24 and formed so that the fixing shaft 24 can slide through the elongated hole. Thus, the first coupling member 21 is provided to be free to rotate about the fixing shaft 24 in the direction of an arrow A1, and provided to be free to move relative to the fixing shaft 24 along a longitudinal direction of the elongated hole 50a in the direction of an arrow B1. Further, the second coupling member 22 is provided to be free to rotate about the fixing shaft 24 in the direction of an arrow A2, and provided to be free to move relative to the fixing shaft 24 along a longitudinal direction of the elongated hole 50b in the direction of an arrow B2.

The joint member 40 is provided on an upper end portion 23c of the connecting member 23. The joint member 40 is a biaxial joint that connects the connecting member 23 to the height difference filling member coupling member 30. By means of the joint member 40, the height difference filling member coupling member 30 is capable of rotating relative to the connecting member 23 in the direction of an arrow C, which is a rotation direction centering on an axis Z on which the center of the joint member 40 extends along the vertical direction, and also capable of rotating relative to the connecting member 23 in the direction of an arrow D, which is a rotation direction centering on a perpendicular direction to the axis Z.

A plate-shaped member 31 having a rectangular planar portion 31c is provided on the height difference filling member coupling member 30. One end portion 31a of the planar portion 31c is connected to the joint member 40. A first retaining portion 32 constituted by a rectangular flat plate that projects in a perpendicular direction to the planar portion 31c is provided on a side of the plate-shaped member 31 near the one end portion 31a. A second retaining portion 33 constituted by a rectangular flat plate that projects in a perpendicular direction to the planar portion 31c is provided on another end portion 31b of the plate-shaped member 31. Bolt holes 33a for screwing in bolts are formed in the second retaining portion 33.

Figure 2:
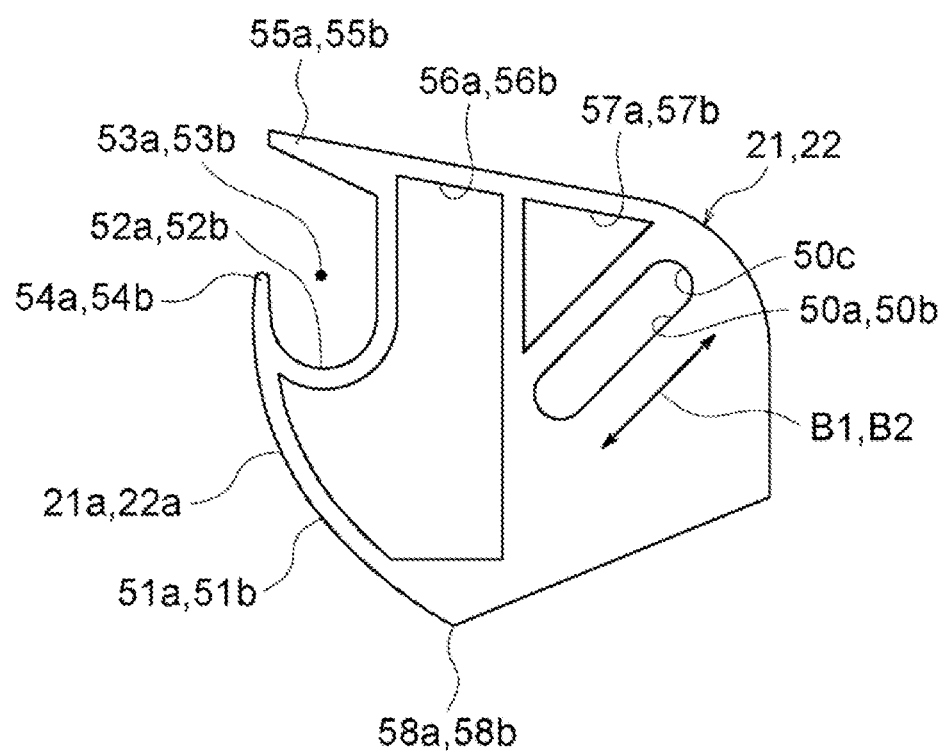
FIG. 2 is a front view of a first coupling member and a second coupling member shown in FIG. 1.

FIG. 2 is a front view of the first coupling member 21 and the second coupling member 22. An arc-shaped portion 51a extending in a direction that intersects the longitudinal direction of the elongated hole 50a is provided on an outer peripheral portion 21a of the first coupling member 21. A semicircular arc portion 52a is provided on an end portion on the upper side, among the end portions of the arc-shaped portion 51a. An opening portion 53a of the semicircular arc portion 52a is formed to open toward a direction extending along the arc-shaped portion 51a. A tongue portion 54a is formed on an end portion of the semicircular arc portion 52a on the outer peripheral portion 21a side so as to project as a continuation of the upper-side end portion of the arc-shaped portion 51a. Further, a release arm 55a is provided on the upper side of the semicircular arc portion 52a of the first coupling member 21 so as to extend in a direction that intersects a direction extending along the arc-shaped portion 51a. A bend portion 58a is formed on the other end portion of the arc-shaped portion 51a, on which the tongue portion 54a is not provided. A first lightening hole 56a and a second lightening hole 57a are formed respectively in the side of the first coupling member 21 near the arc-shaped portion 51a and the semicircular arc portion 52a and the side of the first coupling member 21 far from the arc-shaped portion 51a and the semicircular arc portion 52a. Note that the arc-shaped portion 51a constitutes a contact portion, and the semicircular arc portion 52a constitutes a hook-shaped portion.

The second coupling member 22 has a similar configuration to the first coupling member 21. More specifically, an arc-shaped portion 51b extending in a direction that intersects the longitudinal direction of the elongated hole 50b is provided on an outer peripheral portion 22a of the second coupling member 22. A semicircular arc portion 52b is provided on an end portion on the upper side, among the end portions of the arc-shaped portion 51b. An opening portion 53b of the semicircular arc portion 52b is formed to open toward a direction extending along the arc-shaped portion 51b. A tongue portion 54b is formed on an end portion of the semicircular arc portion 52b on the outer peripheral portion 22a side so as to project as a continuation of the upper-side end portion of the arc-shaped portion 51b. Further, a release arm 55b is provided on the upper side of the semicircular arc portion 52b of the second coupling member 22 so as to extend in a direction that intersects a direction extending along the arc-shaped portion 51b. A bend portion 58b is formed on the other end portion of the arc-shaped portion 51b, on which the tongue portion 54b is not provided. A first lightening hole 56b and a second lightening hole 57b are formed respectively in the side of the second coupling member 22 near the arc-shaped portion 51b and the semicircular arc portion 52b and the side of the second coupling member 22 far from the arc-shaped portion 51b and the semicircular arc portion 52b. Note that the arc-shaped portion 51b constitutes the contact portion, and the semicircular arc portion 52b constitutes the hook-shaped portion.

Figure 3:
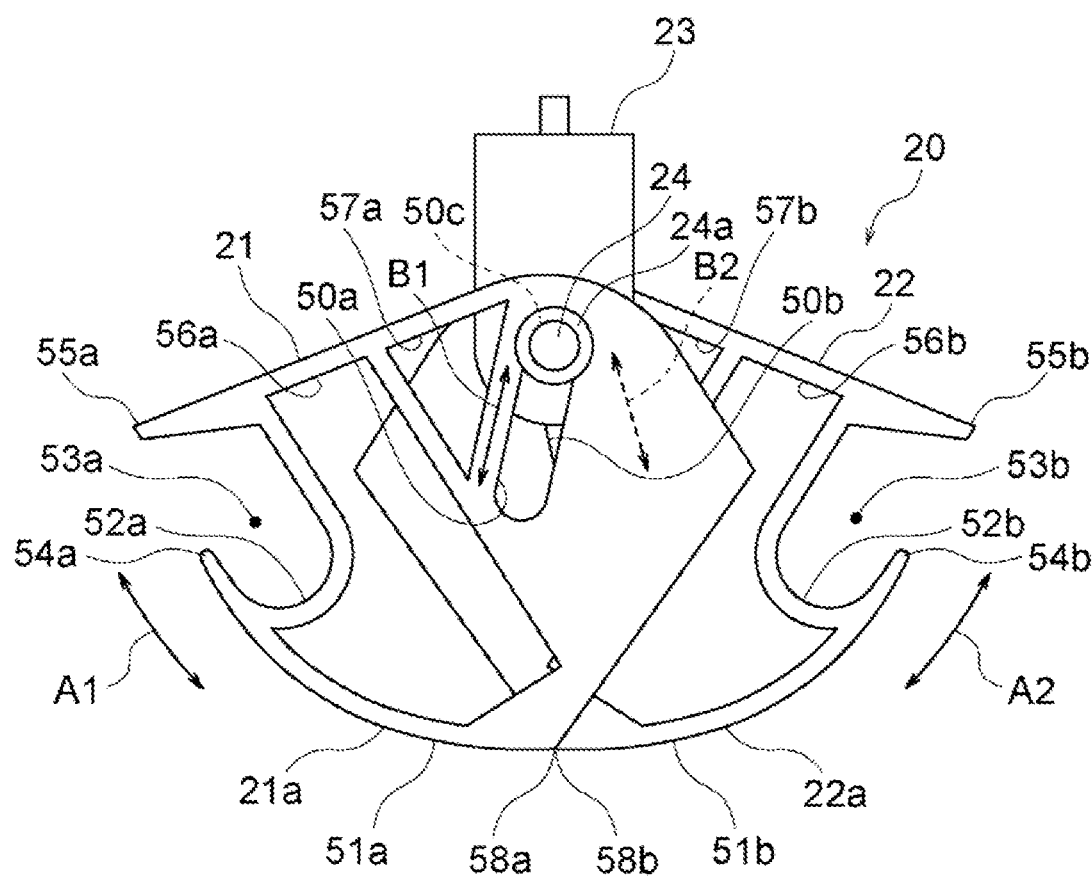
FIG. 3 is a front view showing an initial state of a detachable member shown in FIG. 1.

FIG. 3 is a front view showing an initial state of the detachable member 20. Note that in the following description, the initial state is a state in which, as shown in FIG. 1, the detachable member 20 is disposed along the axis Z extending in the vertical direction such that the fixing shaft 24 of the detachable member 20 is positioned on the lower side in the vertical direction, and no force is exerted on the first coupling member 21 and the second coupling member 22 from the outside. In the initial state, the first coupling member 21 and the second coupling member 22 are positioned such that the fixing shaft 24 contacts one end portion 50c of each of the elongated holes 50a, 50b. Further, the bend portion 58a of the first coupling member 21 and the bend portion 58b of the second coupling member 22 are positioned on the vertical direction lower side of the fixing shaft 24 and positioned in the lowermost position of the detachable member 20 as a whole. In other words, respective center of gravity positions of the first coupling member 21 and the second coupling member 22 in the detachable member 20 are formed such that in the initial state, the fixing shaft 24 contacts the one end portion 50c of the elongated holes 50a, 50b, and the bend portions 58a, 58b are positioned on the vertical direction lower side of the fixing shaft 24 and positioned in the lowermost position of the detachable member 20 as a whole. Furthermore, the tongue portions 54a, 54b connected to one end portion of the arc-shaped portions 51a, 51b of the first and second coupling members 21, 22 are positioned on the upper side of the bend portions 58a, 58b. Note that the tongue portions 54a, 54b constitute one end portion of the arc-shaped portions 51a, 51b, and the bend portions 58a, 58b constitute another end portion of the arc-shaped portions 51a, 51b.

Figure 4:
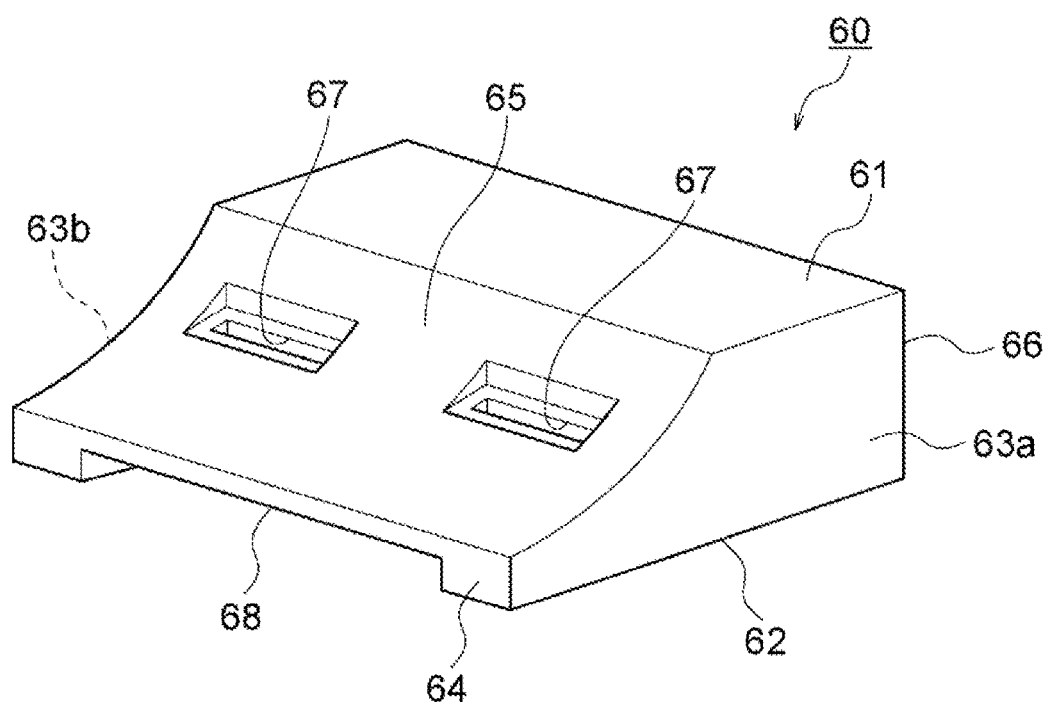
FIG. 4 is a schematic view of a first height difference filling member according to the first embodiment.

FIG. 4 is a schematic view of a first height difference filling member used in the first embodiment. A first height difference filling member 60 includes an upper surface portion 61, which is a planar surface, a bottom portion 62, and side face portions 63a, 63b constituted by a pair of planar surfaces formed between the upper surface portion 61 and the bottom portion 62 so as to extend in a vertical direction. The first height difference filling member 60 also includes, between one side face portion 63a and the other side face portion 63b, a front surface planar portion 64 constituted by a narrow, elongated planar surface that extends in the vertical direction adjacent to the bottom portion 62, and a front surface inclined portion 65 constituted by an arc-shaped curved surface that extends at an incline from the front surface planar portion 64 to the upper surface portion 61. The first height difference filling member 60 further includes a back surface portion 66 that is parallel to the front surface planar portion 64. In other words, the first height difference filling member 60 is formed such that the length of the upper surface portion 61 in a parallel direction to the side face portion 63a and the side face portion 63b is shorter than the length of the bottom portion 62 in a parallel direction to the side face portion 63a and the side face portion 63b. Note that the first height difference filling member constitutes a second coupling subject member.

Two rectangular attachment holes 67 are formed in the front surface inclined portion 65 so as to open upward in the vertical direction. A rectangular cutout portion 68 through which rainwater flows is formed in the front surface planar portion 64.

Figure 5:
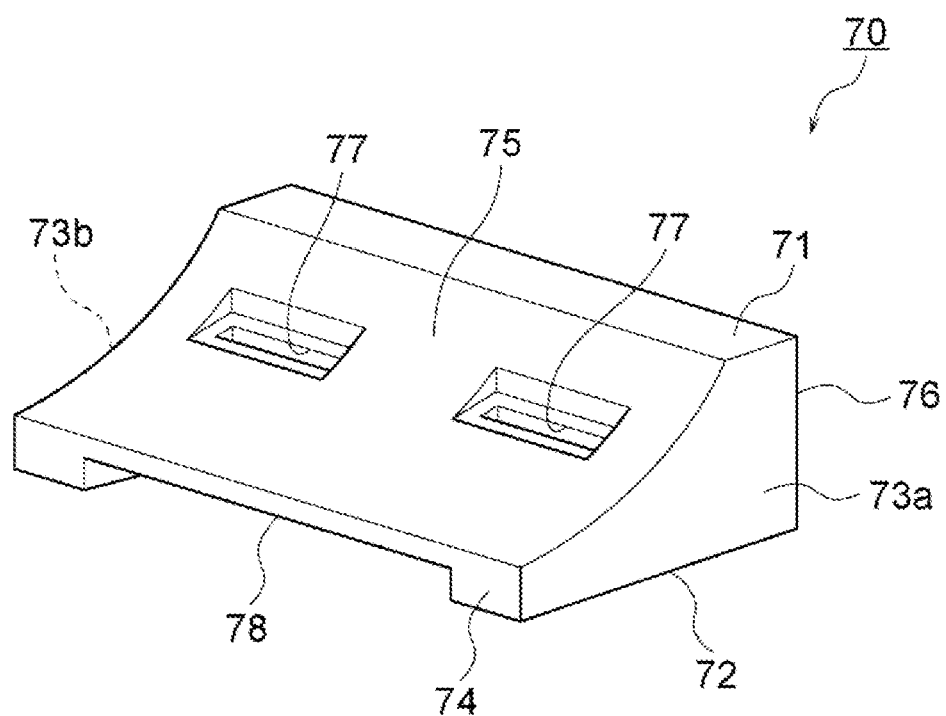
FIG. 5 is a schematic view of a second height difference filling member according to the first embodiment.

FIG. 5 is a schematic view of a second height difference filling member used in the first embodiment. A second height difference filling member 70 includes an upper surface portion 71, which is a planar surface, a bottom portion 72, and side face portions 73a, 73b constituted by a pair of planar surfaces formed between the upper surface portion 71 and the bottom portion 72 so as to extend in a vertical direction. The second height difference filling member 70 also includes, between one side face portion 73a and the other side face portion 73b, a front surface planar portion 74 constituted by a narrow, elongated planar surface that extends in the vertical direction adjacent to the bottom portion 72, and a front surface inclined portion 75 constituted by an arc-shaped curved surface that extends at an incline from the front surface planar portion 74 to the upper surface portion 71. The second height difference filling member 70 further includes a back surface portion 76 that is parallel to the front surface planar portion 74. In other words, the second height difference filling member 60 is formed such that the length of the upper surface portion 71 in a parallel direction to the side face portion 73a and the side face portion 73b is shorter than the length of the bottom portion 72 in a parallel direction to the side face portion 73a and the side face portion 73b. The upper surface portion 71 of the second height difference filling member 70 is formed to have a narrower width than the upper surface portion 61 of the first height difference filling member 60. Note that the second height difference filling member 70 constitutes the second coupling subject member.

Two rectangular attachment holes 77 are formed in the front surface inclined portion 75 so as to open upward in the vertical direction. A rectangular cutout portion 78 through which rainwater flows is formed in the front surface planar portion 74. Note that the front surface inclined portion 65 and attachment holes 67 of the first height difference filling member 60 are formed in identical shapes to the front surface inclined portion 75 and attachment holes 77 of the second height difference filling member 70. Further, the cutout portion 68 of the first height difference filling member 60 and the cutout portion 78 of the second height difference filling member 70 are formed to have identical heights in the vertical direction. In other words, the main difference between the first height difference filling member 60 and the second height difference filling member 70 is that the upper surface portion 71 of the second height difference filling member 70 is formed to have a narrower width than the upper surface portion 61 of the first height difference filling member 60.

The planar surfaces of the first height difference filling member 60 and the second height difference filling member are formed from polyurea resin, and the interior is formed from any known foamed material.

Figure 6:
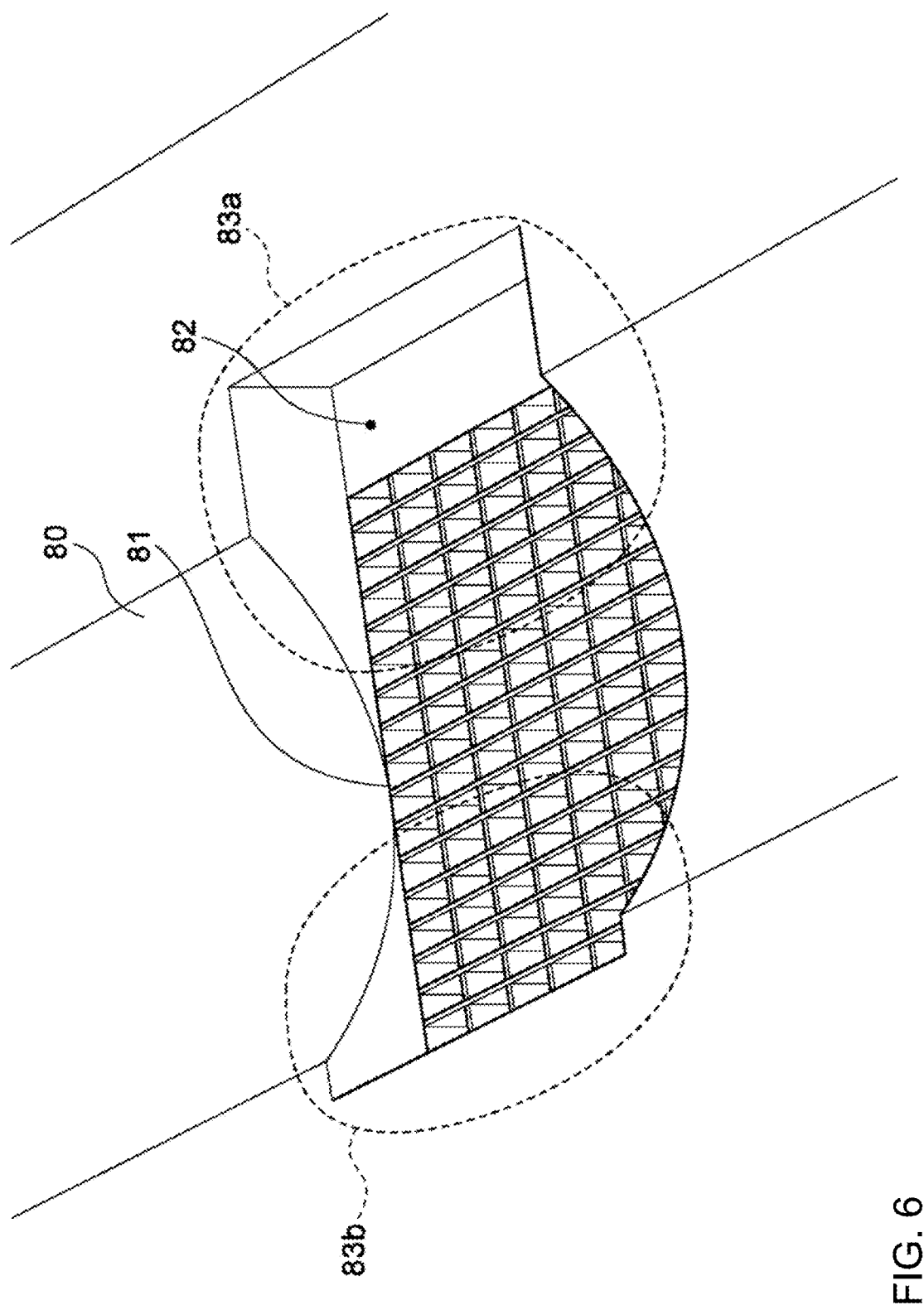
FIG. 6 is a schematic view of a drainage gutter and a grating according to the first embodiment.

Next, a grating according to the first embodiment will be described. FIG. 6 is a schematic view of a road drainage gutter and a grating according to the first embodiment. A drainage gutter having a shallow U-shaped cross-section is formed on a road surface on the shoulder part of a road in order to drain rainwater and the like on the road. A flat grating 81 is provided on a rectangular installation portion 82 of the drainage gutter 80. The grating 81 forms a lid covering an inlet to a drainpipe, not shown in the figures, provided on the lower side of the drainage gutter 80. A space 83a and a space 83b exist between an upper portion of the grating 81 and the drainage gutter 80 and the road surface on the periphery thereof, and as a result, height differences are formed relative to the road surface and drainage gutter. When drain water flows along the drainage gutter 80, resistance to the flow of water is generated by the space 83a and the space 83b, leading to a reduction in the flow velocity of the water flow, and as a result, dirt and refuse contained in the drain water are more likely to accumulate in the space 83a and the space 83b. Note that the space 83a and the space 83b constitute height differences.

Figure 7:
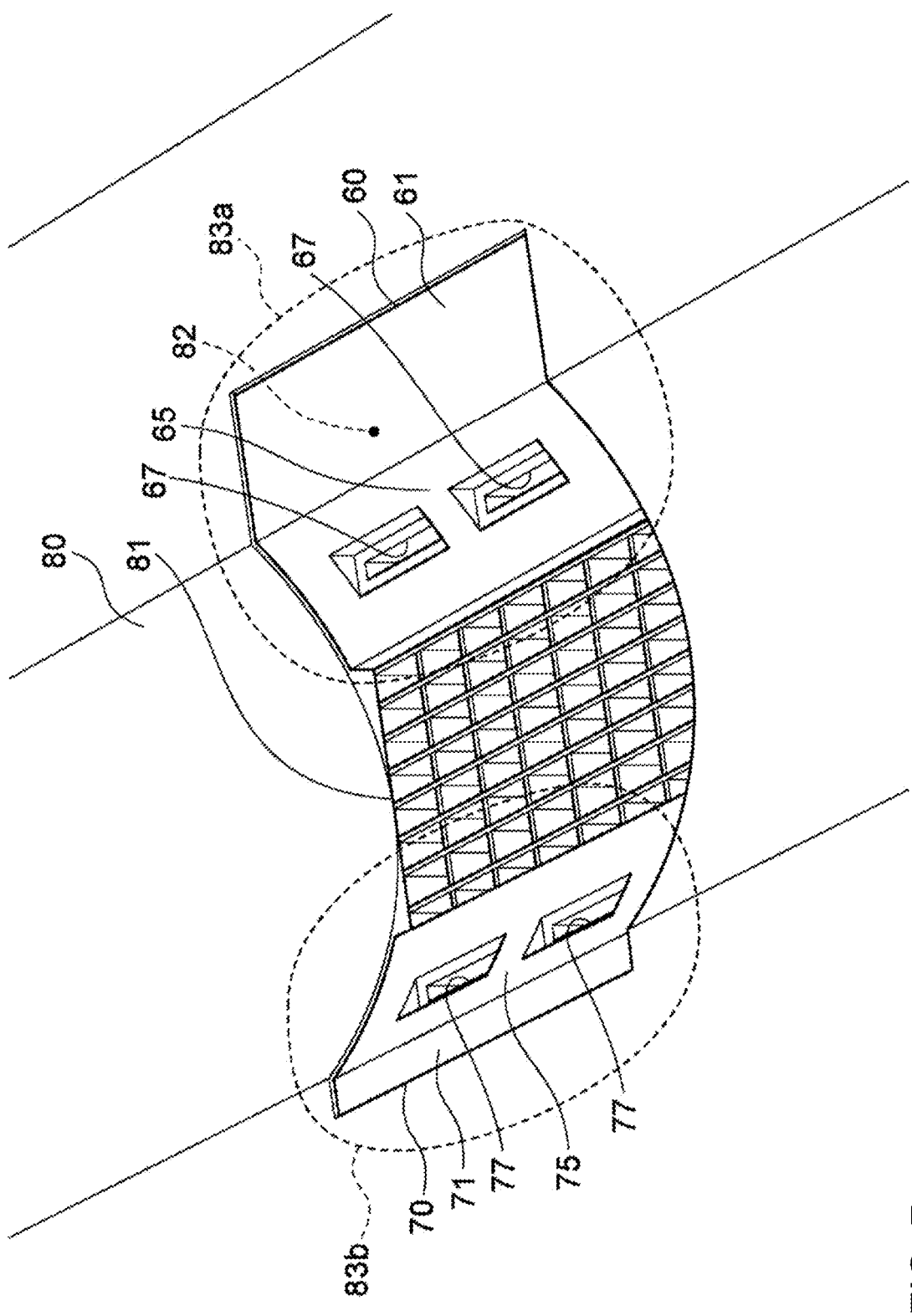
FIG. 7 is a schematic view showing an attachment state in which the first height difference filling member and the second height difference filling member are attached to the grating, according to the first embodiment.

Next, methods for coupling the first height difference filling member 60 to the grating 81 and coupling the second height difference filling member 70 to the grating 81 using the coupling device 10 according to the first embodiment will be described. FIG. 7 is a schematic view showing an attachment state in which the first height difference filling member 60 and the second height difference filling member 70 are attached to the grating 81. The first height difference filling member 60 is attached to the space 83a above the grating 81, and the second height difference filling member 70 is attached to the space 83b above the grating 81. Thus, it is possible to prevent resistance from being generated against the flow of water in the space 83a and the space 83b, and as a result, it is possible to prevent the flow velocity of the water flow from decreasing such that dirt and refuse in the drain water accumulate. The first height difference filling member 60 and the second height difference filling member 70 are coupled and fixed to the grating 81 to prevent the height difference filling members 60, 70 from moving due to the effects of wind or the flow of drain water, contact with a vehicle, and so on.

As noted above, the front surface inclined portion 65 and attachment holes 67 of the first height difference filling member 60 are formed in identical shapes to the front surface inclined portion 75 and attachment holes 77 of the second height difference filling member 70, and the cutout portion 68 of the first height difference filling member 60 and the cutout portion 78 of the second height difference filling member 70 are formed to have identical heights in the vertical direction. Also, the main difference between the first height difference filling member 60 and the second height difference filling member 70 is that the upper surface portion 71 of the second height difference filling member 70 is formed to have a narrower width than the upper surface portion 61 of the first height difference filling member 60. Hence, in the first embodiment, the method for coupling the first height difference filling member 60 to the grating 81 using the coupling device 10 and the method for coupling the second height difference filling member 70 to the grating 81 using the coupling device 10 are identical, and therefore, in the following description, the methods will be described together with reference to FIGS. 8 to 22.

Figure 8:
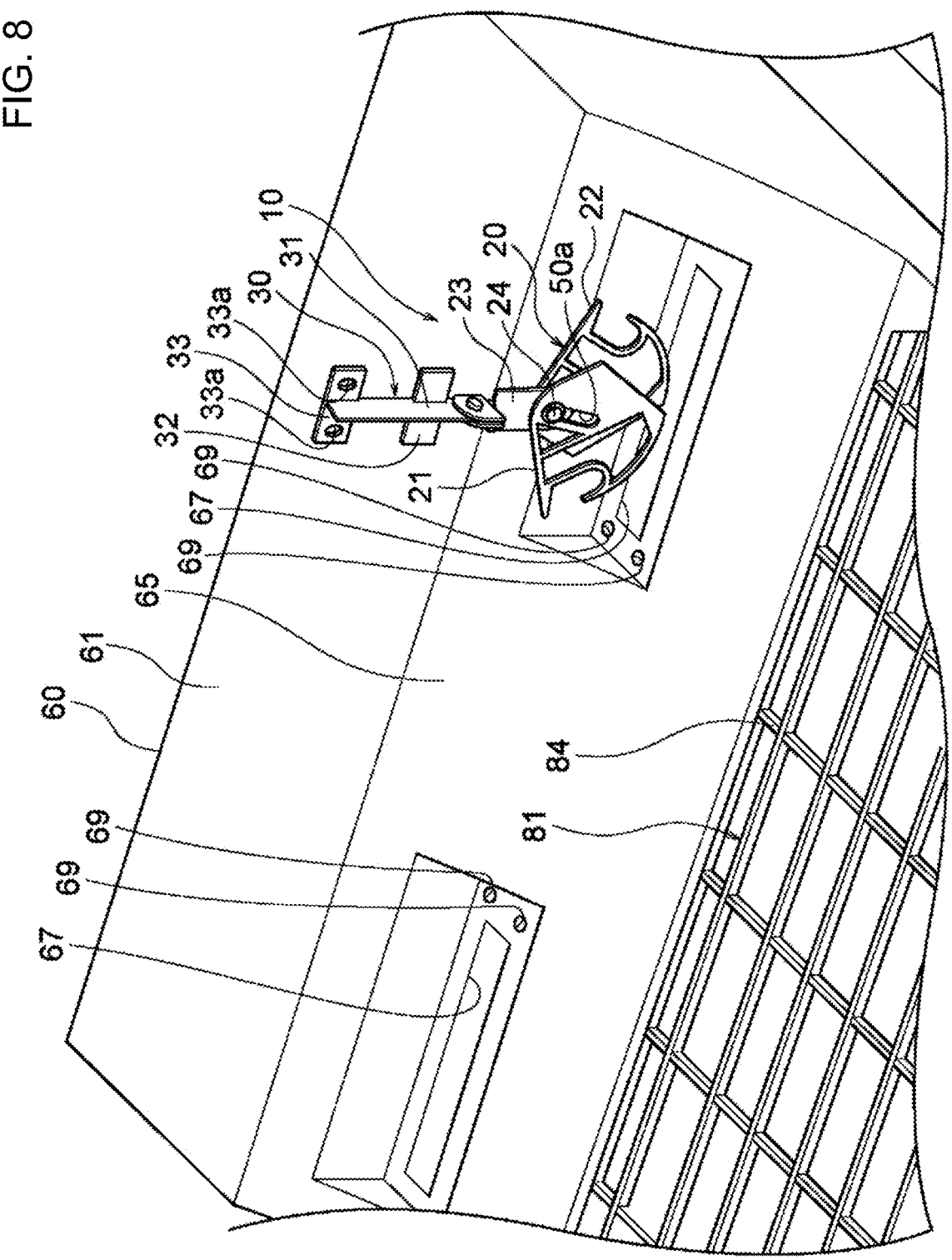
FIG. 8 is a schematic view showing a coupling device attached to the first height difference filling member according to the first embodiment.
Figure 9:
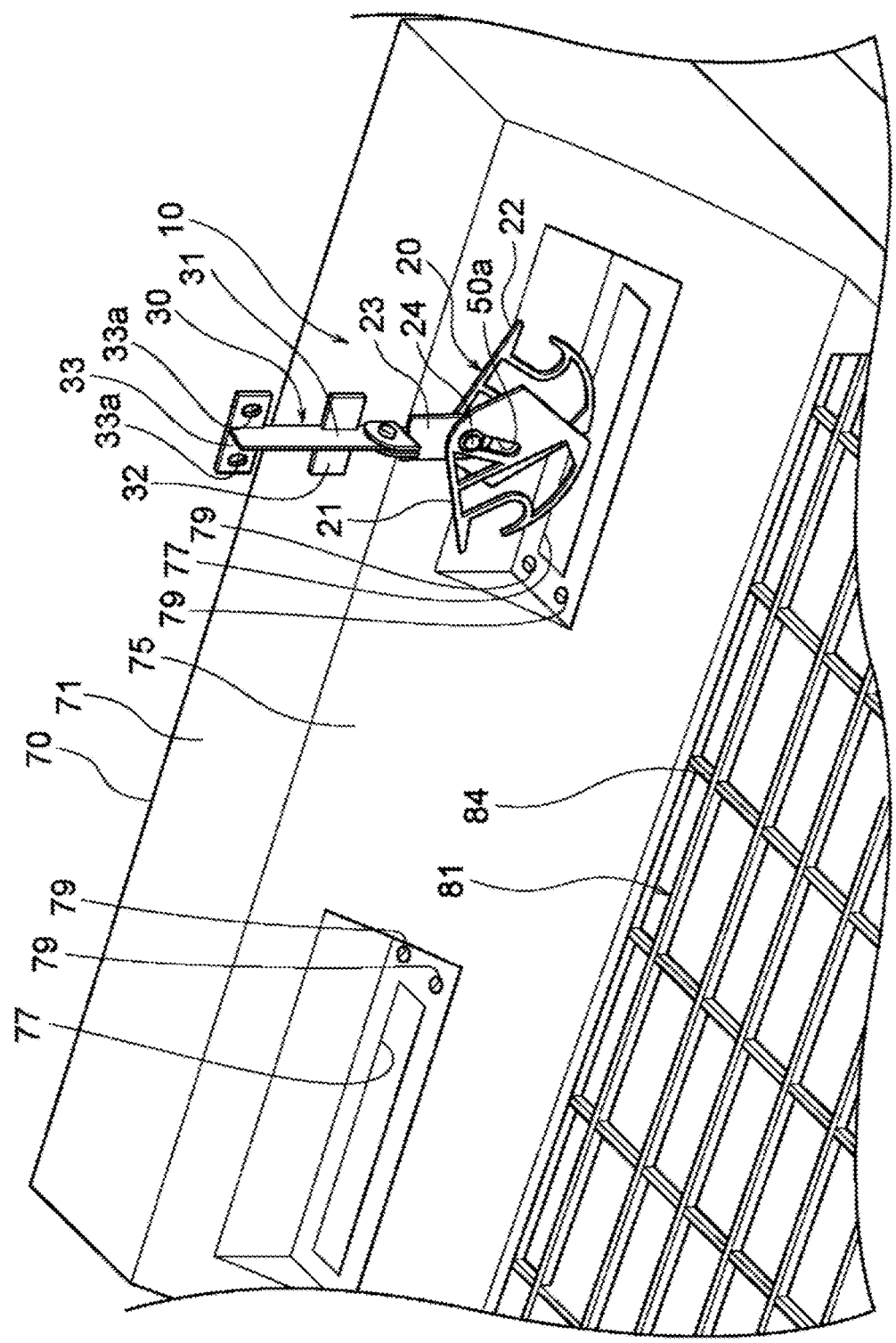
FIG. 9 is a schematic view showing the coupling device attached to the second height difference filling member according to the first embodiment.

FIG. 8 is a schematic view showing the coupling device 10 attached to the first height difference filling member 60. Further, FIG. 9 is a schematic view showing the coupling device 10 attached to the second height difference filling member 70. In order to couple the first and second height difference filling members 60, 70 to the upper portion of the grating 81, the coupling device 10 is inserted into the respective attachment holes 67, 77 of the first and second height difference filling members 60, 70 such that the detachable member 20 is on the vertical direction lower side. Note that in FIGS. 8 to 22, procedures for inserting the coupling device 10 into one of the attachment holes 67, 77 in the first and second height difference filling members 60, 70 are illustrated. Further, the grating 81 includes a grille 84 that extends in a horizontal direction, and the grille 84 constitutes a first coupling subject member.

Figure 10:
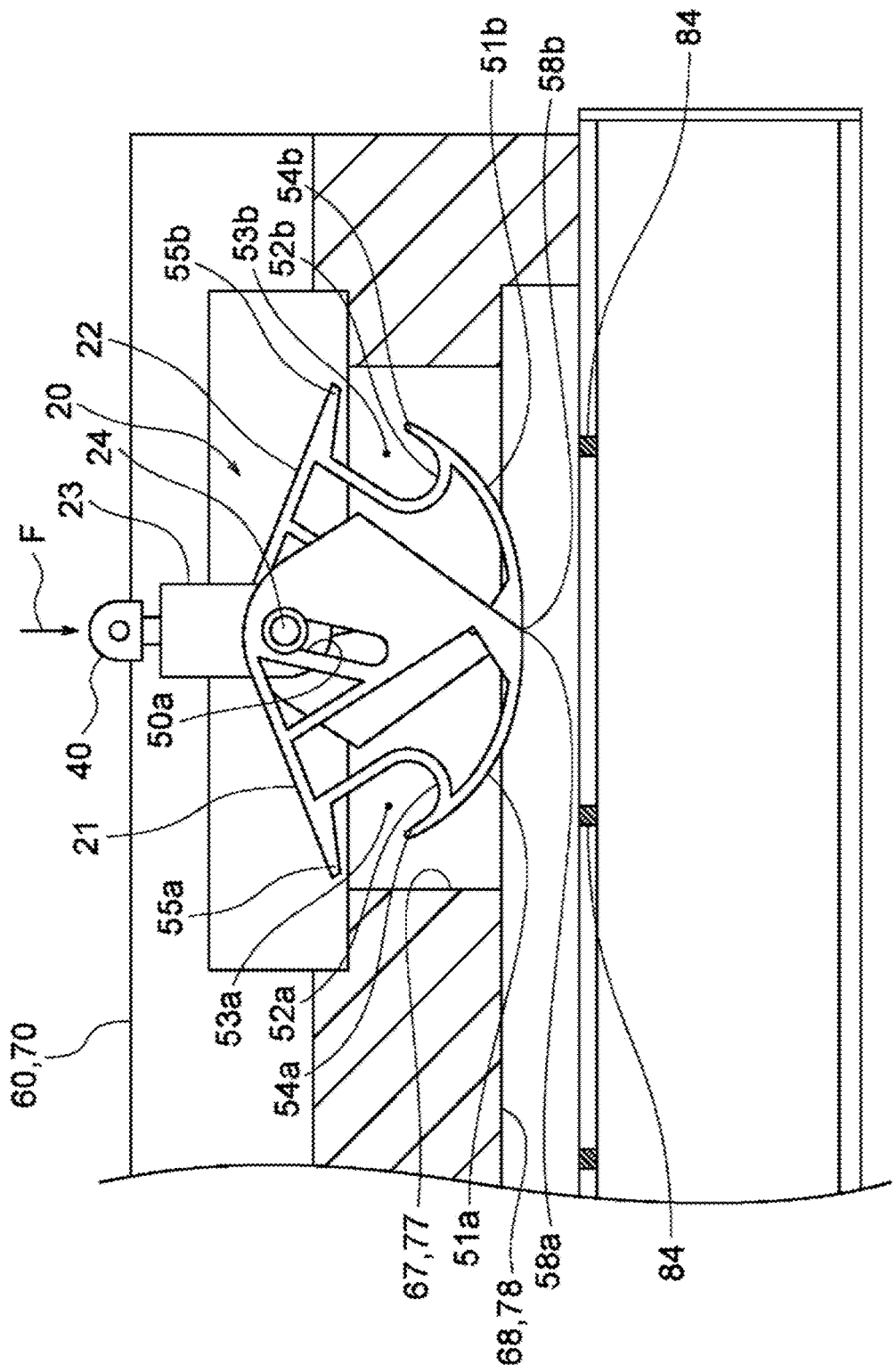
FIG. 10 is a sectional view showing a first state of attachment holes of the first and second height difference filling members, according to the first embodiment.

FIG. 10 is a sectional view showing a first state of the attachment hole 67, 77 of the first and second height difference filling members 60, 70, in which the detachable member 20 of the coupling device 10 (see FIG. 8) is inserted in the direction of an arrow F on the vertical direction lower side. Note that in order to facilitate description, the height difference filling member coupling member 30 is not shown in FIGS. 10 to 16, 19, and 20.

Figure 11:
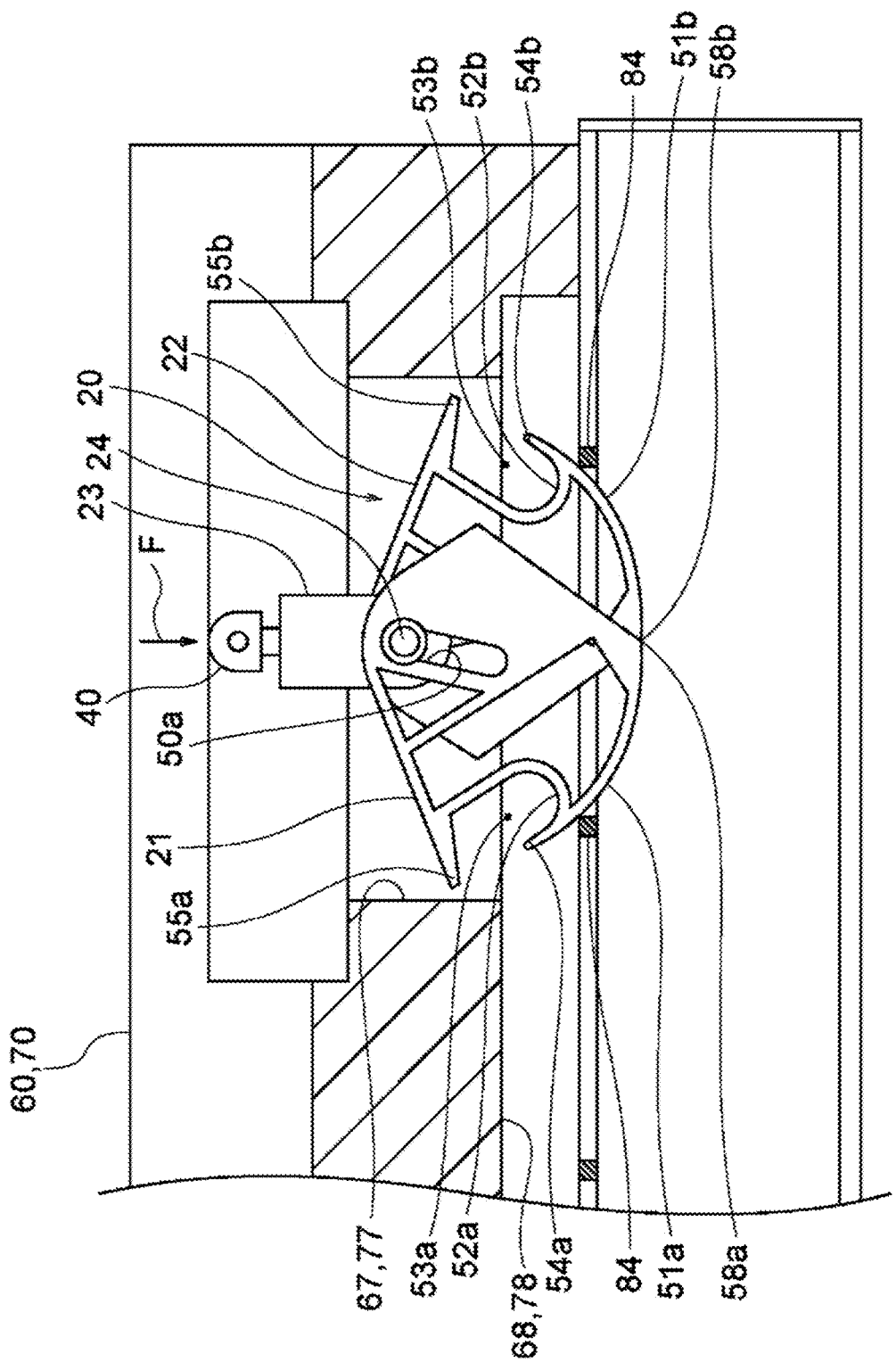
FIG. 11 is a sectional view showing a second state of the attachment holes of the first and second height difference filling members, according to the first embodiment.

FIG. 11 is a sectional view showing a second state of the attachment hole 67, 77 of the first and second height difference filling members 60, 70. When the detachable member 20 is inserted further in the direction of the arrow F, since the detachable member is in the initial state, the arc-shaped portion 51a of the first coupling member 21 and the arc-shaped portion 51b of the second coupling member 22 come into contact with the grille 84 of the grating 81.

Figure 12:
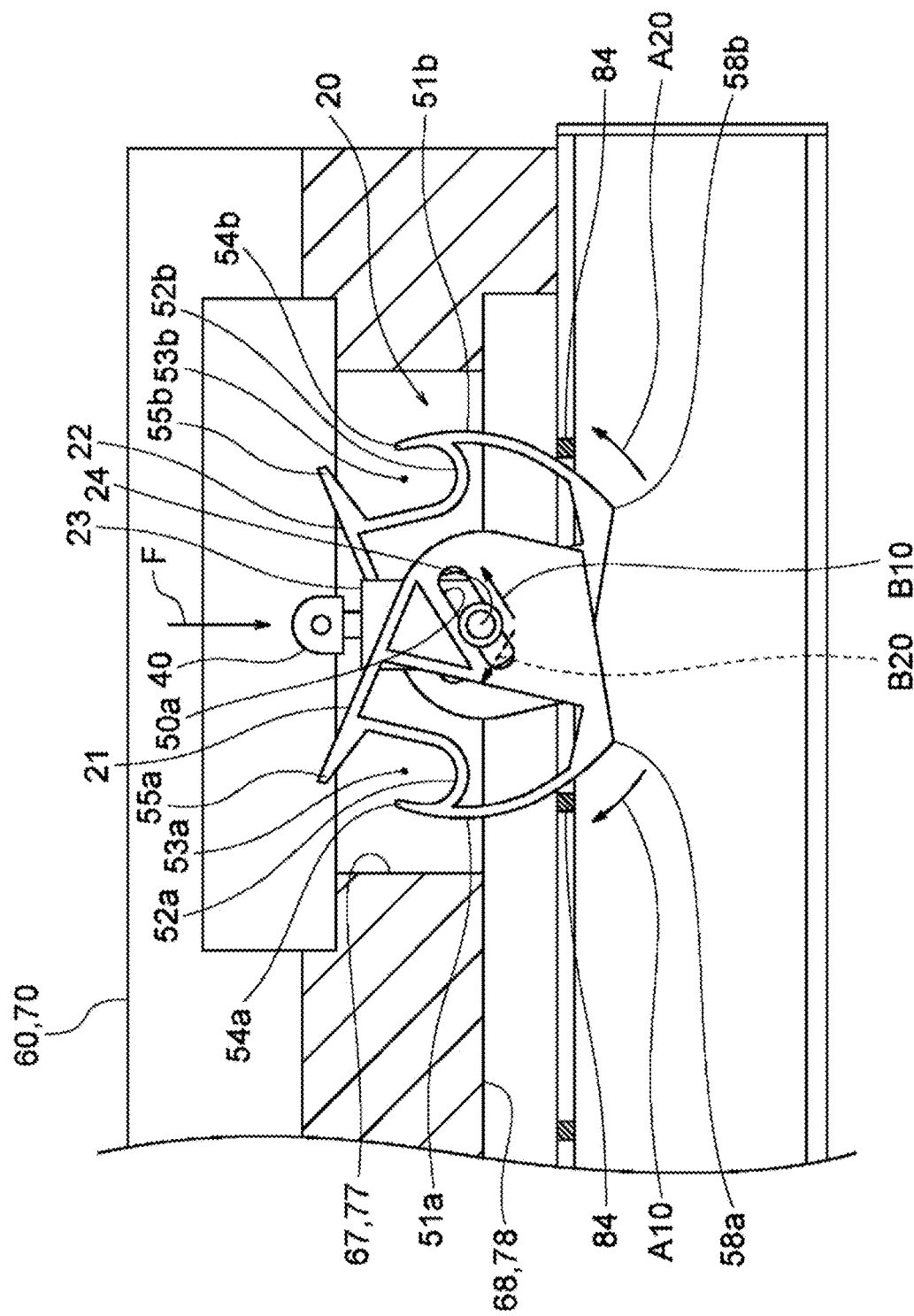
FIG. 12 is a sectional view showing a third state of the attachment holes of the first and second height difference filling members, according to the first embodiment.

FIG. 12 is a sectional view showing a third state of the attachment hole 67, 77 of the first and second height difference filling members 60, 70. When the detachable member 20 is inserted even further in the direction of the arrow F after the arc-shaped portion 51a of the first coupling member 21 and the arc-shaped portion 51b of the second coupling member 22 achieve contact, the arc-shaped portions 51a, 51b contact the grille 84 such that the arc-shaped portions 51a, 51b are pressed by the grille 84, and as a result, the first coupling member 21 rotates in the direction of an arrow A10 and the second coupling member 22 rotates in the direction of an arrow A20. In other words, the tongue portions 54a, 54b of the first and second coupling members 21, 22 move in an upward direction.

Moreover, since the fixing shaft 24 is inserted into the elongated hole 50a in the first coupling member 21, when the arc-shaped portion 51a comes into contact with the grille 84 such that the first coupling member 21 rotates in the direction of the arrow A10, the first coupling member 21 moves in the direction of an arrow B10 along the extension direction of the elongated hole 50a while sliding along the fixing shaft 24. Similarly, since the fixing shaft 24 is inserted into the elongated hole 50b in the second coupling member 22, when the arc-shaped portion 51b comes into contact with the grille 84 such that the first coupling member 22 rotates in the direction of the arrow A20, the second coupling member 22 moves in the direction of an arrow B20 along the extension direction of the elongated hole 50b while sliding along the fixing shaft 24.

Figure 13:
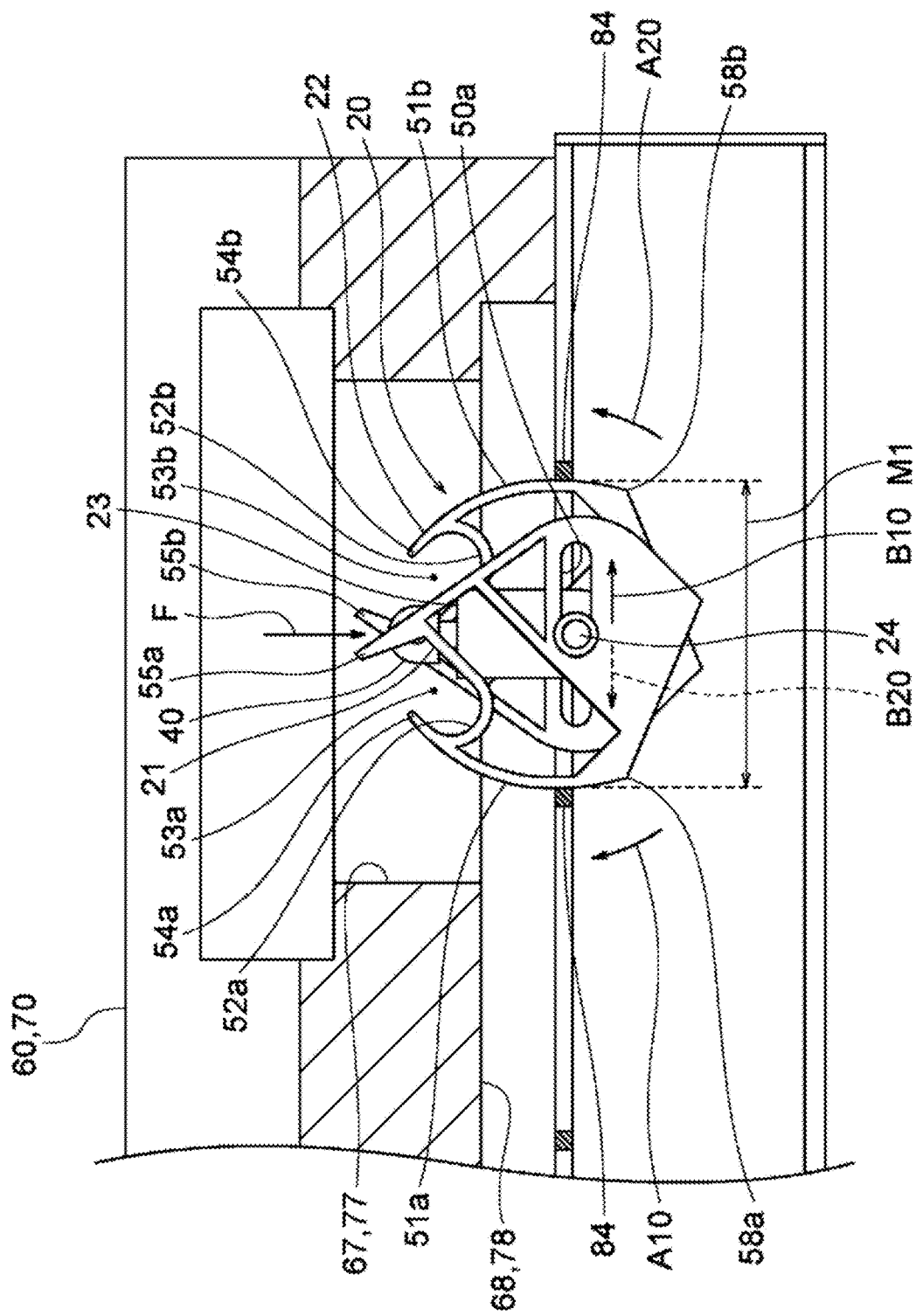
FIG. 13 is a sectional view showing a fourth state of the attachment holes of the first and second height difference filling members, according to the first embodiment.

FIG. 13 is a sectional view showing a fourth state of the attachment hole 67, 77 of the first and second height difference filling members 60, 70. When the detachable member 20 is inserted even further in the direction of the arrow F, the first coupling member 21 rotates further in the direction of the arrow A10 and moves further in the direction of the arrow B10. Likewise, the second coupling member 22 rotates in the direction of the arrow A20 and moves in the direction of the arrow B20. As a result, a horizontal direction distance between respective central portions of the arc-shaped portion 51a and the arc-shaped portion 51b of the detachable member 20, indicated by an arrow M1, reaches a minimum. The distance indicated by the arrow M1 is equal to or smaller than an interval between adjacent bars of the grille 84, and therefore the detachable member 20 can pass through the gap between adjacent bars of the grille 84.

Figure 14:
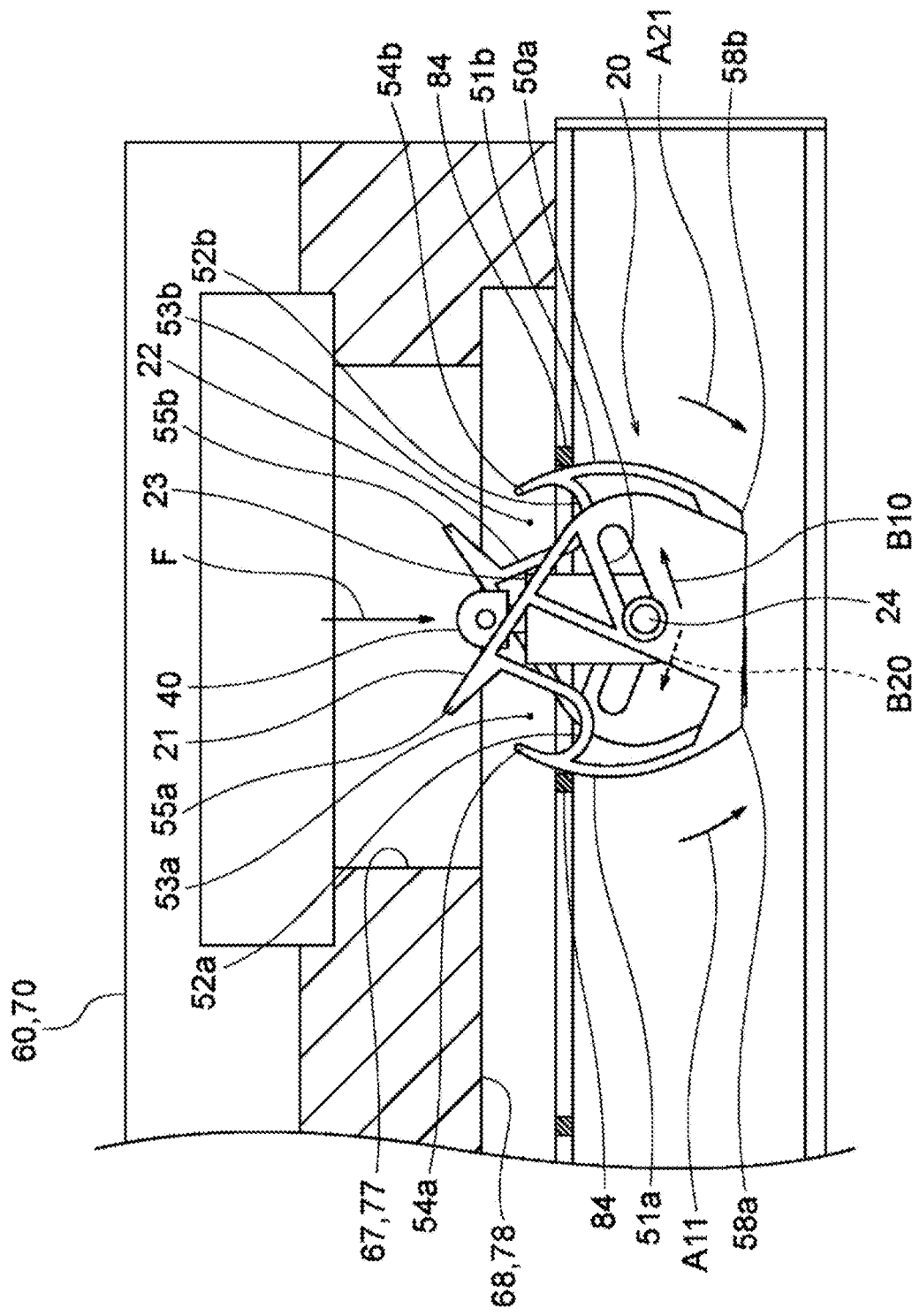
FIG. 14 is a sectional view showing a fifth state of the attachment holes of the first and second height difference filling members, according to the first embodiment.

FIG. 14 is a sectional view showing a fifth state of the attachment hole 67, 77 of the first and second height difference filling members 60, 70. When the detachable member 20 is inserted even further in the direction of the arrow F, the first coupling member 21 rotates in the direction of an arrow A11 in accordance with the positional relationship between the arc-shaped portion 51a of the first coupling member 21 and the grille 84. Further, the second coupling member 22 rotates in the direction of an arrow A21 in accordance with the positional relationship between the arc-shaped portion 51b of the second coupling member 22 and the grille 84. Next, when the detachable member 20 is inserted even further in the direction of the arrow F, the tongue portion 54a of the first coupling member 21 moves in a downward direction while contacting the grille 84, and the tongue portion 54b of the second coupling member 22 moves in a downward direction while contacting the grille 84.

Figure 15:
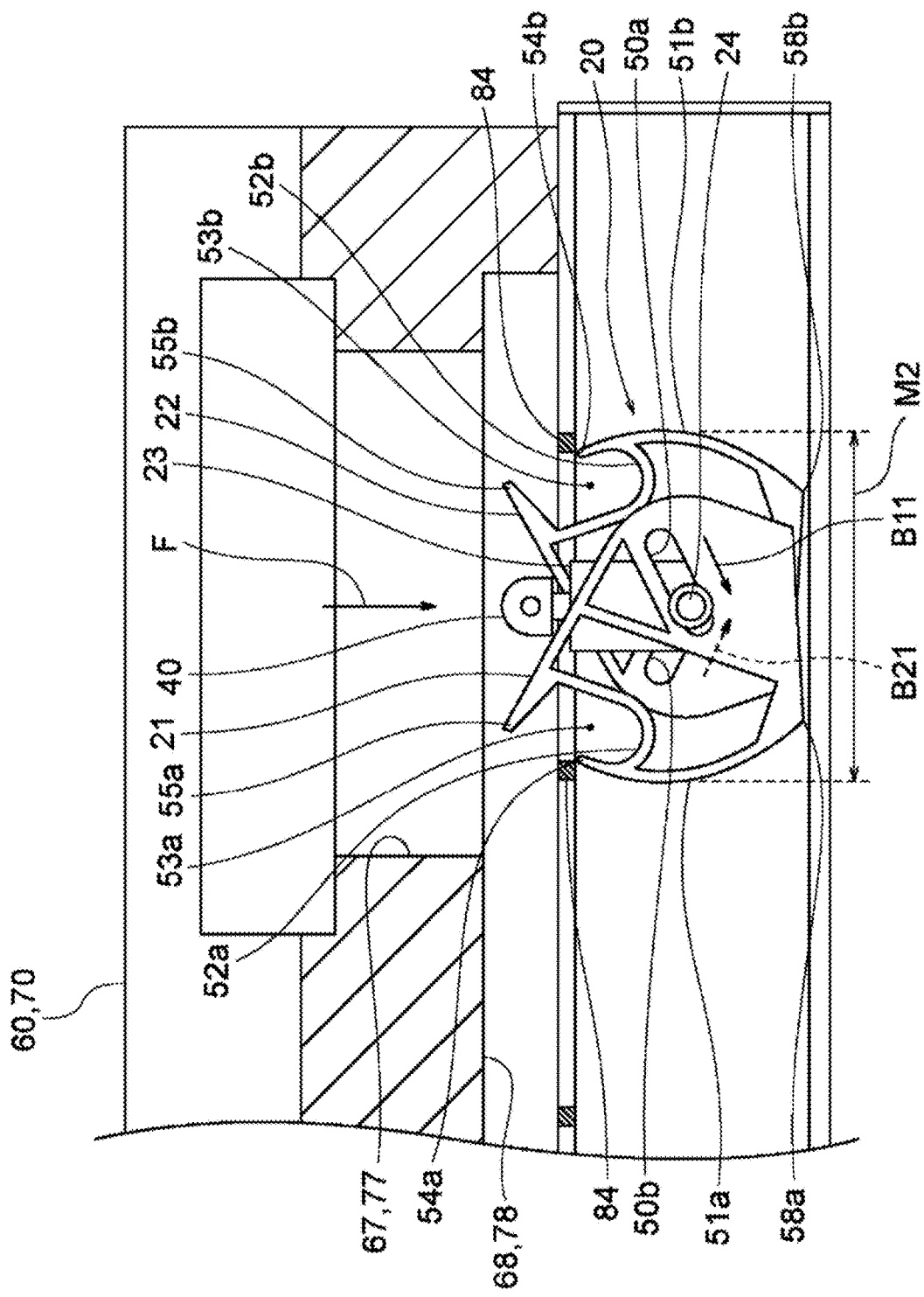
FIG. 15 is a sectional view showing a sixth state of the attachment holes of the first and second height difference filling members, according to the first embodiment.

FIG. 15 is a sectional view showing a sixth state of the attachment hole 67, 77 of the first and second height difference filling members 60, 70. When the detachable member 20 is inserted even further in the direction of the arrow F, the tongue portion 54a of the first coupling member 21 moves to the lower side of the grille 84 such that the grille 84 and the tongue portion 54a separate from each other, and the tongue portion 54b of the second coupling member 22 moves to the lower side of the grille 84 such that the grille 84 and the tongue portion 54b separate from each other. Next, after the grille 84 and the tongue portion 54a separate from each other, the first coupling member 21 moves in the direction of an arrow B11 while the elongated hole 50a slides along the fixing shaft 24, and the second coupling member 22 moves in the direction of an arrow B21 while the elongated hole 50b slides along the fixing shaft 24. In other words, the first coupling member 21 and the second coupling member 22 move in a direction for increasing the horizontal direction distance between the respective central portions of the arc-shaped portion 51a and the arc-shaped portion 51b of the detachable member 20, which is indicated by an arrow M2.

Figure 16:
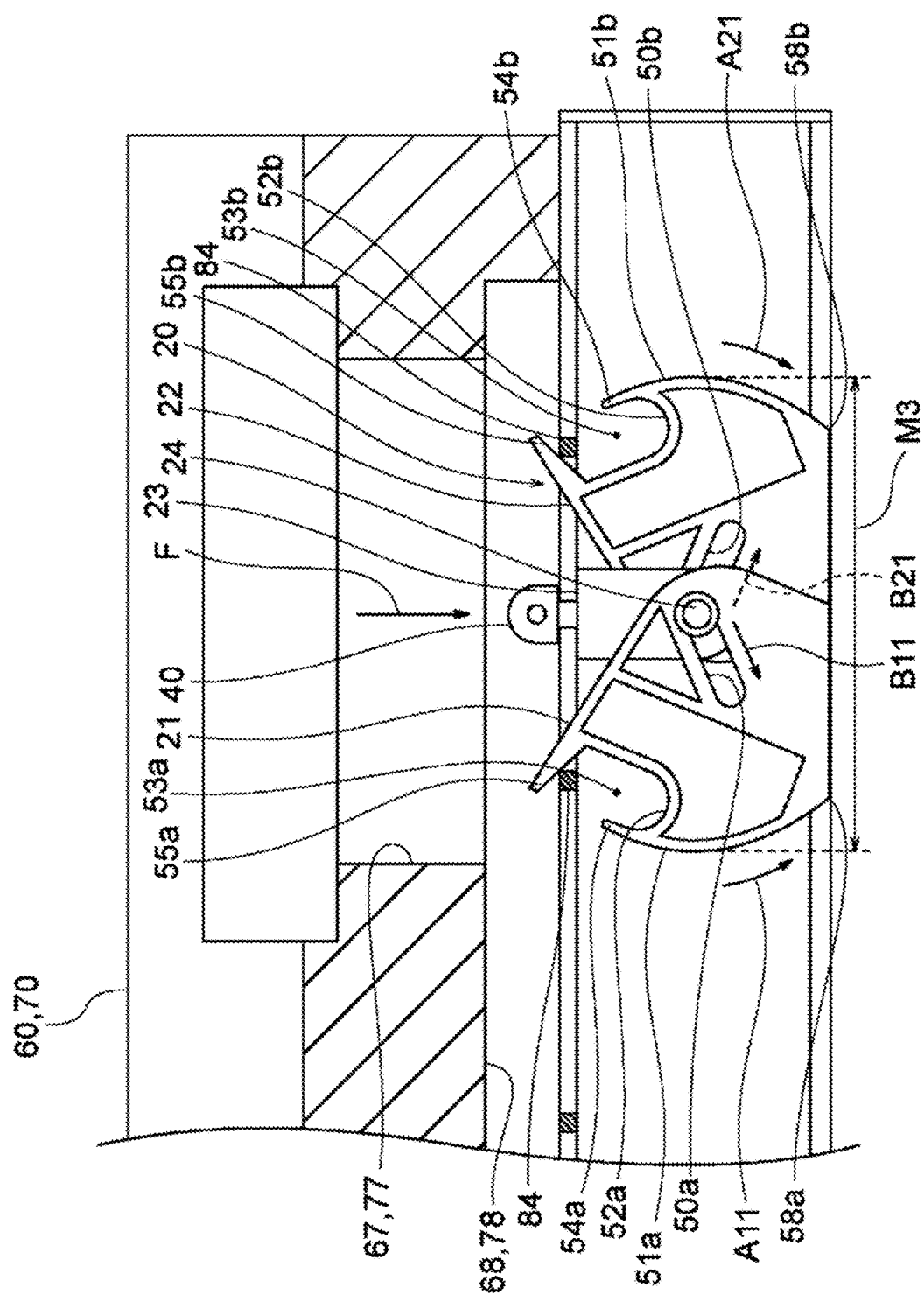
FIG. 16 is a sectional view showing a seventh state of the attachment holes of the first and second height difference filling members, according to the first embodiment.

FIG. 16 is a sectional view showing a seventh state of the attachment hole 67, 77 of the first and second height difference filling members 60, 70. When the detachable member 20 is inserted even further in the direction of the arrow F, the detachable member 20 moves below the attachment hole 67, 77. At this time, the first coupling member 21 rotates in the direction of the arrow A11 and moves in the direction of the arrow B11 in accordance with the center of gravity position thereof. Further, at this time, the second coupling member 22 rotates in the direction of the arrow A21 and moves in the direction of the arrow B21 in accordance with the center of gravity position thereof. Thus, the first coupling member 21 and the second coupling member 22 move further in the direction for increasing the horizontal direction distance between the respective central portions of the arc-shaped portion 51a and the arc-shaped portion 51b of the detachable member 20, indicated by an arrow M3. Moreover, the release arm 55a of the first coupling member 21 contacts the grille 84 so as to be supported thereby, and the release arm 55b of the second coupling member 22 contacts the grille 84 so as to be supported thereby.

Figure 17:
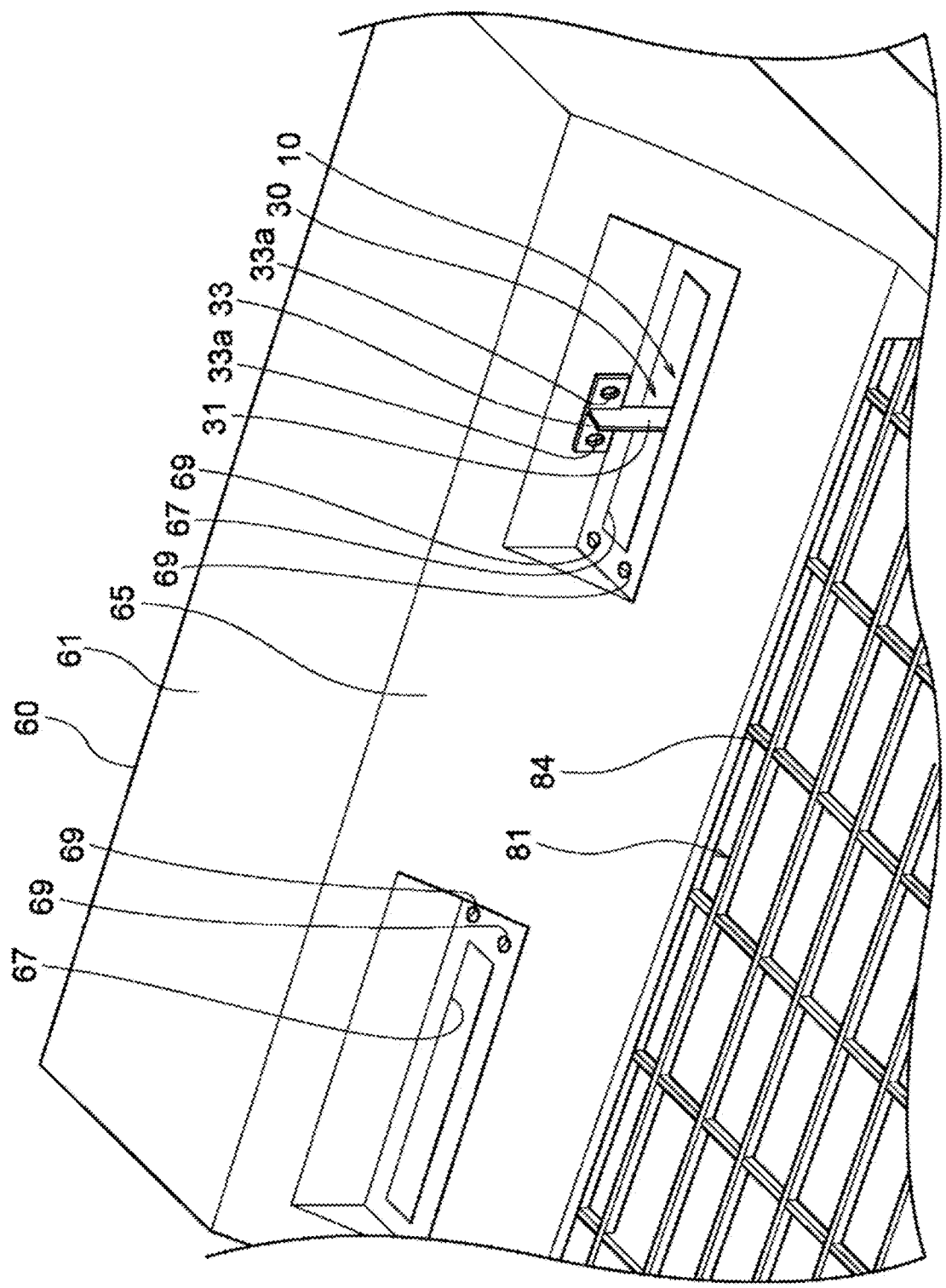
FIG. 17 is a schematic view showing an upper portion of the first height difference filling member when the detachable member is positioned below the attachment hole, according to the first embodiment.
Figure 18:
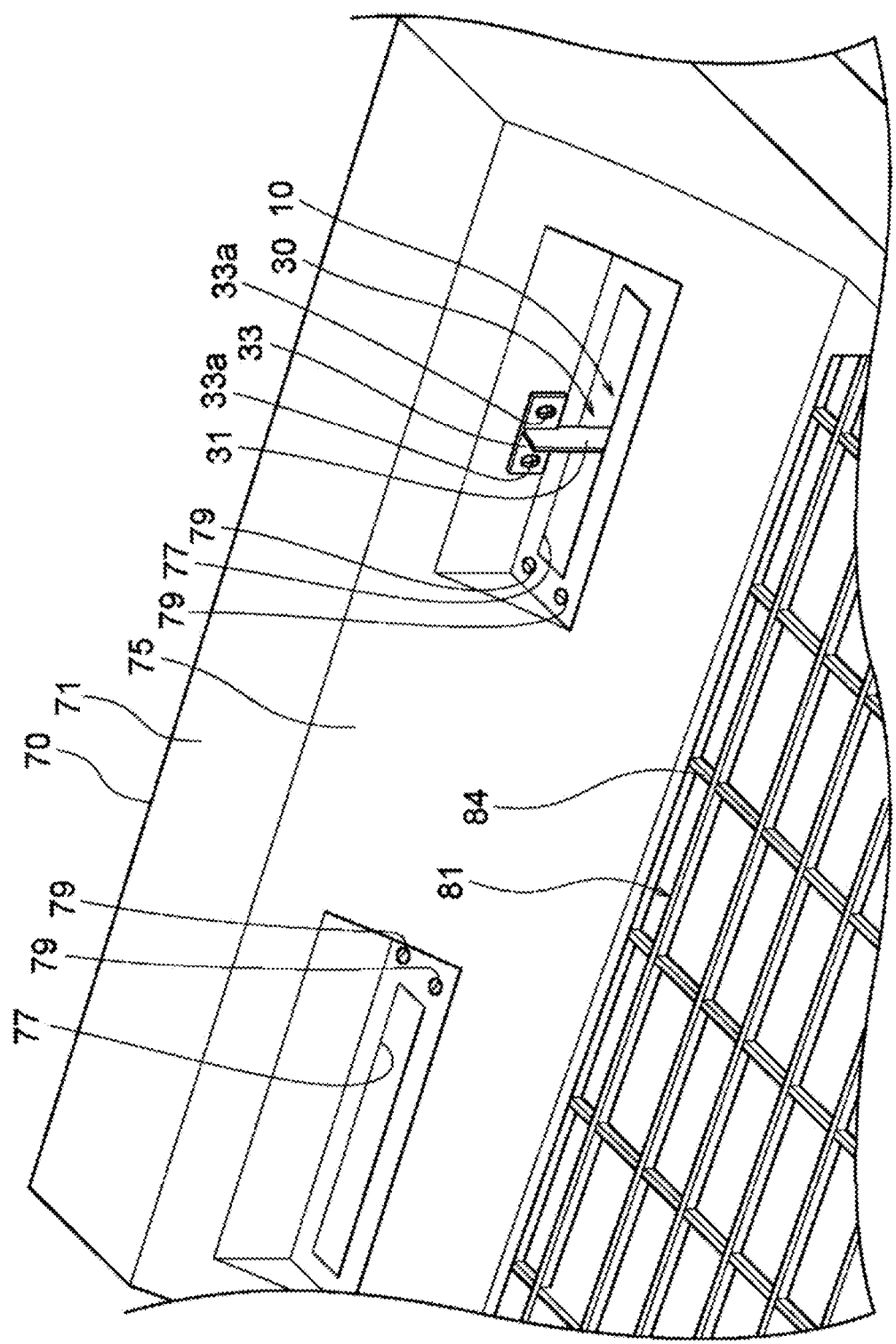
FIG. 18 is a schematic view showing an upper portion of the second height difference filling member when the detachable member is positioned below the attachment hole, according to the first embodiment.

FIG. 17 is a schematic view showing the upper portion of the first height difference filling member 60 when the detachable member 20 is positioned below the attachment hole 67, as shown in FIG. 16. FIG. 18 is a schematic view showing the upper portion of the second height difference filling member 70 when the detachable member 20 is positioned below the attachment hole 77, as shown in FIG. 16. In this state, as shown in FIG. 16, the release arm 55a of the first coupling member 21 is in contact with the grille 84 so as to be supported thereby, and the release arm 55b of the second coupling member 22 is in contact with the grille 84 so as to be supported thereby. Accordingly, the coupling device 10 is provisionally coupled to the grating 81 in a state where the height difference filling member coupling member 30 projects upward from the attachment hole 67, 77. Next, in order to fully fix the first height difference filling member 60 to the grating 81 using the coupling device 10 and fully fix the second height difference filling member 70 to the grating 81 using the coupling device 10, the height difference filling member coupling member 30 is pulled up toward the vertical direction upper side.

Figure 19:
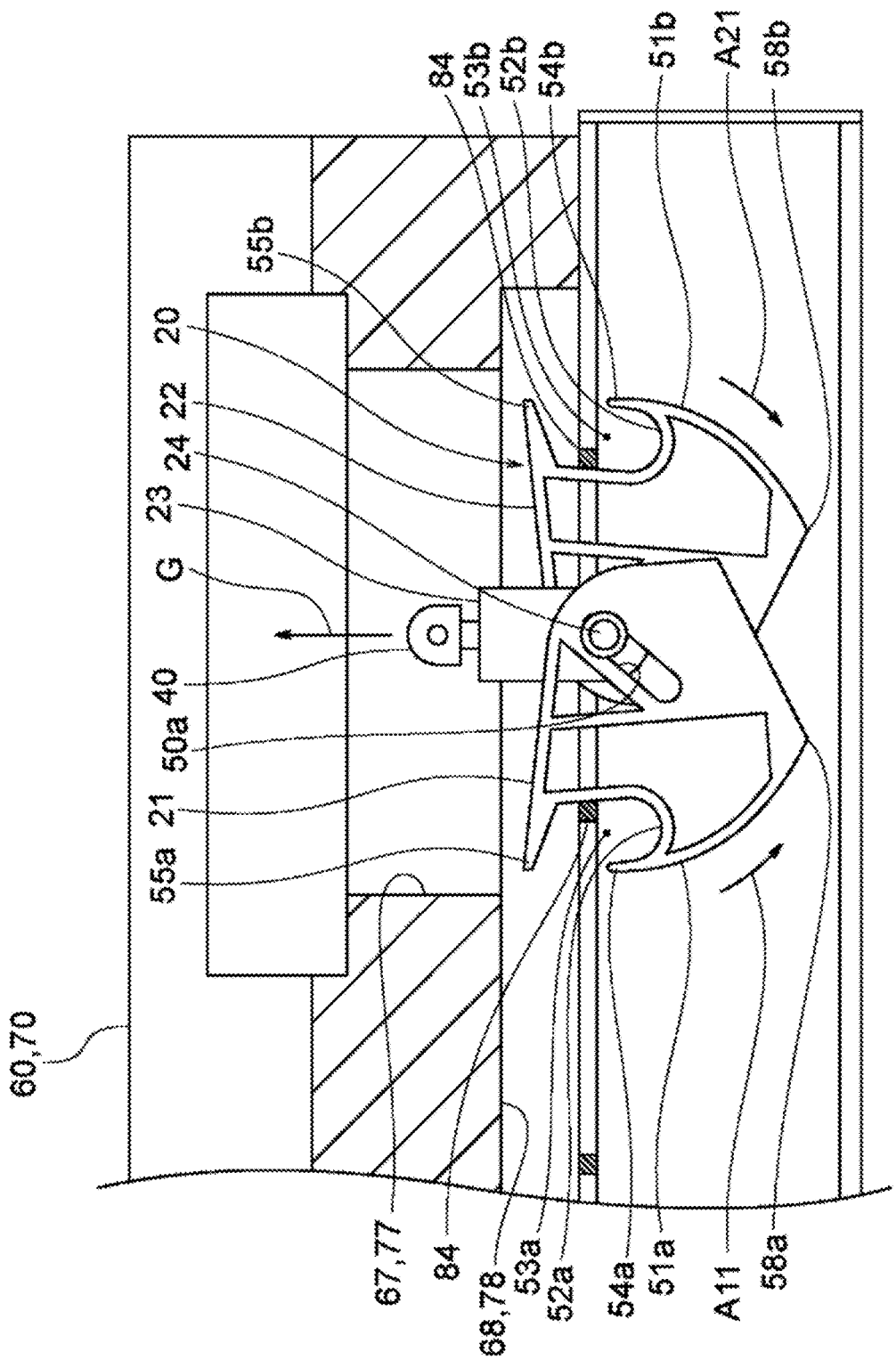
FIG. 19 is a sectional view showing an eighth state of the attachment holes of the first and second height difference filling members, according to the first embodiment.

FIG. 19 is a sectional view showing an eighth state of the attachment hole 67, 77 of the first and second height difference filling members 60, 70. When the height difference filling member coupling member 30 (see FIGS. 17 and 18) is pulled up in the direction of an arrow G, i.e., toward the vertical direction upper side, from a state in which the release arm 55a of the first coupling member 21 is in contact with the grille 84 and the release arm 55b of the second coupling member 22 is in contact with the grille 84, the detachable member 20 is pulled up in the direction of the arrow G. As a result, the first coupling member 21 is pressed by the grille 84 so as to rotate in the direction of the arrow A11. Further, the second coupling member 22 is pressed by the grille 84 so as to rotate in the direction of the arrow A21. Next, when the detachable member is pulled up further in the direction of the arrow G, the grille 84 moves from the opening portion 53a of the first coupling member 21 into the semicircular arc portion 52a, and the grille 84 moves from the opening portion 53b of the second coupling member 22 into the semicircular arc portion 52b.

Figure 20:
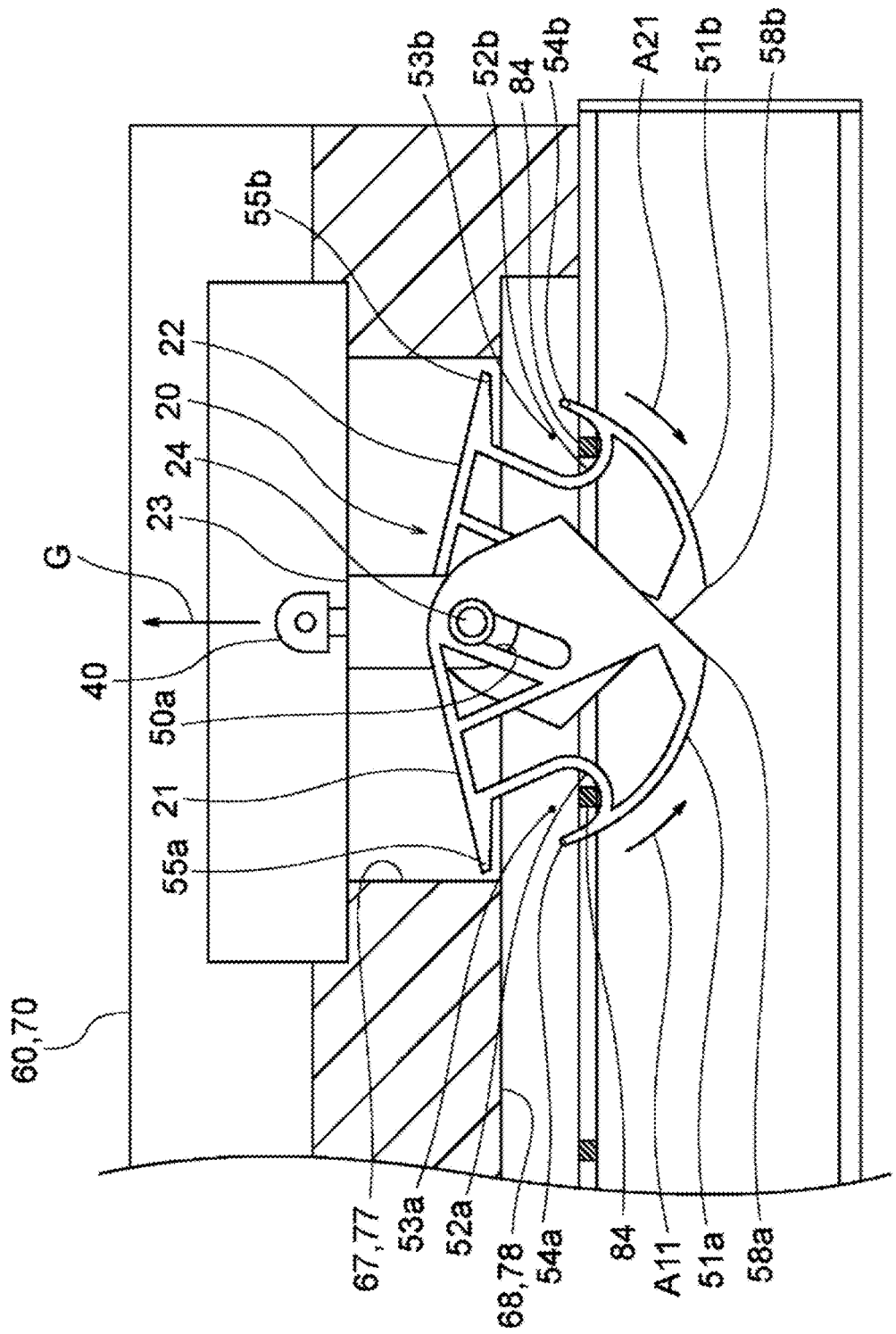
FIG. 20 is a sectional view showing a ninth state of the attachment holes of the first and second height difference filling members, according to the first embodiment.

FIG. 20 is a sectional view showing a ninth state of the attachment hole 67, 77 of the first and second height difference filling members 60, 70. When the detachable member 20 is pulled up further in the direction of the arrow G, the first coupling member 21 rotates in the direction of the arrow A11 and the second coupling member 22 rotates in the direction of the arrow A21. In other words, the tongue portions 54a, 54b of the first and second coupling members 21, 22 move downward. As a result, the grille 84 is supported by and coupled to the semicircular arc portion 52a of the first coupling member 21, and the grille 84 is supported by and coupled to the semicircular arc portion 52b of the second coupling member 22. In other words, the grille 84 is suspended from the semicircular arc portion 52a and the semicircular arc portion 52b.

Figure 21:
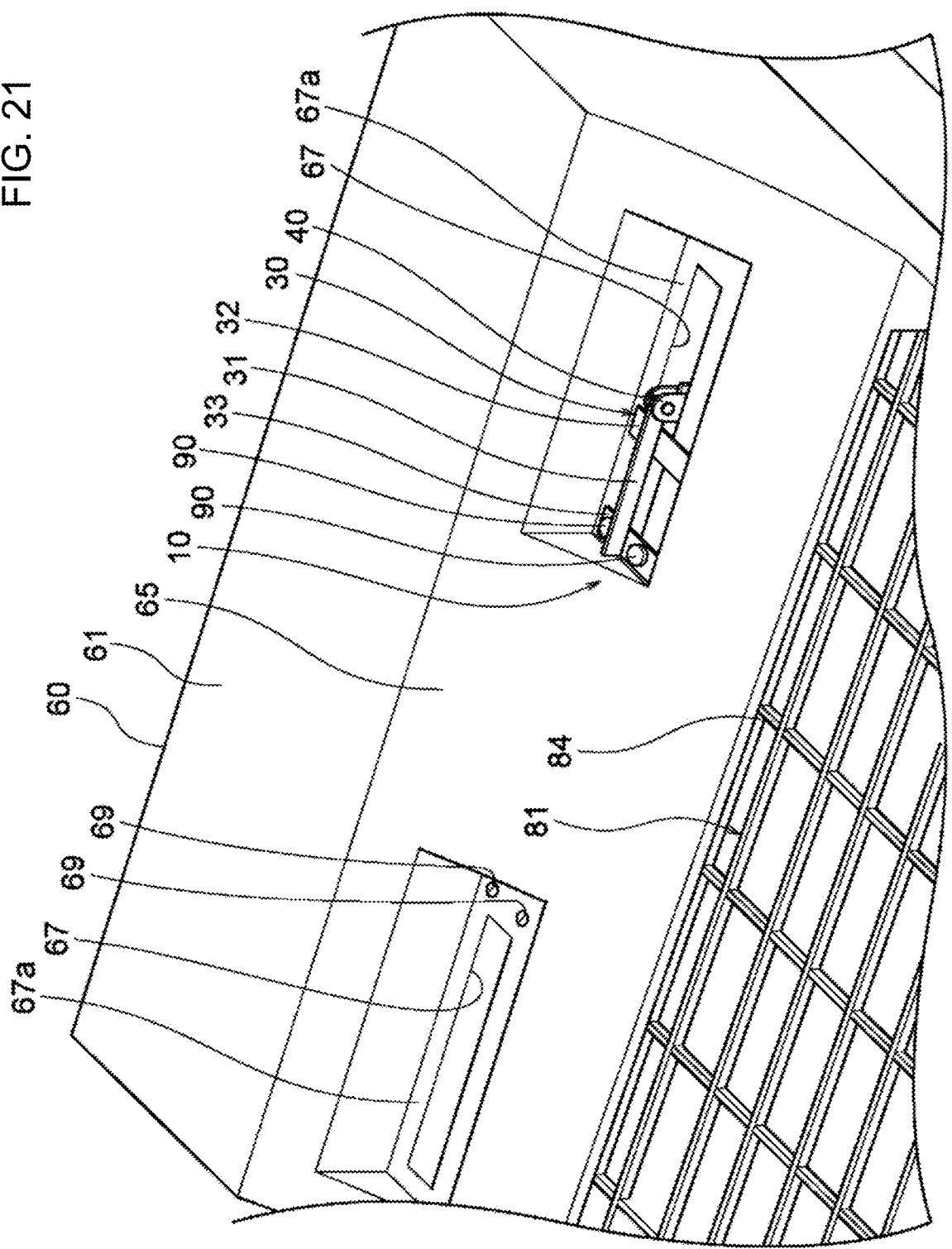
FIG. 21 is a schematic view showing the upper portion of the first height difference filling member according to the first embodiment.
Figure 22:
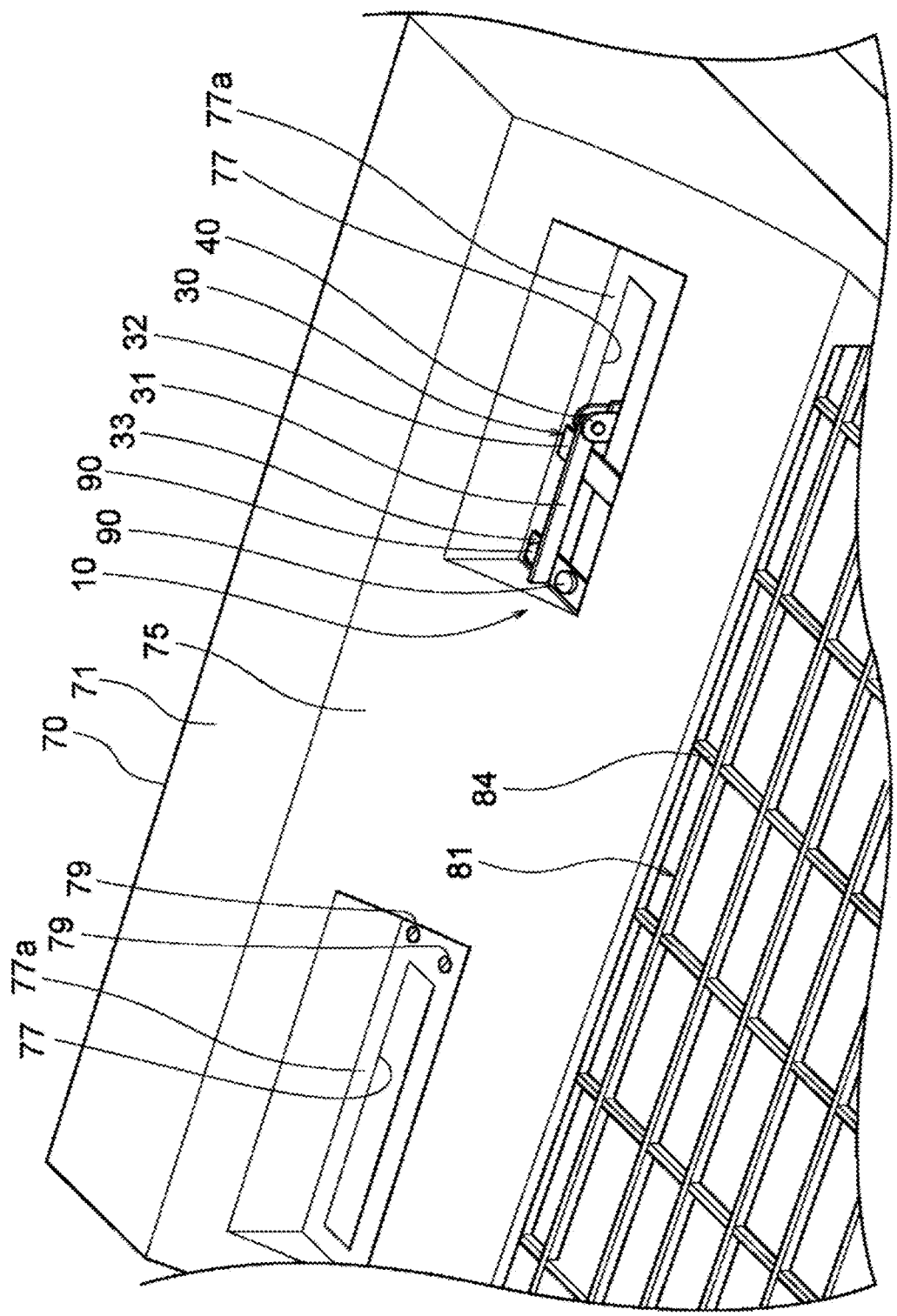
FIG. 22 is a schematic view showing the upper portion of the second height difference filling member according to the first embodiment.

FIG. 21 is a schematic view showing the upper portion of the first height difference filling member 60. FIG. 22 is a schematic view showing the upper portion of the second height difference filling member 70. The pulled-up height difference filling member coupling member 30 is rotated in a horizontal direction such that the first retaining portion 32 and the second retaining portion 33 of the height difference filling member coupling member 30 come into contact with an edge portion 67a, 77a of the attachment hole 67, 77 in the first and second height difference filling members 60, 70. Next, shared bolts 90 are inserted into the bolt holes 33a (see FIGS. 17 and 18) in the second retaining portion 33 and bolt holes 69, 79 in the edge portion 67a, 77a, whereby the second retaining portion 33 of the height difference filling member coupling member 30 is fastened to the edge portion 67a, 77a by the bolts 90. As a result, the height difference filling member coupling member 30 is fixed to the position of the attachment hole 67, 77 such that the grille 84 is suspended from the detachable member 20 attached to the height difference filling member coupling member 30, as shown in FIG. 20, and thus the first and second height difference filling members 60, 70 and the grating 81 are coupled by the coupling device 10. Note that by inserting the coupling device 10 similarly into the other attachment hole 67, 77 of the first and second height difference filling members 60, so as to fix the height difference filling member coupling member to the position of the attachment hole 67, 77, the first and second height difference filling members 60, 70 and the grating 81 are coupled by the coupling device 10.

Next, a method for releasing the coupling formed by the coupling device 10 between the first height difference filling member 60 and the grating 81 and a method for releasing the coupling formed by the coupling device 10 between the second height difference filling member 70 and the grating 81 will be described. Note that the method for releasing the coupling formed by the coupling device 10 between the first height difference filling member 60 and the grating 81 and the method for releasing the coupling formed by the coupling device 10 between the second height difference filling member 70 and the grating 81 are identical, and therefore, in the following description, the methods will be described together with reference to FIGS. 23 to 30. When the couplings between the first and second height difference filling members 60, 70 and the grating 81 are to be released, the bolts 90 are removed and the height difference filling member coupling member 30 is rotated in the vertical direction.

Figure 23:
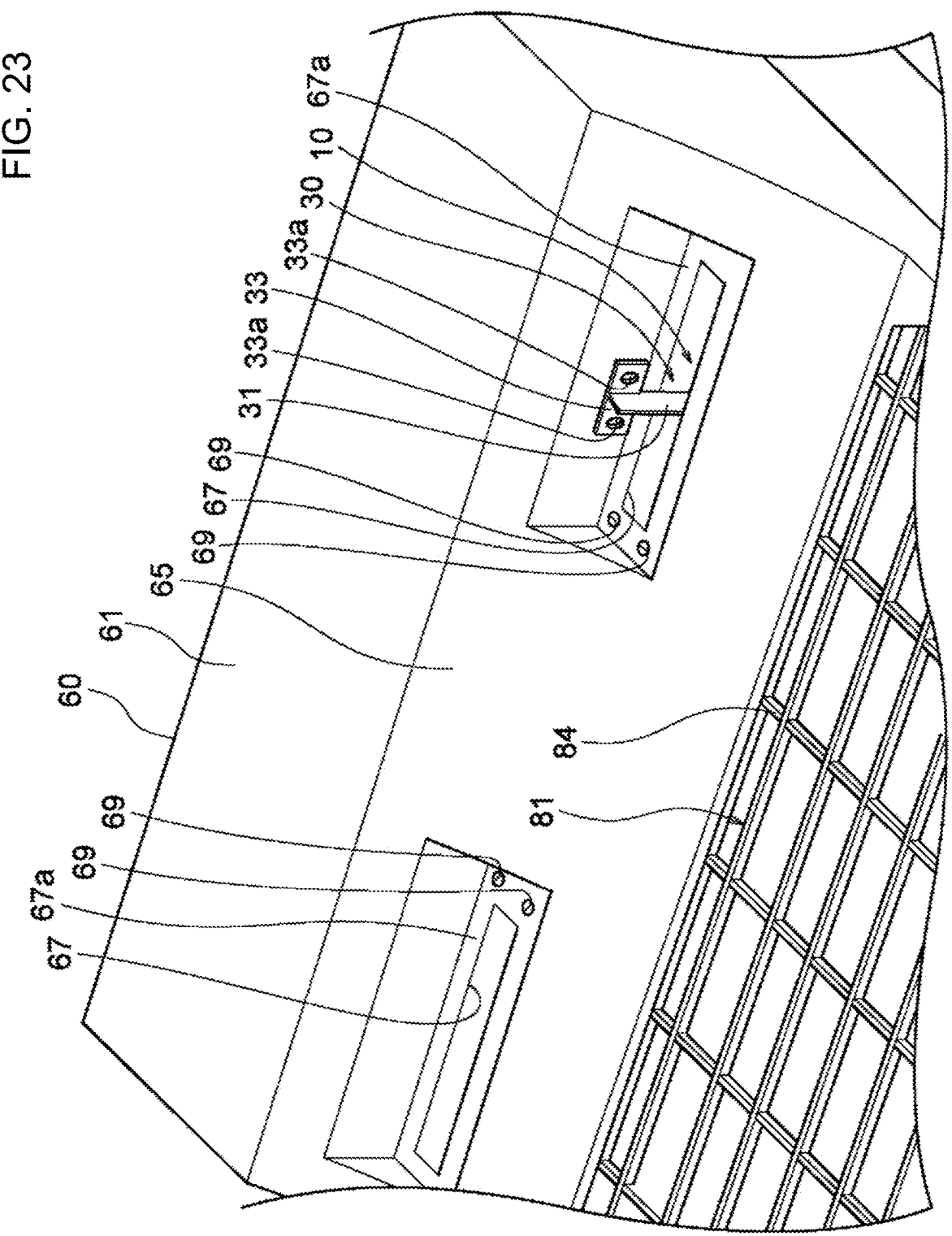
FIG. 23 is a schematic view showing the upper portion of the first height difference filling member when a height difference filling member coupling member according to the first embodiment has been rotated in a vertical direction.
Figure 24:
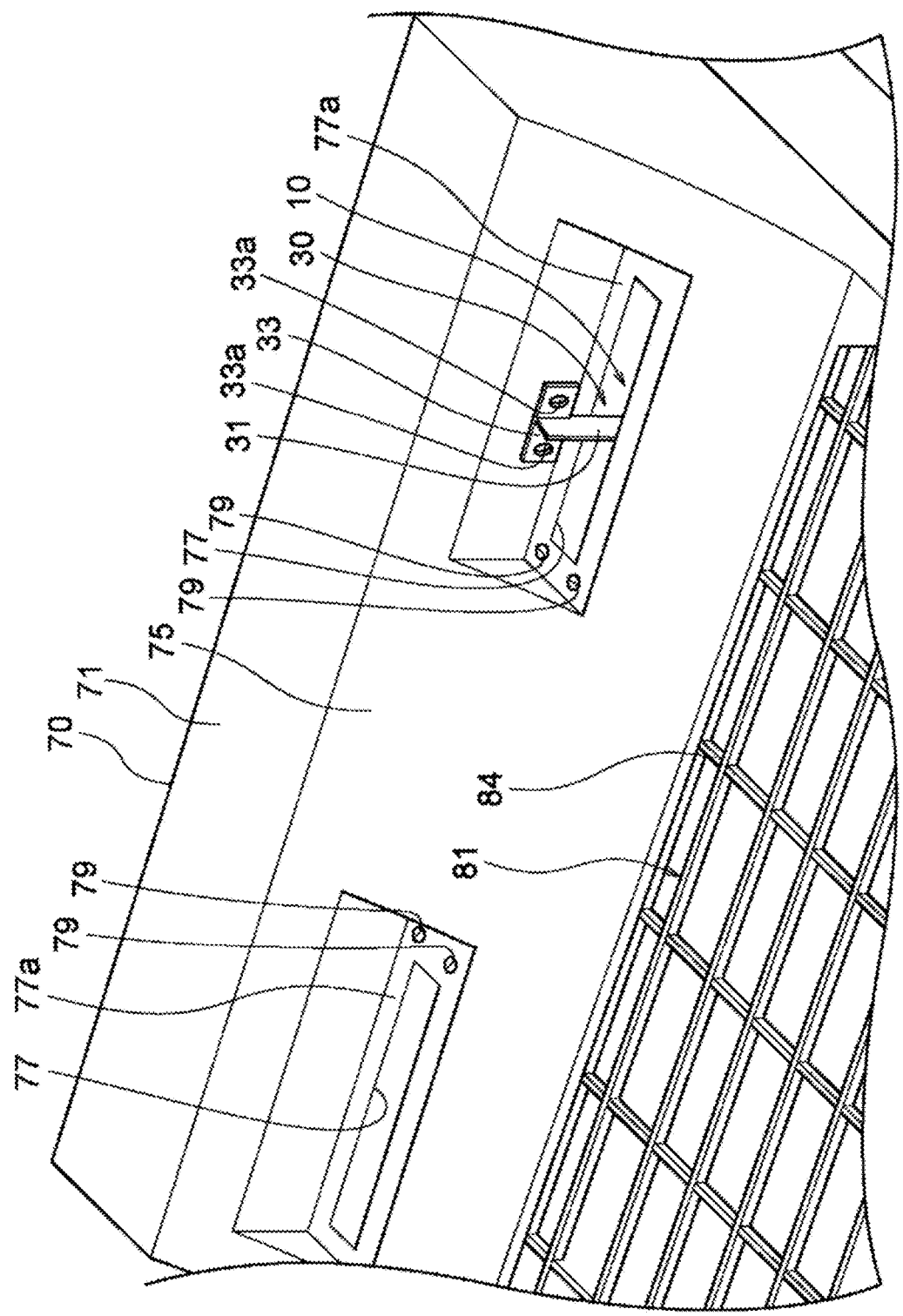
FIG. 24 is a schematic view showing the upper portion of the second height difference filling member when the height difference filling member coupling member according to the first embodiment has been rotated in the vertical direction.

FIG. 23 is a schematic view showing the upper portion of the first height difference filling member 60 when the height difference filling member coupling member 30 has been rotated in the vertical direction in order to release the coupling between the first height difference filling member 60 and the grating 81. Further, FIG. 24 is a schematic view showing the upper portion of the second height difference filling member 70 when the height difference filling member coupling member 30 has been rotated in the vertical direction in order to release the coupling between the second height difference filling member 70 and the grating 81. The entire coupling device 10 is moved toward the vertical direction lower side by inserting the height difference filling member coupling member 30 into the attachment hole 67, 77.

Figure 25:
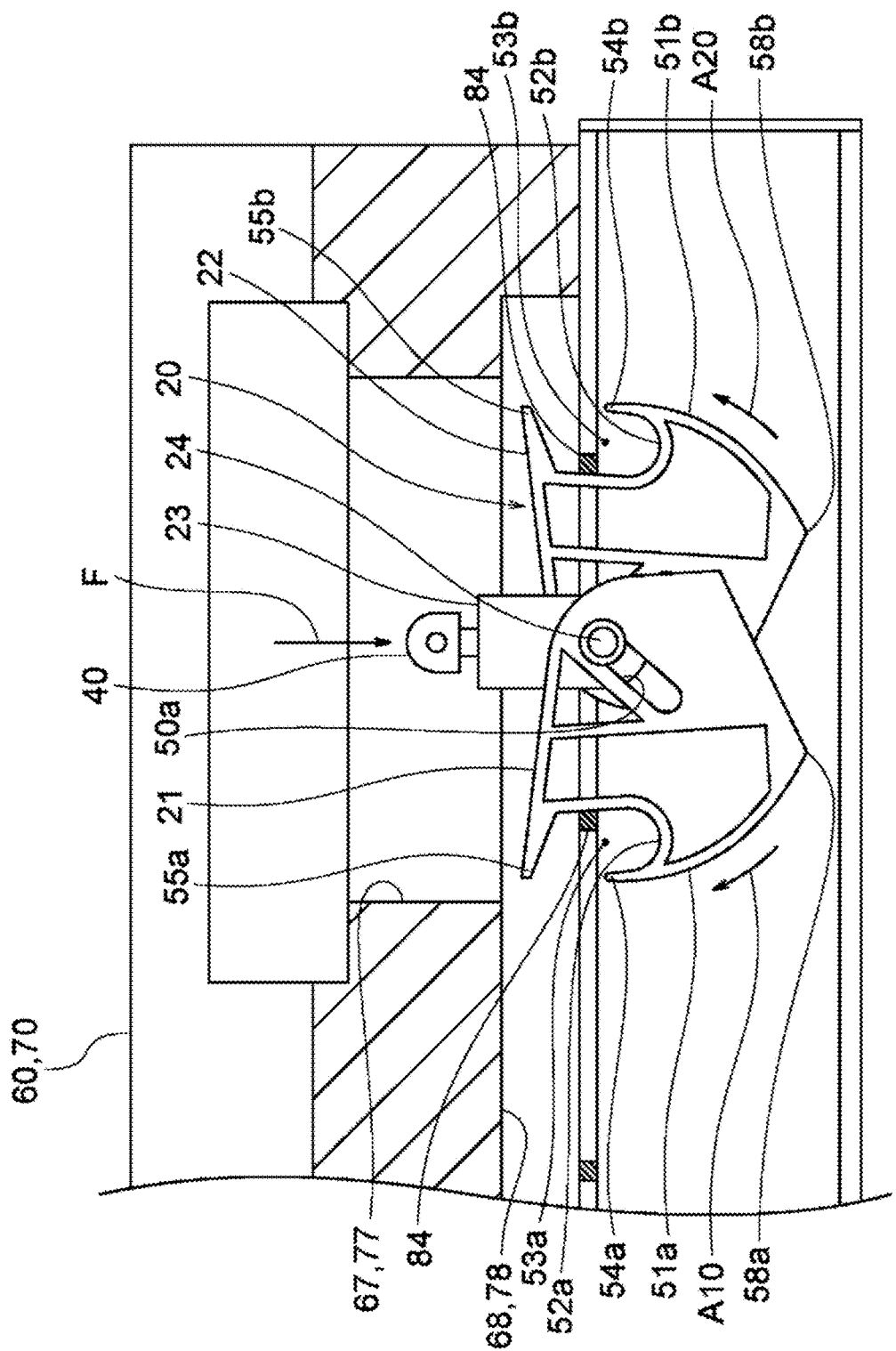
FIG. 25 is a sectional view showing a tenth state of the attachment holes of the first and second height difference filling members, according to the first embodiment.

FIG. 25 is a sectional view showing a tenth state of the attachment hole 67, 77 of the first and second height difference filling members 60, 70. Note that in order to facilitate description, the height difference filling member coupling member 30 is not shown in FIGS. 25 to 30. When the detachable member 20 of the coupling device 10 (see FIG. 20) moves in the direction of the arrow F, i.e., toward the vertical direction lower side, the first coupling member 21 contacts one bar of the grille 84 and the second coupling member 22 contacts the adjacent bar of the grille 84. Accordingly, the first coupling member 21 rotates in the direction of the arrow A10, and the second coupling member 22 rotates in the direction of the arrow A20.

Figure 26:
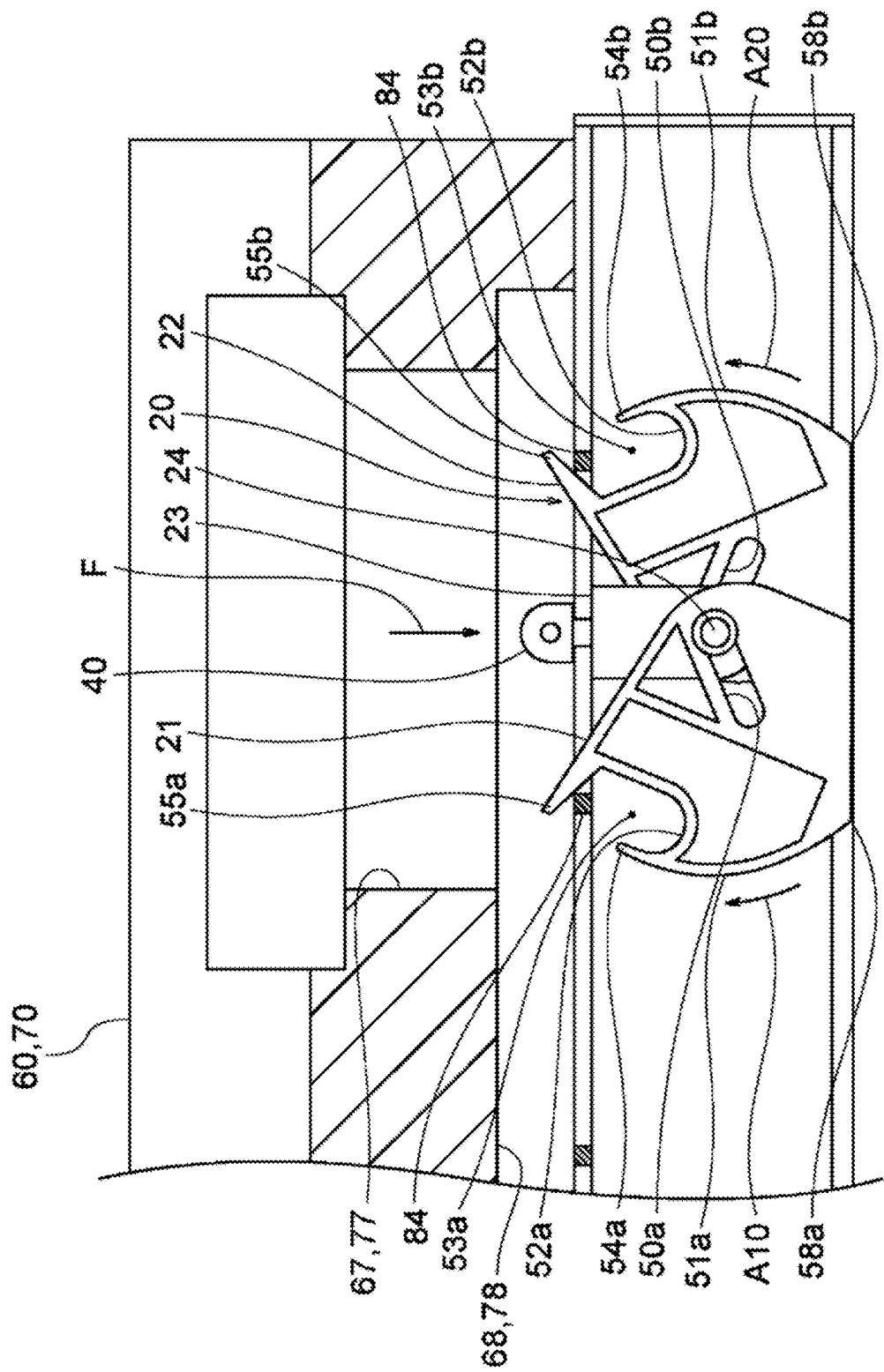
FIG. 26 is a sectional view showing an eleventh state of the attachment holes of the first and second height difference filling members, according to the first embodiment.

FIG. 26 is a sectional view showing an eleventh state of the attachment hole 67, 77 of the first and second height difference filling members 60, 70. When the detachable member 20 moves further in the direction of the arrow F, the release arm 55a of the first coupling member 21 comes into contact with the grille 84 so as to be pressed and lifted up from the lower side toward the upper side, whereby the first coupling member 21 rotates further in the direction of the arrow A10. Further, the release arm 55b of the second coupling member 22 comes into contact with the grille 84 so as to be pressed and lifted up from the lower side toward the upper side, whereby the second coupling member 22 rotates further in the direction of the arrow A20. As a result, the couplings between the first and second coupling members 21, 22 and the grille 84 are released.

Figure 27:
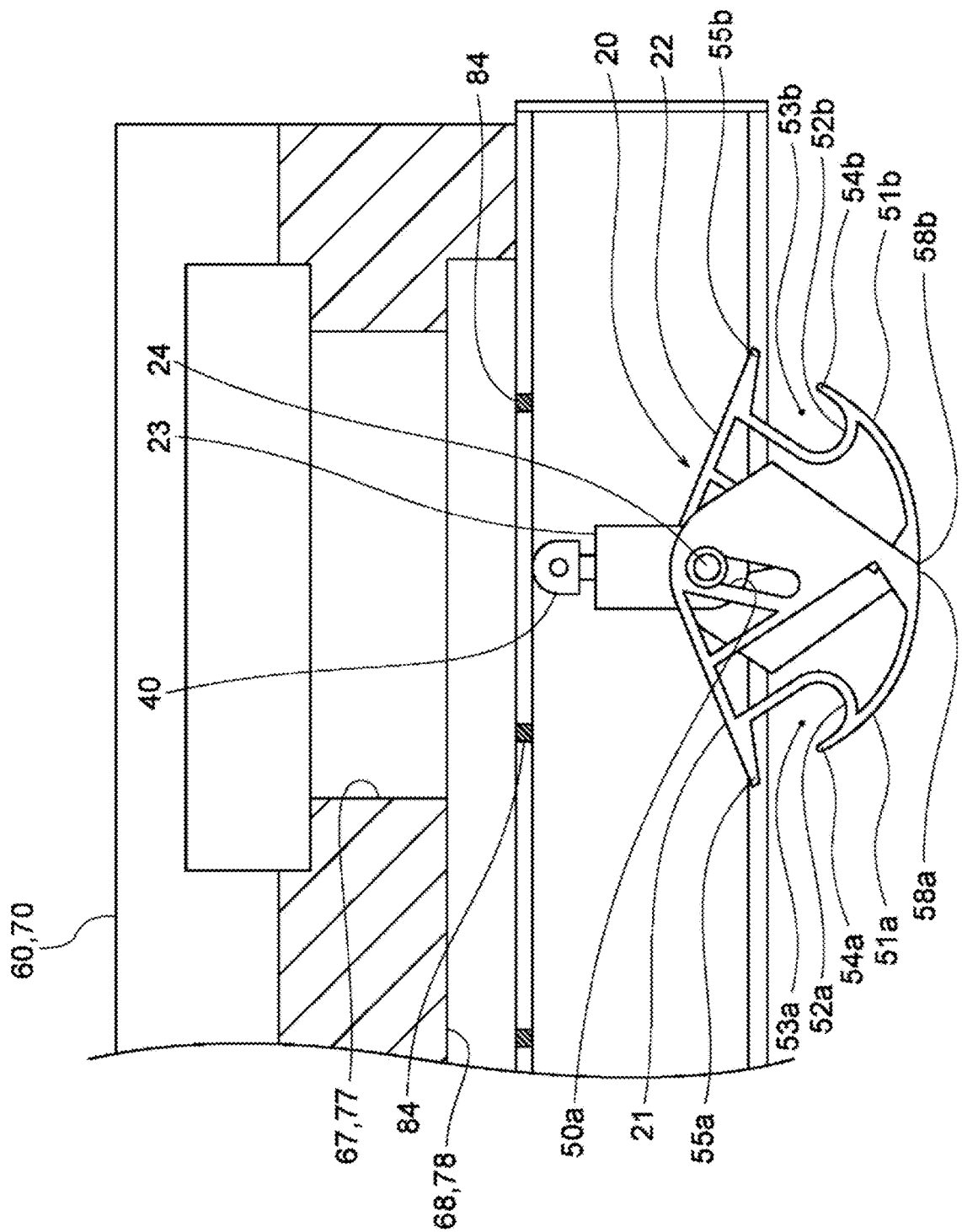
FIG. 27 is a sectional view showing a twelfth state of the attachment holes of the first and second height difference filling members, according to the first embodiment.

FIG. 27 is a sectional view showing a twelfth state of the attachment hole 67, 77 of the first and second height difference filling members 60, 70. When the detachable member 20 moves to the vertical direction lower side of the grille 84, the release arm 55a and the release arm 55b separate from the grille 84 so as to no longer be supported by the grille 84. As a result, the detachable member 20 enters the initial state.

Figure 28:
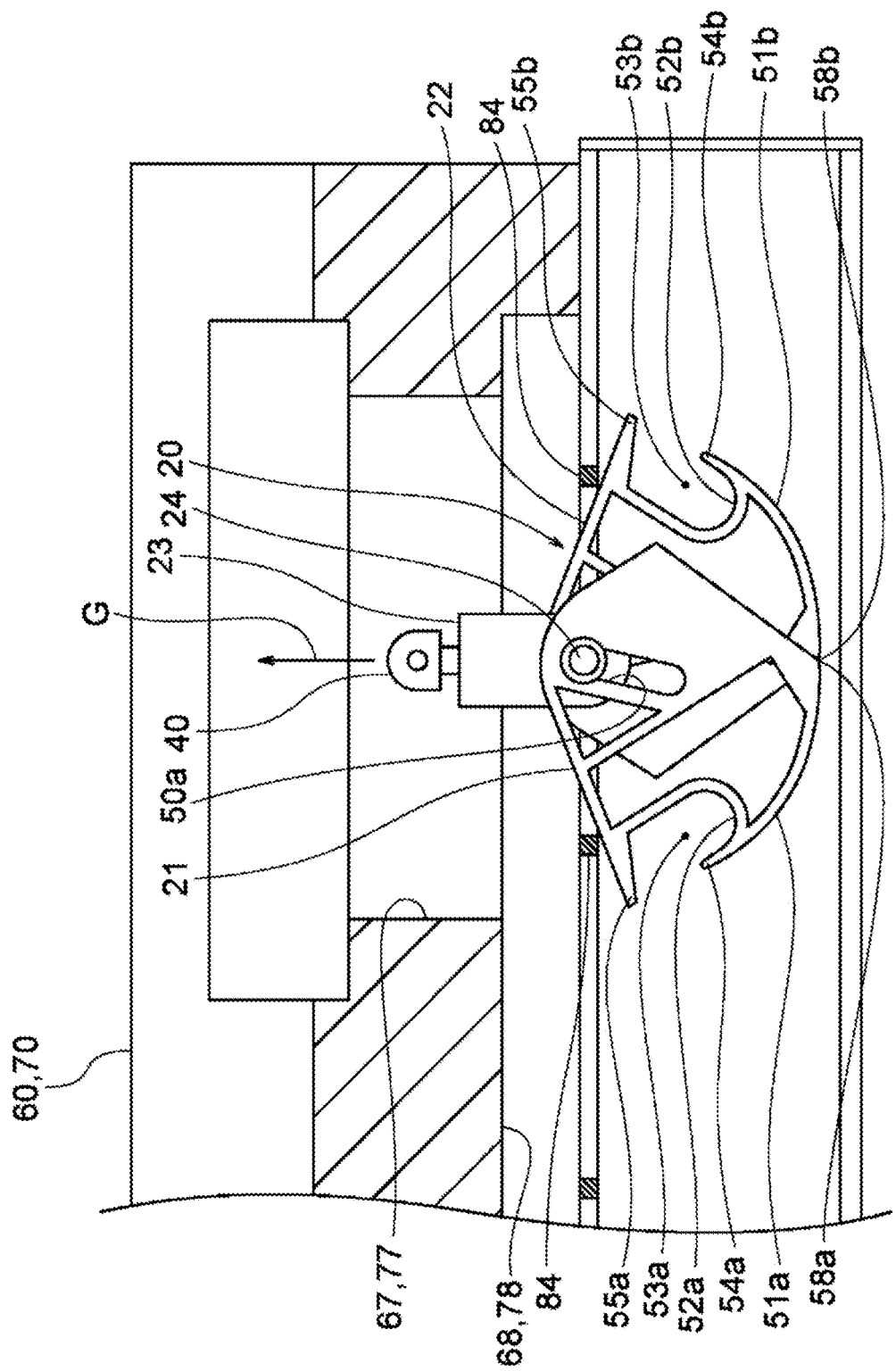
FIG. 28 is a sectional view showing a thirteenth state of the attachment holes of the first and second height difference filling members, according to the first embodiment.

FIG. 28 is a sectional view showing a thirteenth state of the attachment hole 67, 77 of the first and second height difference filling members 60, 70. Next, when the height difference filling member coupling member 30 (see FIG. 21) is pulled up in the direction of the arrow G, i.e., toward the vertical direction upper side, the detachable member 20 is pulled up in the direction of the arrow G. As a result, the release arm 55a of the first coupling member 21 comes into contact with the grille 84, and the release arm 55b of the second coupling member 22 comes into contact with the grille 84.

Figure 29:
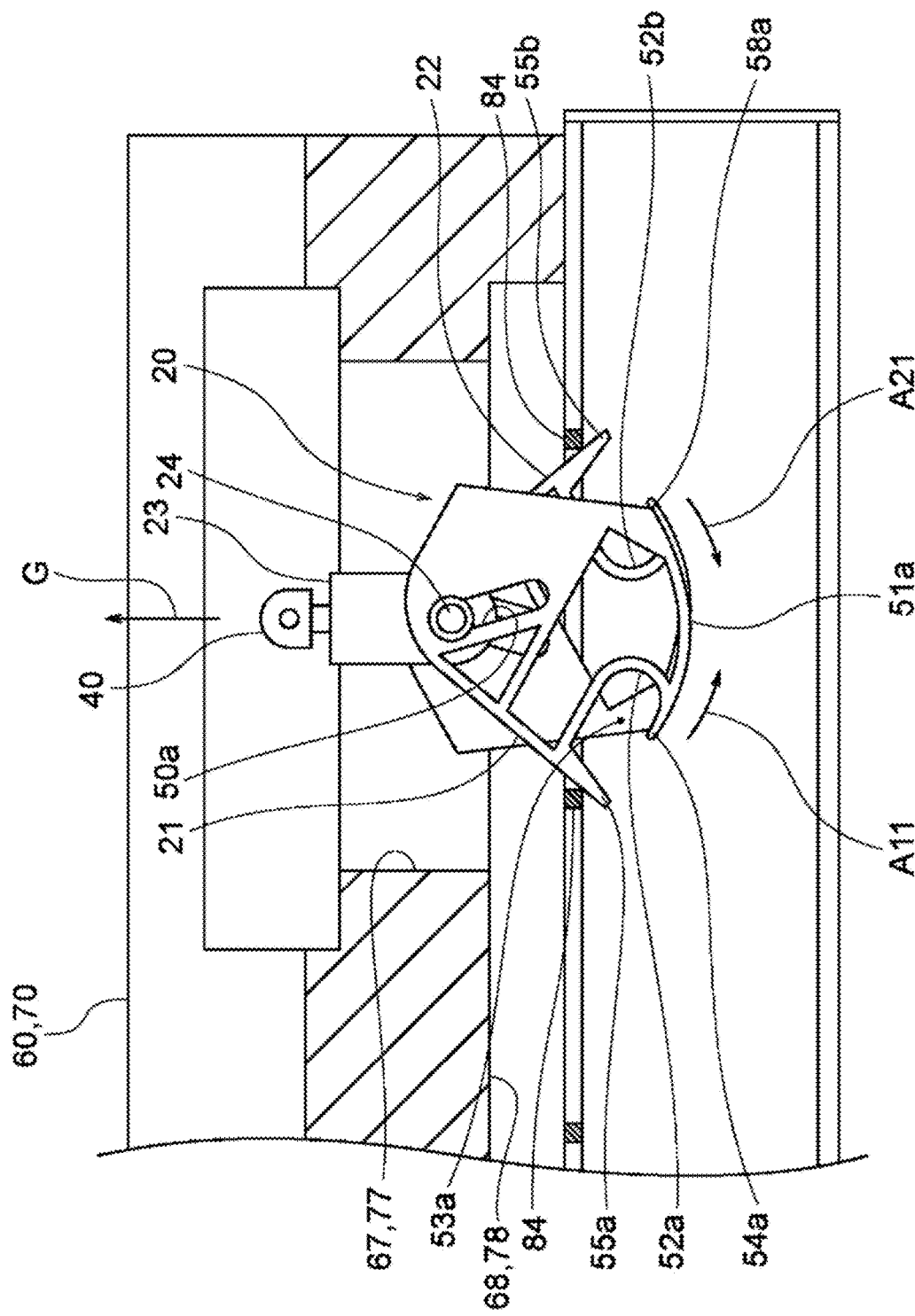
FIG. 29 is a sectional view showing a fourteenth state of the attachment holes of the first and second height difference filling members, according to the first embodiment.

FIG. 29 is a sectional view showing a fourteenth state of the attachment hole 67, 77 of the first and second height difference filling members 60, 70. When the detachable member 20 is pulled up further in the direction of the arrow G, the release arm 55a of the first coupling member 21 is pressed toward the lower side by the grille 84 so as to move toward the lower side, whereby the first coupling member 21 rotates in the direction of the arrow A10. Further, the release arm 55b of the second coupling member 22 is pressed toward the lower side by the grille 84 so as to move toward the lower side, whereby the second coupling member 22 rotates in the direction of the arrow A20. Next, when the detachable member is pulled up even further in the direction of the arrow G, the release arms 55a, 55b pass through the grille 84 such that contact thereof with the grille 84 is released.

Figure 30:
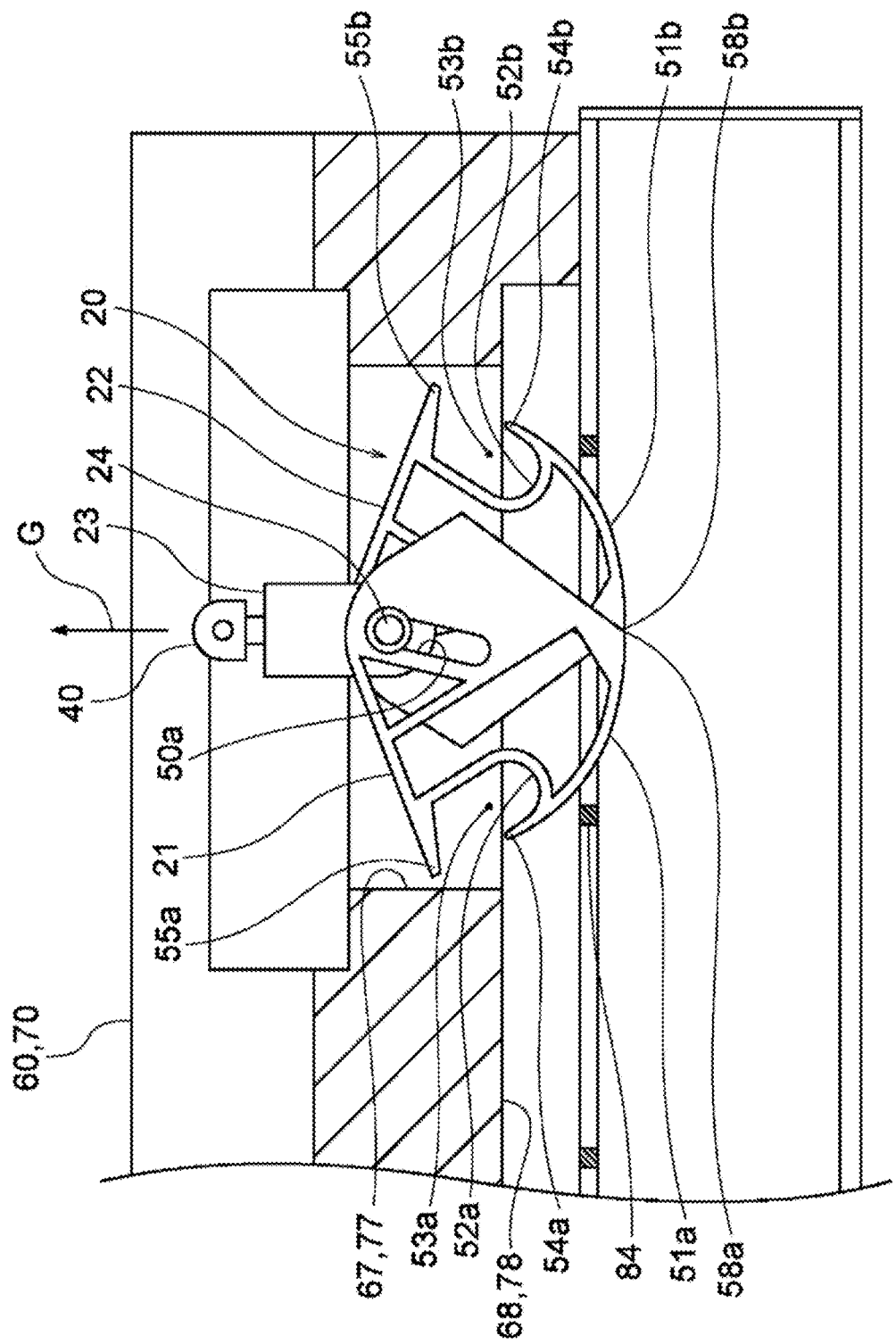
FIG. 30 is a sectional view showing a fifteenth state of the attachment holes of the first and second height difference filling members, according to the first embodiment.

FIG. 30 is a sectional view showing a fifteenth state of the attachment hole 67, 77 of the first and second height difference filling members 60, 70. When the contact between the release arms 55a, 55b and the grille 84 is released, the detachable member 20 enters the initial state. Next, the height difference filling member coupling member 30 (see FIG. 21) is pulled up in the direction of the arrow G, i.e., toward the vertical direction upper side, so as to be removed from the attachment hole 67, 77, and as a result, the couplings formed by the coupling device 10 between the first and second height difference filling members 60, 70 and the grating 81 are released. Note that likewise in relation to the other attachment hole 67, 77 of the first and second height difference filling members 60, 70, by similarly removing the bolts inserting the height difference filling member coupling member into the attachment hole 67, 77, and then pulling the height difference filling member coupling member 30 up toward the vertical direction upper side, the coupling formed by the coupling device between the second height difference filling member 70 and the grating 81 is released.

Hence, with the coupling device 10 and the methods for coupling the grille 84 to the first and second height difference filling members 60, 70 using the coupling device 10 according to the first embodiment, the detachable member 20 that can be attached to and detached from the grille 84, the first coupling member 21 and second coupling member 22 provided on the detachable member 20, and the connecting member 23 provided on the detachable member 20 in order to connect the first coupling member 21 to the second coupling member 22 are provided, the first coupling member 21 and the second coupling member 22 respectively include the elongated holes 50a, 50b, the arc-shaped portions 51a, 51b, which are provided on the outer peripheral lower portions of the first and second coupling members 21, 22 and in which the tongue portions 54a, 54b are positioned on the upper side of the bend portions 58a, 58b, and the semicircular arc portions 52a, 52b, which are provided on the tongue portions 54a, 54b of the arc-shaped portions 51a, 51b and can be coupled to the grille 84, and the connecting member 23 includes the at least one fixing shaft 24 that extends in the horizontal direction and is inserted into the respective elongated holes 50a, 50b of the first and second coupling members 21, 22. The first and second coupling members 21, 22 are provided so as to be capable of rotating about the fixing shaft 24 and moving relative to the fixing shaft 24 when the fixing shaft 24 is inserted into the elongated hole 50a, and when the detachable member 20 moves toward the lower side while the first coupling member 21 and the second coupling member 22 are not coupled to the grille 84, the arc-shaped portions 51a, 51b of the first and second coupling members 21, 22 are respectively pressed by the grille 84, whereby the first and second coupling members 21, 22 rotate about the fixing shaft 24 such that the tongue portions 54a, 54b move toward the upper side and move relative to the fixing shaft 24 such that the distance from the arc-shaped portion 51a of the first coupling member 21 to the arc-shaped portion 51b of the second coupling member 22 decreases. Next, when the detachable member 20 moves further toward the lower side such that the grille 84 separates from the arc-shaped portions 51a, 51b of the first and second coupling members 21, 22, the first and second coupling members 21, 22 move relative to the fixing shaft 24 in a direction for increasing the distance from the arc-shaped portion 51*a* of the first coupling member 21 to the arc-shaped portion 51*b* of the second coupling member 22. Next, when the detachable member 20 moves toward the upper side, the respective semicircular arc portions 52*a*, 52*b* of the first and second coupling members 21, 22 are connected to the grille 84 such that the detachable member is coupled to the grille 84. Thus, the first and second height difference filling members 60, 70 can easily be coupled to the grating 81 in a reduced number of steps.

Furthermore, the first coupling member 21 and the second coupling member 22 respectively include the release arms 55*a*, 55*b*, which are provided on the upper side relative to the semicircular arc portions 52*a*, 52*b* and extend in a direction that intersects a direction extending along the arc-shaped portions 51*a*, 51*b*, and when the detachable member 20 moves toward the lower side while the respective semicircular arc portions 52*a*, 52*b* of the first and second coupling members 21, 22 are connected to the grille 84, the release arms 55*a*, 55*b* of the first and second coupling members are pressed from the lower side toward the upper side by the grille 84, whereby the first and second coupling members 21, 22 rotate about the fixing shaft 24 such that the release arms 55*a*, 55*b* move toward the upper side. Next, when the detachable member 20 moves further toward the lower side such that the release arms 55*a*, 55*b* of the first and second coupling members 21, 22 separate from the grille 84, the first and second coupling members 21, 22 rotate about the fixing shaft 24 such that the release arms 55*a*, 55*b* move toward the lower side. Next, when the detachable member 20 moves toward the upper side, the release arms 55*a*, 55*b* of the first and second coupling members 21, 22 are pressed by the grille 84 from the upper side toward the lower side, whereby the first and second coupling members 21, 22 rotate about the fixing shaft 24 such that the release arms 55*a*, 55*b* move toward the lower side, with the result that the coupling between the detachable member 20 and the grille 84 is released. Thus, the couplings between the grating 81 and the first and second height difference filling members 60, 70 can easily be released in a reduced number of steps.

Moreover, the contact portions of the first coupling member 21 and the second coupling member 22 are the arc-shaped portions 51*a*, 51*b*, and therefore the first coupling member 21 and the second coupling member can be rotated smoothly when the arc-shaped portions 51*a*, 51*b* are pressed by the grille 84.

Furthermore, the joint member 40 having biaxial degrees of freedom is provided to connect the connecting member 23 to the height difference filling member coupling member 30, and therefore the first and second height difference filling members 60, 70 can easily be fixed to the grille 84 of the grating 81.

Note that although in the first embodiment, the first lightening hole 56*a* and the second lightening hole 57*a* are formed in the first coupling member 21 and the first lightening hole 56*b* and the second lightening hole 57*b* are formed in the second coupling member 22, these lightening holes do not have to be formed.

Further, in the first embodiment, the first coupling member 21 includes the semicircular arc portion 52*a* and the second coupling member 22 includes the semicircular arc portion 52*b*, but the semicircular arc portions 52*a*, 52*b* are not limited to a semicircular arc shape and may be any hook-shaped portions that can be coupled to the grille 84. For example, the semicircular arc portions 52*a*, 52*b* may be hook-shaped portions including a bend portion.

Moreover, in the first embodiment, the first coupling member 21, the second coupling member 22, and the connecting member 23 are formed from a metallic material such as stainless steel, for example, but as long as sufficient strength can be secured, these members may be formed from a different metallic material such as aluminum alloy, for example. Alternatively, these members may be formed from a non-metallic material such as resin.

Additionally, in the first embodiment, the planar surfaces of the first height difference filling member 60 and the second height difference filling member 70 are formed from polyurea resin, but taking strength, durability, and so on into consideration, the surfaces may be formed from another resin material or a metallic material as desired. Moreover, the respective interiors of the first height difference filling member 60 and the second height difference filling member 70 are formed from any known foamed material, but taking strength, durability, and so on into consideration, the interiors may be formed from another resin material or a metallic material as desired.

Second Embodiment

Next, a coupling device according to a second embodiment of this invention will be described. Note that in the following embodiments, identical reference symbols to the reference symbols used in FIGS. 1 to 30 of the first embodiment denote identical or similar constituent elements, and therefore detailed description thereof has been omitted. The coupling device according to the second embodiment differs from the first embodiment in that the shape of the first coupling member and the shape of the second coupling member have been modified.

Figure 31:
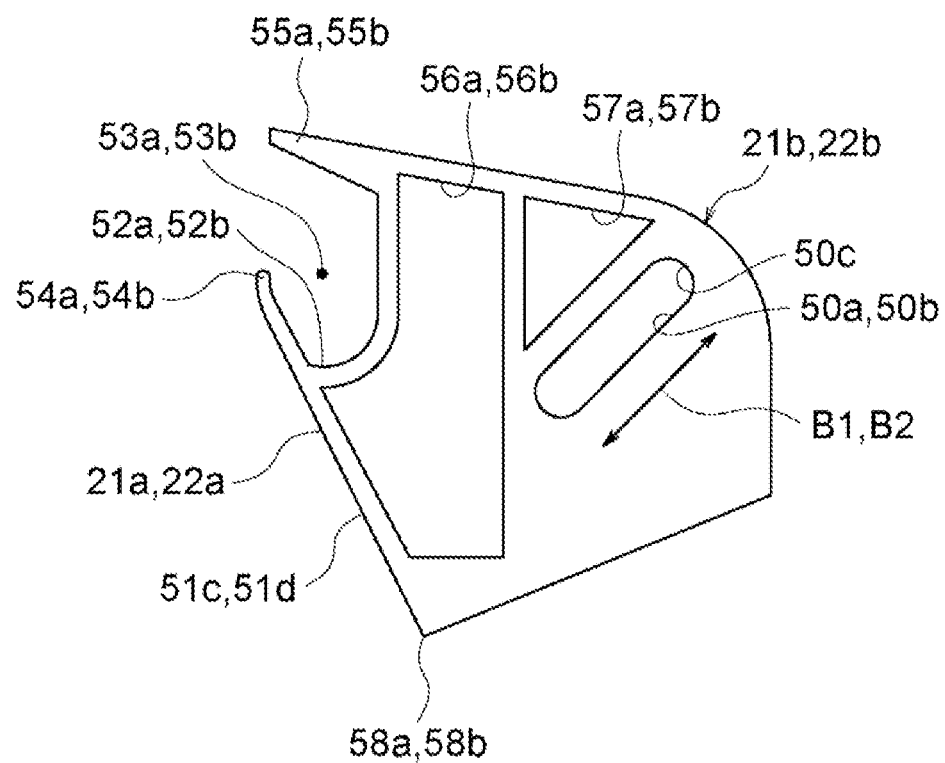
FIG. 31 is a front view of a first coupling member and a second coupling member according to a second embodiment.

FIG. 31 is a front view of a first coupling member 21*b* and a second coupling member 22*b* according to the second embodiment. A rectilinear portion 51*c* is provided on the outer peripheral portion 21*a* of the first coupling member 21*b* on an extension of the extension direction of the elongated hole 50*a*. A rectilinear portion 51*d* is provided on the outer peripheral portion 22*a* of the second coupling member 22*b* on an extension of the extension direction of the elongated hole 50*b*.

Figure 32:
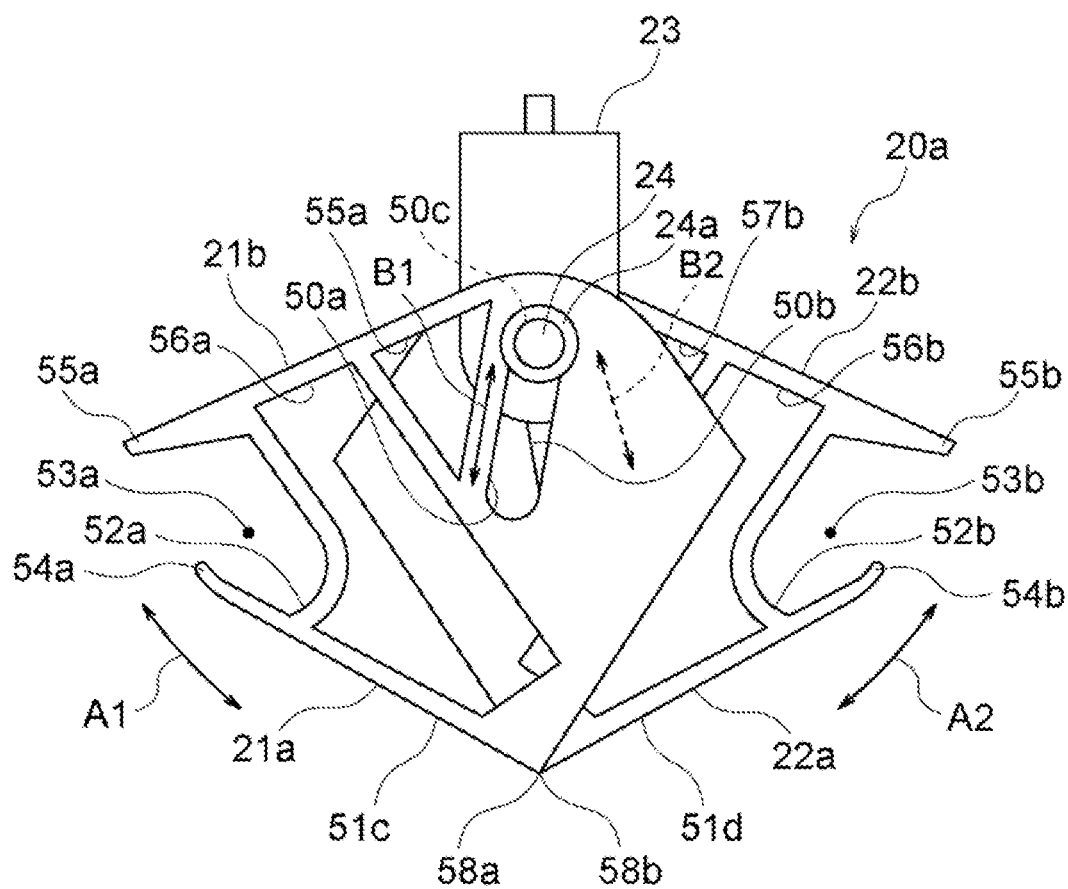
FIG. 32 is a front view showing an initial state of a detachable member provided on a coupling device according to the second embodiment.

FIG. 32 is a front view showing an initial state of a detachable member 20*a* provided in the coupling device according to the second embodiment. The detachable member 20*a* includes the first coupling member 21*b* and the second coupling member 22*b*. In the initial state, the rectilinear portion 51*c* of the first coupling member 21*b* and the rectilinear portion 51*d* of the second coupling member 22*b* constitute inclined portions that are inclined relative to the horizontal direction. Note that the rectilinear portions 51*c*, 51*d* constitute the contact portion. All other aspects are identical to the first embodiment.

By forming the contact portions of the first coupling member 21*b* and the second coupling member 22*b* from the rectilinear portions 51*c* and 51*d* in this manner, the first coupling member 21*b* and the second coupling member 22*b* can be molded more easily than when arc-shaped portions are used, and as a result, the component manufacturing cost can be reduced.

Third Embodiment

Next, a coupling device according to a third embodiment of this invention will be described. The coupling device according to the third embodiment is used in place of a hook of a crane device.

Figure 33:
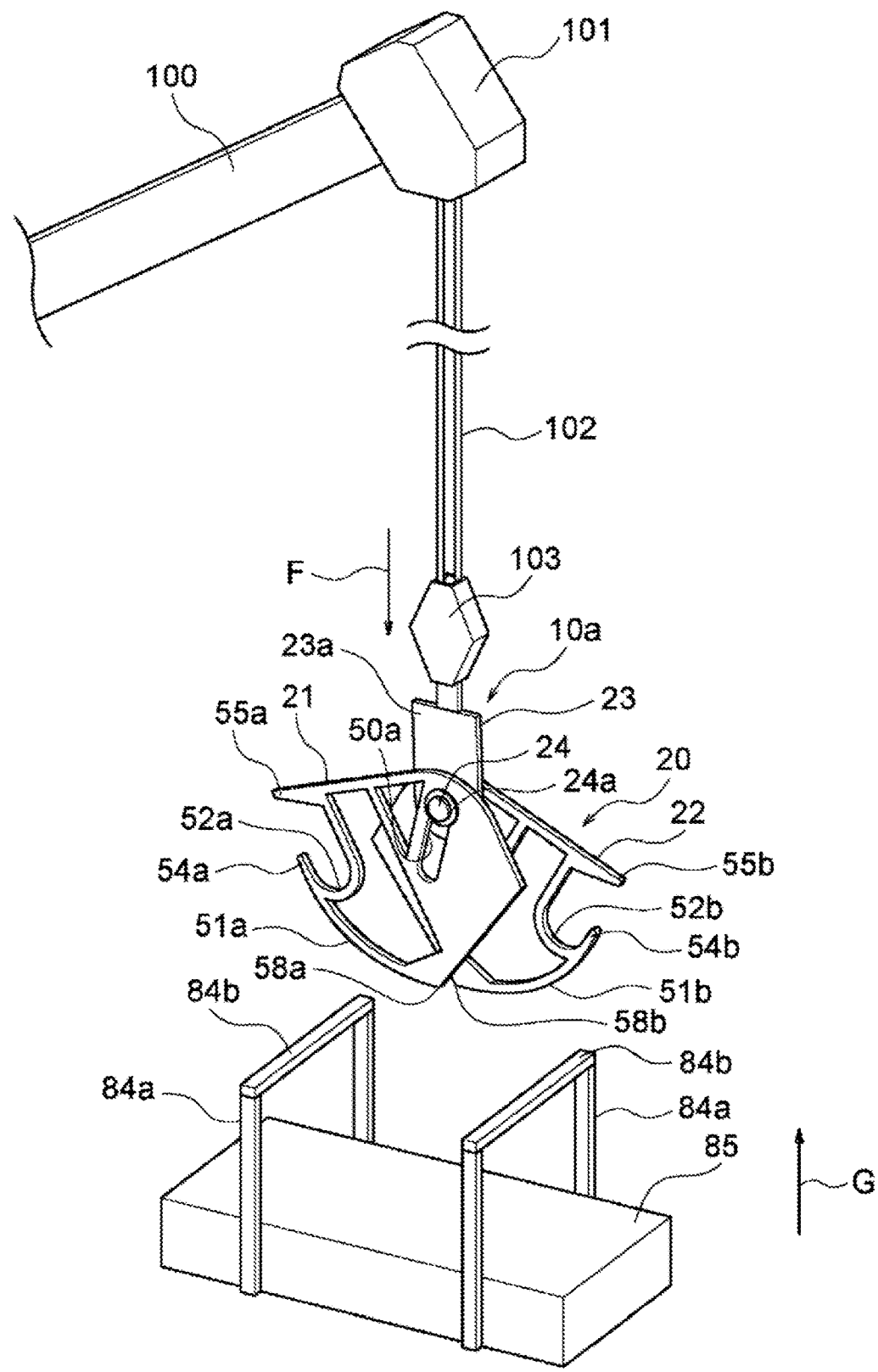
FIG. 33 is a schematic view showing a method of using a coupling device according to a third embodiment.

FIG. 33 is a schematic view showing a method of using a coupling device 10a according to the third embodiment. The coupling device is attached to a lower portion of a hook block 103 suspended from a wire rope 102 on a tip end portion 101 of a boom 100 of a crane device. Further, the coupling device 10a includes the connecting member 23 and the detachable member 20. More specifically, the connecting member 23 is provided on the boom 100 of the crane device via the wire rope 102 and the hook block 103. Note that the boom 100 constitutes the second coupling subject member, and the hook block 103 constitutes a third coupling member. All other configurations are identical to the first and second embodiments.

Two frame-shaped suspension fittings 84a are attached to a suspension subject 85 to be suspended from the crane device of the third embodiment. The suspension fittings 84a each include a horizontal member 84b that extends in the horizontal direction. Further, the suspension fittings 84a are arranged so that an interval between the respective horizontal members 84b is identical to the interval between adjacent bars of the grille 84 (see FIG. 10) according to the first embodiment. Note that the suspension fittings 84a constitute the first coupling subject member.

Next, an operation of the coupling device 10a according to the third embodiment will be described. When an operator operates the crane device so as to move the hook block 103 suspended from the boom 100 in the direction of the arrow F, i.e., toward the vertical direction lower side, the detachable member 20 of the coupling device 10a is inserted between the horizontal members 84b of the suspension fittings 84a in a similar manner to the first embodiment, whereby the detachable member 20 is coupled to the suspension fittings 84a in a similar manner to the first embodiment. In other words, the coupling device 10a is coupled to the suspension subject 85. Next, when the operator operates the crane device so as to move the hook block 103 in the direction of the arrow G, i.e., toward the vertical direction upper side, the suspension subject can be suspended from the crane device.

Next, the operator operates the crane device so as to move the hook block 103, whereby the suspension subject 85 is moved in the direction of the arrow F in an unloading position, and once the suspension subject 85 has touched the ground, the hook block 103 is moved in the direction of the arrow G. As a result, the coupling between the detachable member 20 and the suspension fittings 84a is released.

In a conventional crane device, a suspension subject is suspended from the crane by slinging a rope of the suspension subject onto a hook provided on a hook block suspended from a crane arm, and therefore, with this type of conventional crane device, the operator has to perform a slinging operation each time, leading to an increase in the number of steps of the suspension operation performed by the crane device.

As described above, however, by using the boom 100 of the crane device as the second coupling subject member and coupling and uncoupling the detachable member 20 to and from the respective suspension fittings 84a, the boom 100 can be coupled to the suspension fittings 84a, and as a result, the suspension subject can be suspended from the crane device in a smaller number of steps than with a conventional crane device.

Note that in the third embodiment, the coupling device is provided on the tip end portion 101 of the boom 100 of the crane device, but the invention is not limited to this example. Instead, for example, the coupling device 10a may be provided on a hoist-type crane device disposed on a ceiling of a facility or provided on another crane device as desired.

Further, in the third embodiment, a single coupling device 10a is used, but by suspending two or more coupling devices from the hook block 103 using a wire rope or the like and coupling the coupling devices 10a to the grille 84 (see FIG. 8) of the grating 81 at predetermined intervals, the coupling devices 10a can also be used as suspension jigs for suspending the grating 81.

Fourth Embodiment

Next, a coupling device according to a fourth embodiment of this invention will be described. The coupling device according to the fourth embodiment is used as a prize-acquiring crane device of a prize acquiring device generally known as a crane game. Note that in the fourth embodiment, identical reference symbols to the reference symbols used in FIG. 33 of the third embodiment denote identical or similar constituent elements, and therefore detailed description thereof has been omitted.

Figure 34:
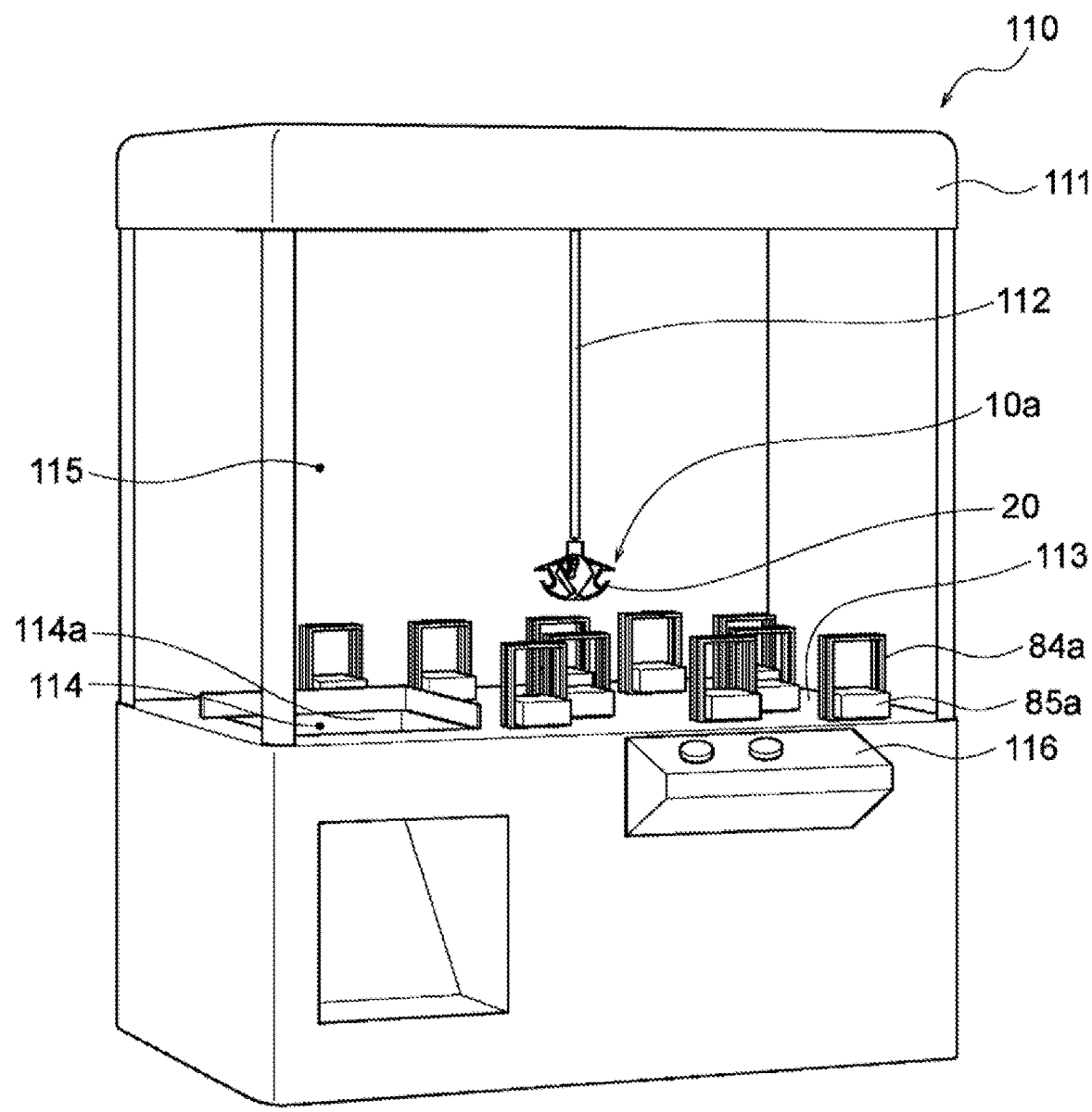
FIG. 34 is a schematic view showing a prize acquiring device according to a fourth embodiment.

FIG. 34 is a schematic view showing the prize acquiring device of the fourth embodiment. A known conveyance device, not shown in the figure, is provided on a ceiling portion 111 of a prize acquiring device 110 generally known as a crane game in order to move the coupling device 10a, which serves as a prize-acquiring hook device, through a game area 115 between the ceiling portion 111 and a floor portion 113. The conveyance device is provided with a well-known telescopic boom 112 for use in a crane game device, which extends toward the vertical direction lower side. The telescopic boom 112 is configured to be free to expand and contract in the vertical direction and free to rotate in an axial direction. The coupling device 10a is provided on a lower end portion of the telescopic boom 112. Note that the prize acquiring device 110 constitutes the second coupling subject member, and the telescopic boom 112 constitutes the third coupling member.

The coupling device 10a can be moved freely through the game area 115 by driving the conveyance device provided on the ceiling portion 111 and expanding and contracting the telescopic boom 112. Prizes 85a having parallelepiped-shaped packaging boxes to which the two frame-shaped suspension fittings 84a are attached in parallel with each other are arranged in appropriate positions on the floor portion 113. Further, a prize discharge port 114 that communicates with the outside of the prize acquiring device 110 is formed within a fixed range of the floor portion 113. The prize discharge port 114 includes a freely openable and closeable lid portion 114a. Furthermore, an operating panel 116 is provided on a front surface of the prize acquiring device 110. All other configurations are identical to the third embodiment.

Next, an operation of the prize acquiring device 110 according to the fourth embodiment will be described. A player drives the conveyance device on the ceiling portion 111 and causes the telescopic boom 112 to expand and contract in the vertical direction and rotate in the axial direction by operating the operating panel 116 of the prize acquiring device 110, and in doing so moves the coupling device 10a through the game area 115. Next, when the coupling device 10a moves toward the vertical direction lower side above one of the prizes 85a, the detachable member 20 of the coupling device 10a is inserted between the suspension fittings 84a such that the detachable member 20 is coupled to the suspension fittings 84a in a similar manner to the third embodiment. Thus, the coupling device 10 can be coupled to the prize 85a, and the prize 85a can be lifted up from the floor portion 113 and moved.

Next, with the lid portion 114a of the prize discharge port 114 in a closed state, the coupling device 10a is moved toward the vertical direction lower side above the prize discharge port 114 by operating the conveyance device and the telescopic boom 112, whereupon the prize 85a is lowered onto the lid portion 114a. Next, the coupling device 10a is moved toward the vertical direction upper side by operating the telescopic boom 112. As a result, the coupling between the detachable member 20 and the suspension fittings 84a is released. Next, when the lid portion 114a is opened, the prize is dropped through the prize discharge port 114 and discharged to the outside of the prize acquiring device 110.

As described above, by using the prize acquiring device 110 as the second coupling subject member and coupling the detachable member 20 to the respective suspension fittings 84a, the telescopic boom 112 can be coupled to the prize 85a and the prize can be acquired. Thus, it is possible to provide a prize acquiring device that provides different gameplay to a conventional prize acquiring device 110.

Note that the prize acquiring device 110 described in the fourth embodiment is cited as an example, but the coupling device 10a may be used as a prize-acquiring crane device of any other known type of prize acquiring device.

Fifth Embodiment

Next, a coupling device according to a fifth embodiment of this invention will be described. The coupling device according to the fifth embodiment is provided on a bottom portion of a drone. Note that in the fifth embodiment, identical reference symbols to the reference symbols used in FIG. 34 of the fourth embodiment denote identical or similar constituent elements, and therefore detailed description thereof has been omitted.

Figure 35:
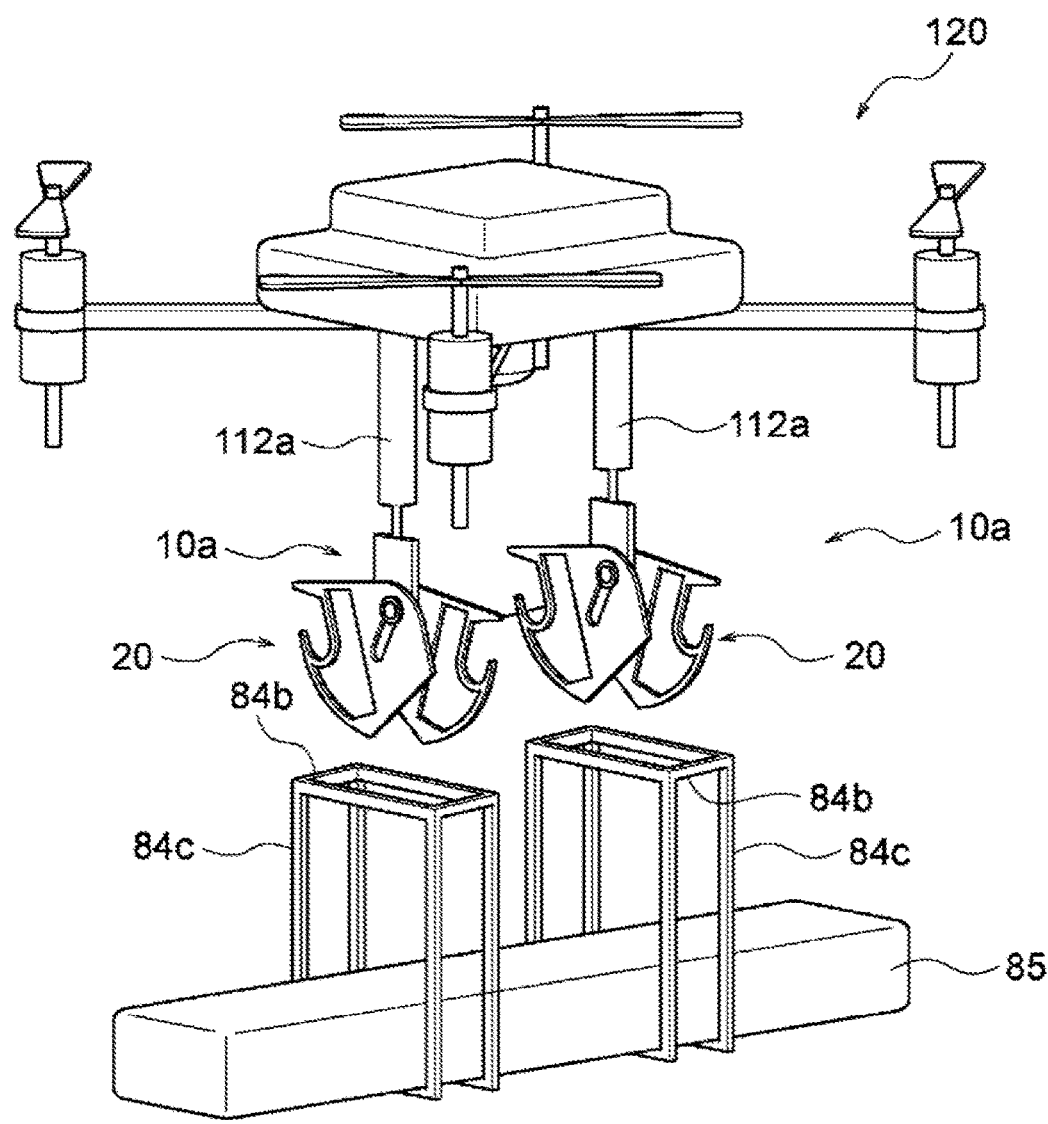
FIG. 35 is a schematic view of a coupling device according to a fifth embodiment.

FIG. 35 is a schematic view of the coupling device according to the fifth embodiment. Two coupling devices 10a are provided on a bottom portion of a drone 120. Each coupling device is connected to the bottom portion of the drone 120 via a suspension boom 112a. Note that the drone 120 constitutes the second coupling subject member, and the suspension boom 112a constitutes the third coupling member.

Two frame-shaped suspension fittings 84c are attached to the suspension subject 85 to be suspended from the detachable member 20 of the coupling device 10a according to the fifth embodiment. The suspension fittings 84a are formed by connecting corner portions of two rectangular frame-shaped fittings provided parallel to each other by the two horizontal members 84b. Further, the suspension fittings 84c are arranged so that an interval between the respective horizontal members 84b is identical to the interval between adjacent bars of the grille 84 (see FIG. 10) according to the first embodiment. Note that the suspension fittings 84c constitute the first coupling subject member. All other configurations are identical to the fourth embodiment.

Next, an operation of the coupling device 10a according to the fifth embodiment will be described. When an operator operates the drone 120 so as to insert the detachable members 20 of the respective coupling devices 10a suspended from the suspension boom 112a between the horizontal members 84b of the suspension fittings 84c, the detachable members 20 are coupled to the suspension fittings 84c, whereby the suspension subject 85 can be suspended from the drone 120. Further, when the operator operates the drone 120 so as to place the suspension subject 85 in an unloading position while the suspension subject 85 is suspended from the drone 120, the couplings between the detachable members 20 and the suspension fittings 84c are released.

Furthermore, according to the fifth embodiment, two coupling devices 10a are provided for each drone 120, and therefore the suspension subject 85 can be transported with more stability than when a single coupling device 10a is provided.

As described above, by using the drone 120 as the second coupling subject member of the fifth embodiment and providing at least two detachable members 20 for each drone 120, the stability with which the suspension subject 85 is suspended from the drone 120 is improved.

Sixth Embodiment

Next, a coupling device according to a sixth embodiment of this invention will be described. The coupling device according to the sixth embodiment differs from the fifth embodiment in that a guide bar member is provided to perform positioning between the coupling device and the suspension fitting attached to the suspension subject. Note that in the sixth embodiment, identical reference symbols to the reference symbols used in FIG. 35 of the fifth embodiment denote identical or similar constituent elements, and therefore detailed description thereof has been omitted.

Figure 36:
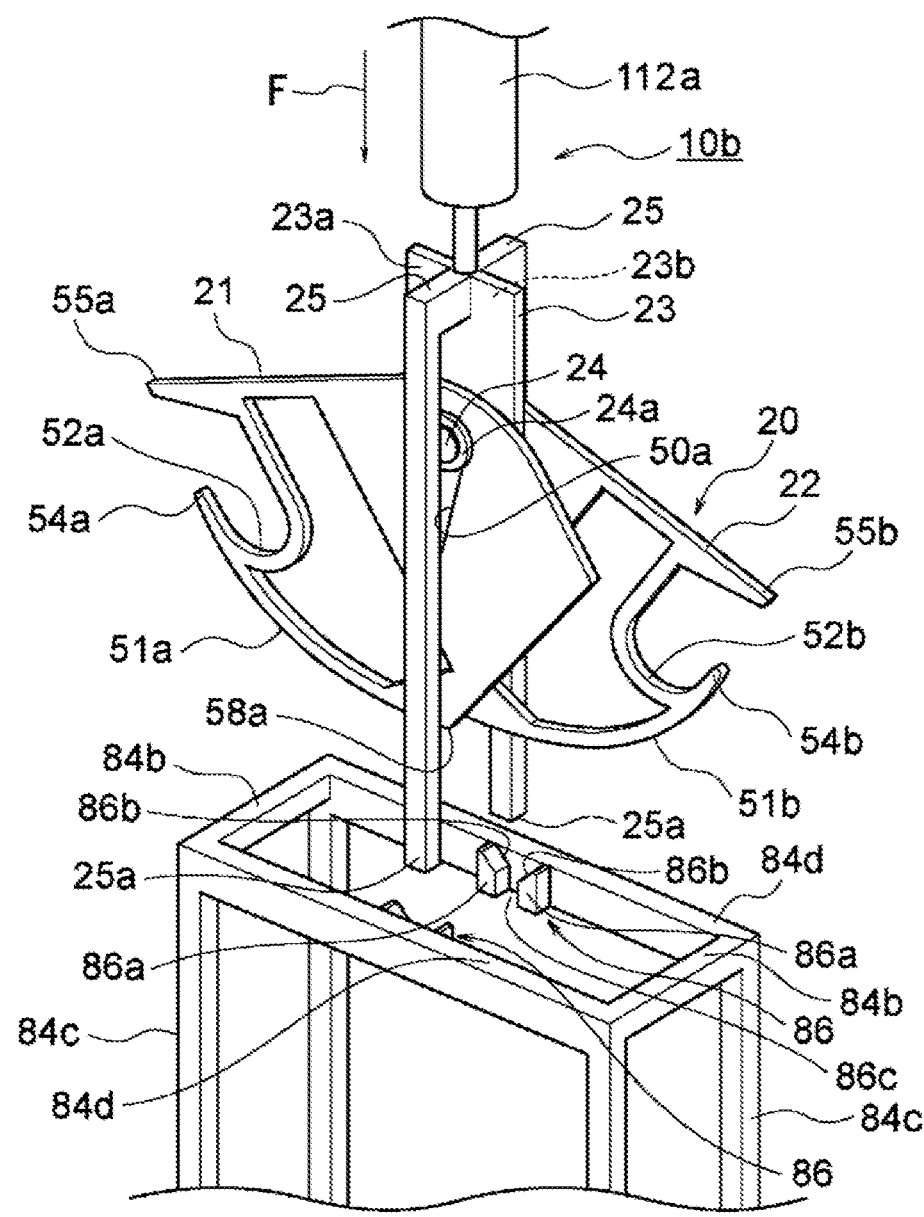
FIG. 36 is a schematic view of a coupling device according to a sixth embodiment.

FIG. 36 is a schematic view of a coupling device 10b according to the sixth embodiment. A guide bar member 25 is formed on each of the front surface 23a and the rear surface 23b of the connecting member 23 of the coupling device 10b so as to extend from an upper portion thereof toward the vertical direction lower side. The detachable member 20 is positioned between the guide bar members 25.

A guide 86 is formed in a central portion of each of two longitudinal members 84d that are provided on the suspension fitting 84c attached to the suspension subject 85 (see FIG. 35) so as to extend in a perpendicular direction to the horizontal members 84b and connect the horizontal members 84b to each other. Each guide 86 is formed from two projecting portions 86a arranged parallel to each other so that an interval 86c extending in the vertical direction is opened therebetween, and each projecting portion 86a includes a guide inclined portion 86b on the side opposing the other projecting portion 86a on the vertical direction upper side. Note that the guides 86 constitute a guide member. All other configurations are identical to the fifth embodiment.

Next, an operation of the coupling device 10b according to the sixth embodiment will be described. The guide bar members are formed on the connecting member 23 of the coupling device so as to extend toward the vertical direction lower side, and the guides 86, each including the interval 86c that extends in the vertical direction, are formed on the respective longitudinal members 84d of the suspension fitting 84c. Therefore, when the coupling device 10b moves in the direction of the arrow F, i.e., from the vertical direction upper side to the vertical direction lower side of the suspension fitting 84c, the guide bar members 25 are inserted into the intervals 86c of the guides 86 and guided thereby. Hence, the coupling device 10b and the suspension fitting 84c can be positioned easily. Moreover, the guide inclined portions 86b are formed on the projecting portions 86a of the guides 86, and therefore the guide bar members 25 can easily be inserted into the intervals 86c of the guides 86.

As described above, the connecting member 23 includes the guide bar members 25, and the suspension fitting 84c includes the guides 86 for guiding the guide bar members 25, and therefore the coupling device 10b and the suspension fitting 84c can be positioned easily.

Note that in the sixth embodiment, the guides 86 are provided on the suspension fitting 84c, but the guides 86 may also be provided on the grille 84, the suspension fitting 84a, or the like of the first to fifth embodiments.

Seventh Embodiment

Next, a coupling device according to a seventh embodiment of this invention will be described. The coupling device according to the seventh embodiment differs from the first embodiment in that spacers are provided respectively between the connecting member and the first coupling member and between the connecting member and the second coupling member.

Figure 37:
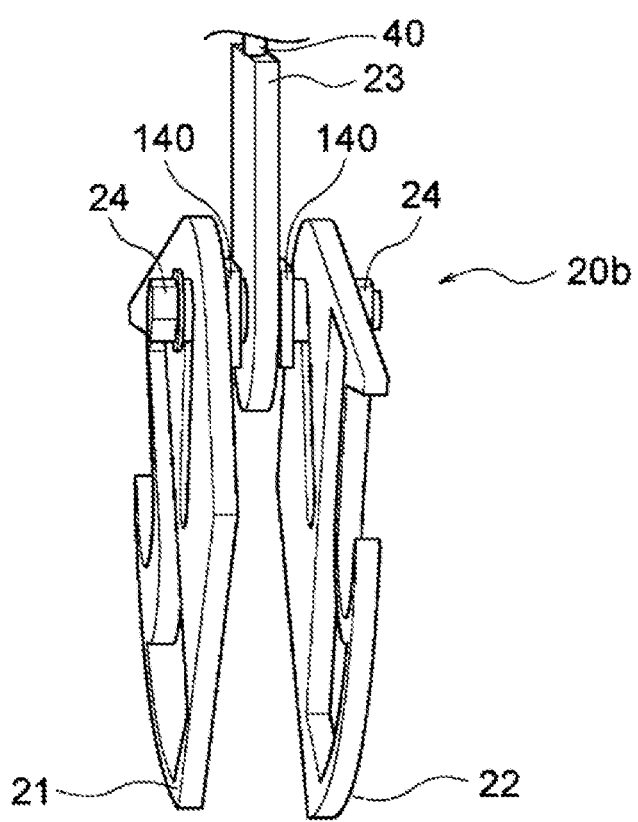
FIG. 37 is a schematic view showing a detachable member of a coupling device according to a seventh embodiment from a side face direction.

FIG. 37 is a schematic view showing a detachable member of the coupling device according to the seventh embodiment from a side face direction. A spacer 140 through which the fixing shaft 24 passes is provided between the connecting member 23 and the first coupling member 21. Further, a spacer 140 through which the fixing shaft 24 passes is provided between the connecting member 23 and the second coupling member 22. All other configurations are identical to the first embodiment.

By providing the spacers 140 respectively between the connecting member 23 and the first coupling member 21 and between the connecting member 23 and the second coupling member 22, as described above, friction between the first coupling member 21 and the second coupling member 22 can be prevented from occurring when the first coupling member 21 and second coupling member 22 rotate and move, and as a result, the first coupling member 21 and second coupling member 22 can rotate and move smoothly.

Eighth Embodiment

Next, a coupling device according to an eighth embodiment of this invention will be described. The coupling device according to the eighth embodiment differs from the first embodiment in that gears connecting the first coupling member and the second coupling member are provided.

Figure 38:
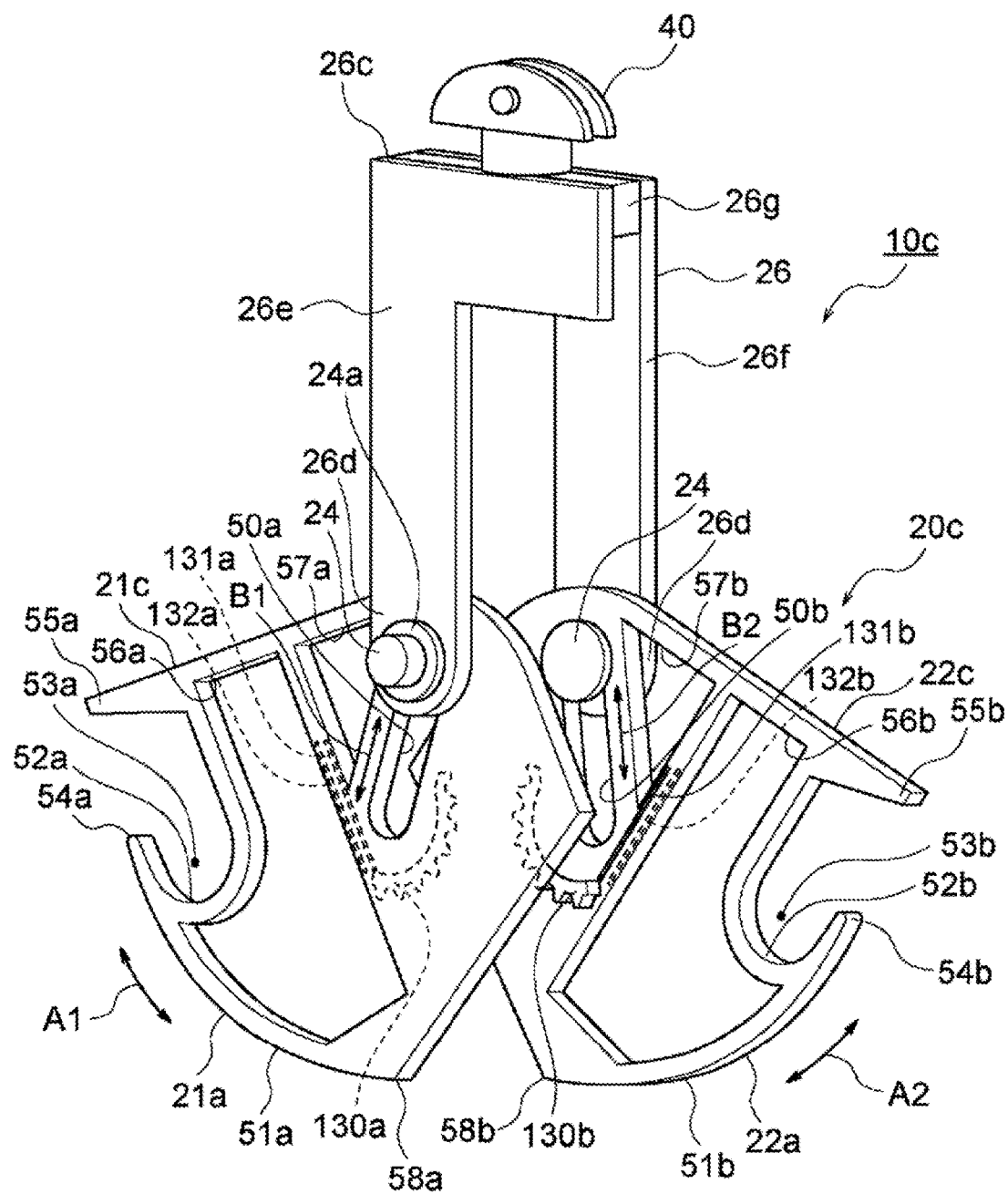
FIG. 38 is a schematic view of a coupling device according to an eighth embodiment.

FIG. 38 is a schematic view of a coupling device 10c according to the eighth embodiment. The coupling device 10c includes a connecting member 26 having an upper end portion 26c to which the joint member 40 is connected. The connecting member 26 includes a first connecting member 26e and a second connecting member 26f formed in the shape of the letter L, and a connecting member spacer 26g provided between the first connecting member 26e and the second connecting member 26f. The connecting member spacer 26g is provided in order to form an interval between the first connecting member 26e and the second connecting member 26f. An identical height difference filling member coupling member (not shown) to that of the first embodiment is connected to the joint member 40.

A first coupling member 21c, which is attached to the first connecting member 26e so as to be rotatable by the fixing shaft 24, is provided on a lower end portion 26d of the first connecting member 26e. A second coupling member 22c, which is attached to the second connecting member 26f so as to be rotatable by the fixing shaft 24, is provided on the lower end portion 26d of the second connecting member 26f. The first connecting member 26e and the second connecting member 26f are formed in an L shape, and respective front surfaces and rear surfaces of the first connecting member 26e and the second connecting member 26f are provided in opposite directions. Accordingly, the fixing shaft 24 to which the first connecting member 26e is attached and the fixing shaft 24 to which the second connecting member 26f is attached are arranged in different horizontal direction positions.

The first coupling member 21c includes an arc-shaped first gear 130a formed on the surface thereof that opposes the second coupling member 22c. The second coupling member 22c includes an arc-shaped second gear 130b formed on the surface thereof that opposes the first coupling member 21c. As will be described in detail below, the first gear 130a and the second gear 130b are formed to be capable of meshing with each other in response to the first coupling member 21c rotating in the A1 direction and moving in the B1 direction and the second coupling member 22c rotating in the A2 direction and moving in the B2 direction. Note that the first gear 130a constitutes a first arc-shaped gear, and the second gear 130b constitutes a second arc-shaped gear.

Figure 39:
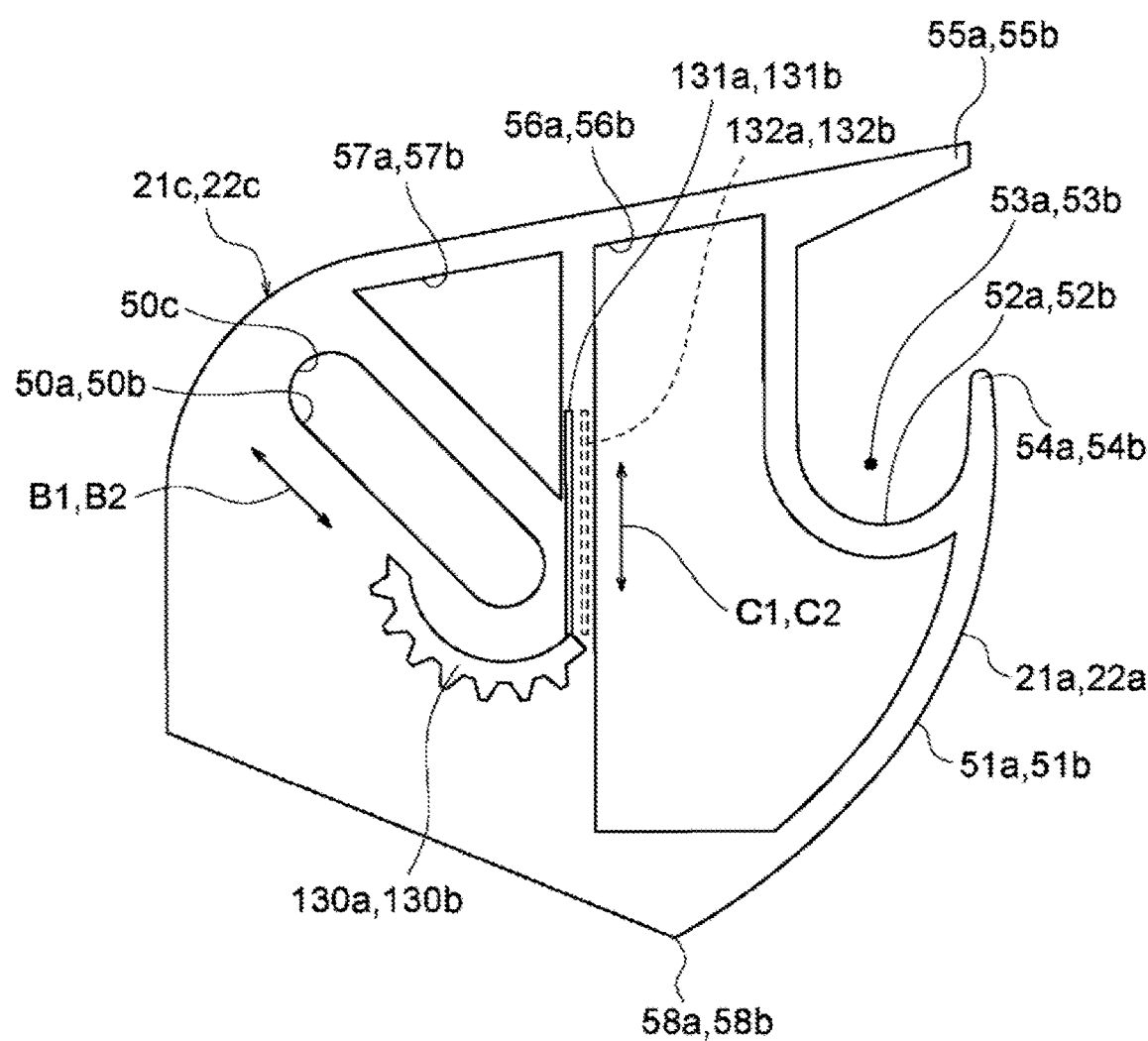
FIG. 39 is a front view showing first and second coupling members according to the eighth embodiment from a surface on which first and second gears are provided.

FIG. 39 is a front view showing the first and second coupling members 21c, 22c from the surface on which the first and second gears 130a, 130b are provided. A slit 131a, 131b is formed on an upper side of each of the first and second gears 130a, 130b so as to extend between a first lightening hole 56a, 56b and a second lightening hole 57a, 57b. An elastic member 132a, 132b is provided along the slit 131a, 131b in the interior of each of the first and second coupling members 21c, 22c.

Figure 40:
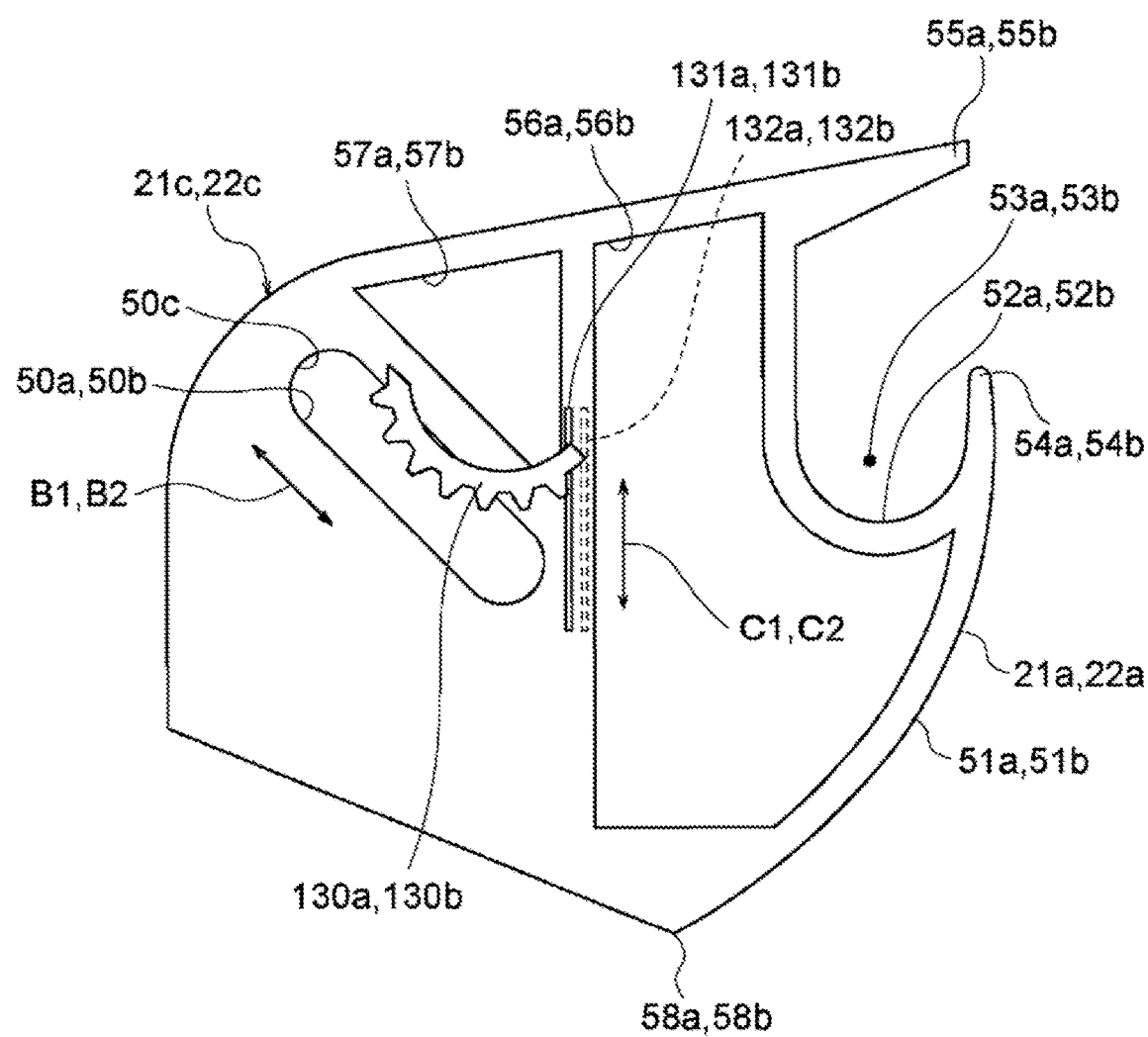
FIG. 40 is a front view showing a state in which the first and second gears shown in FIG. 39 have moved.

FIG. 40 is a front view showing a state in which the first and second gears 130a, 130b have moved. The first gear 130a is connected to the elastic member 132a through the slit 131a. Thus, as shown in FIGS. 39 and 40, the first gear 130a is provided to be capable of moving in the direction of an arrow C1, which is a direction extending along the slit 131a. Further, the second gear 130b is connected to the elastic member 132b through the slit 131b. Thus, the second gear 130b is provided to be capable of moving in the direction of an arrow C2, which is a direction extending along the slit 131b. Furthermore, the first and second gears 130a, 130b are biased by the elastic members 132a, 132b in a downward direction, as shown in FIGS. 39 and 40. Therefore, when no other external force is exerted on the first and second gears 130a, 130b, the first and second gears 130a, 130b are positioned on a lowermost side, as shown in FIG. 39. Any known elastic members, such as coil springs, for example, can be used as the elastic members 132a, 132b. All other configurations are identical to the first embodiment.

Next, a method (see FIG. 7) for coupling the first height difference filling member 60 to the grating 81 using the coupling device 10c of the eighth embodiment and a method for coupling the second height difference filling member 70 to the grating 81 using the coupling device 10c will be described. Note that the method for coupling the first height difference filling member 60 to the grating 81 using the coupling device 10c and the method for coupling the second height difference filling member 70 to the grating 81 using the coupling device 10c are identical, and therefore the methods will be described together using FIGS. 41 to 49.

Figure 41:
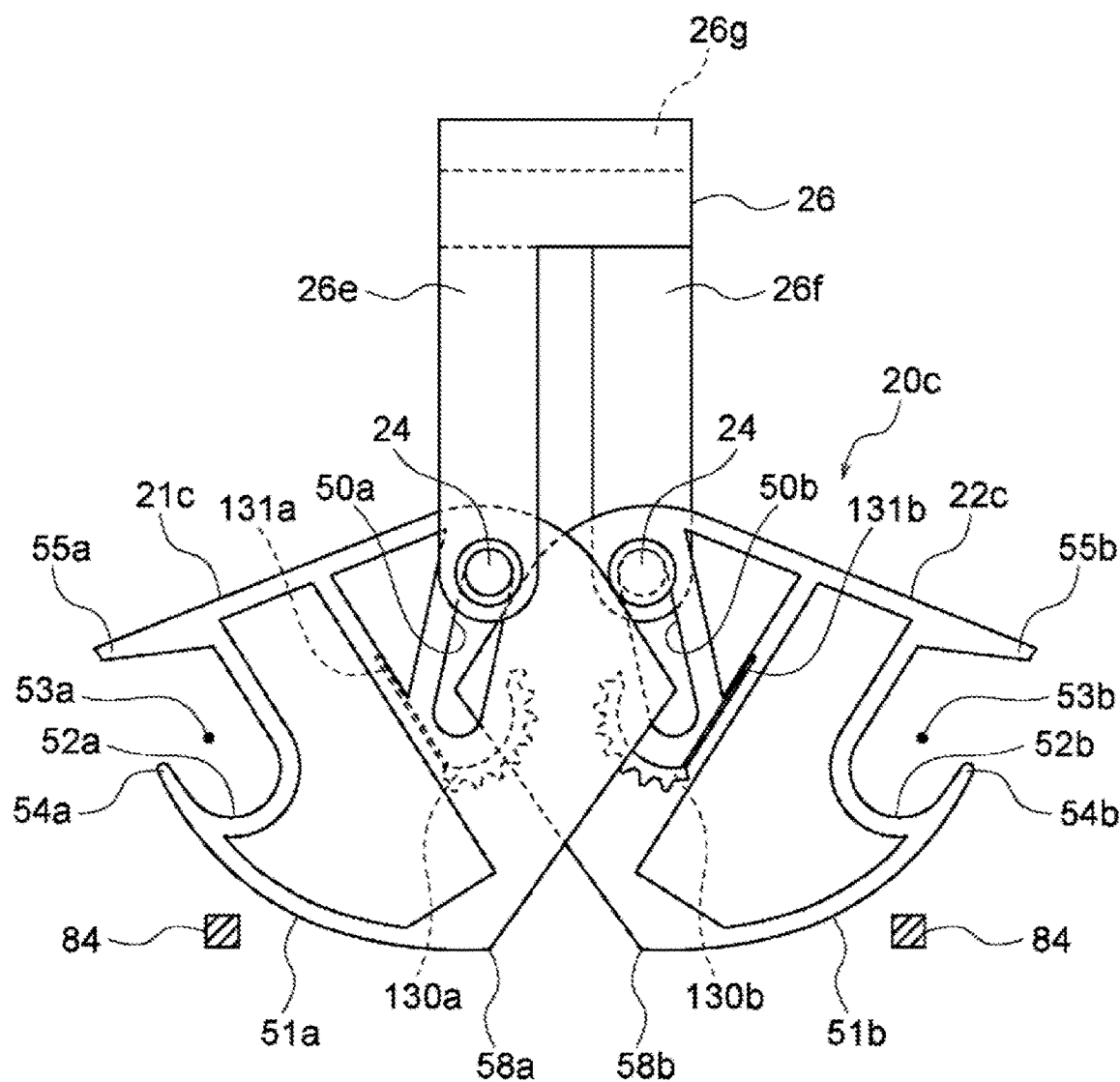
FIG. 41 is a front view showing a first state of a detachable member when first and second height difference filling members are coupled to a grating, according to the eighth embodiment.

FIG. 41 is a front view showing a first state of a detachable member 20c when the first and second height difference filling members 60, 70 are to be coupled to the grating 81 (see FIG. 7) in the eighth embodiment. Note that in the following description of the eighth embodiment, description and illustration of the first height difference filling member 60 and second height difference filling member 70 described in the first embodiment (see FIG. 10) has been omitted, and instead, the positional relationship between the detachable member 20c and the grille 84 of the grating 81 will be described. In the first state, the first coupling member 21c and second coupling member 22 of the detachable member 20c are not in contact with the grille 84.

Figure 42:
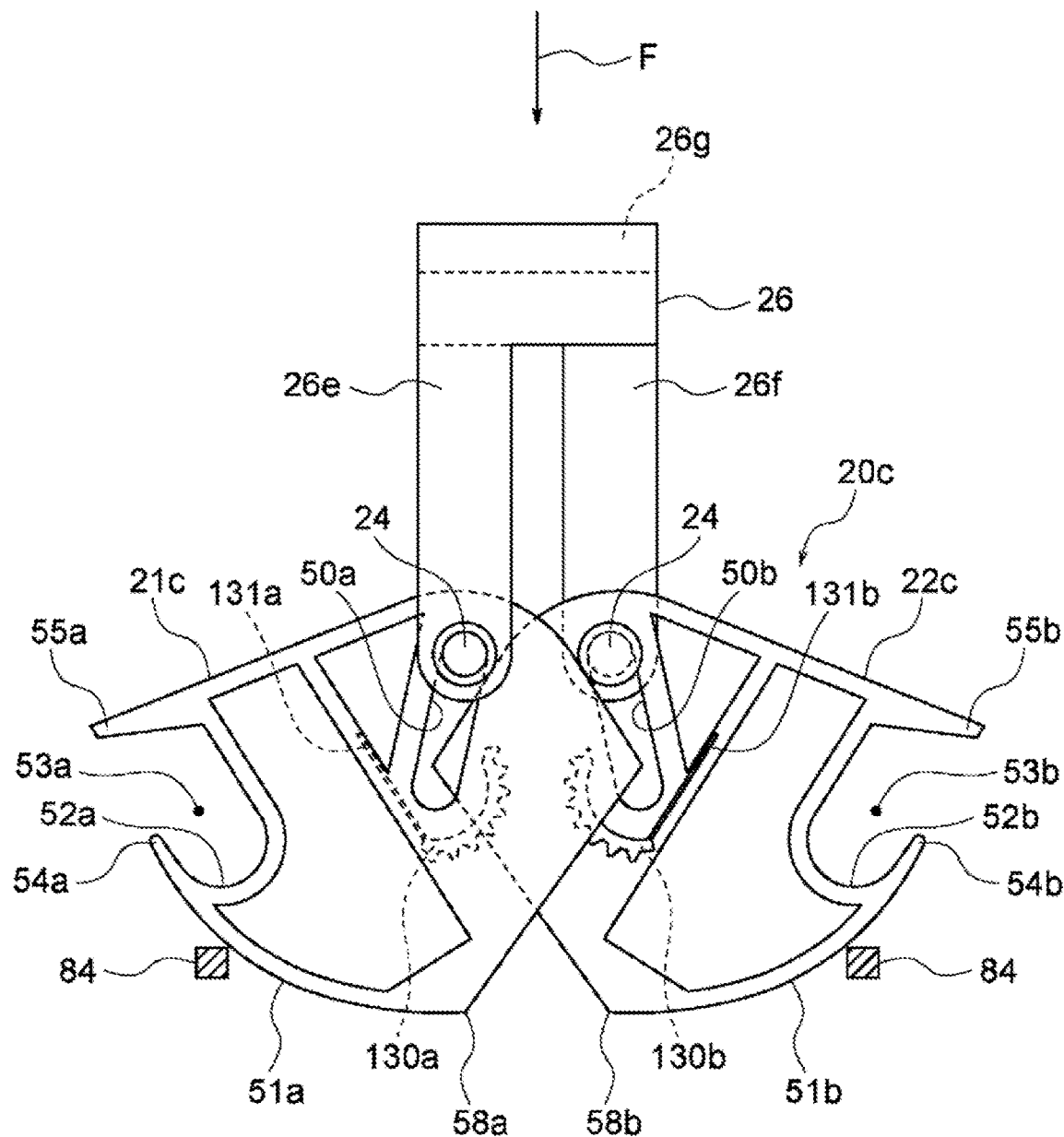
FIG. 42 is a front view showing a second state of the detachable member according to the eighth embodiment.

FIG. 42 is a front view showing a second state of the detachable member 20c of the eighth embodiment. When the detachable member 20c is inserted further in the direction of the arrow F, the arc-shaped portion 51a of the first coupling member 21c and the arc-shaped portion 51b of the second coupling member 22c come into contact with the grille 84.

Figure 43:
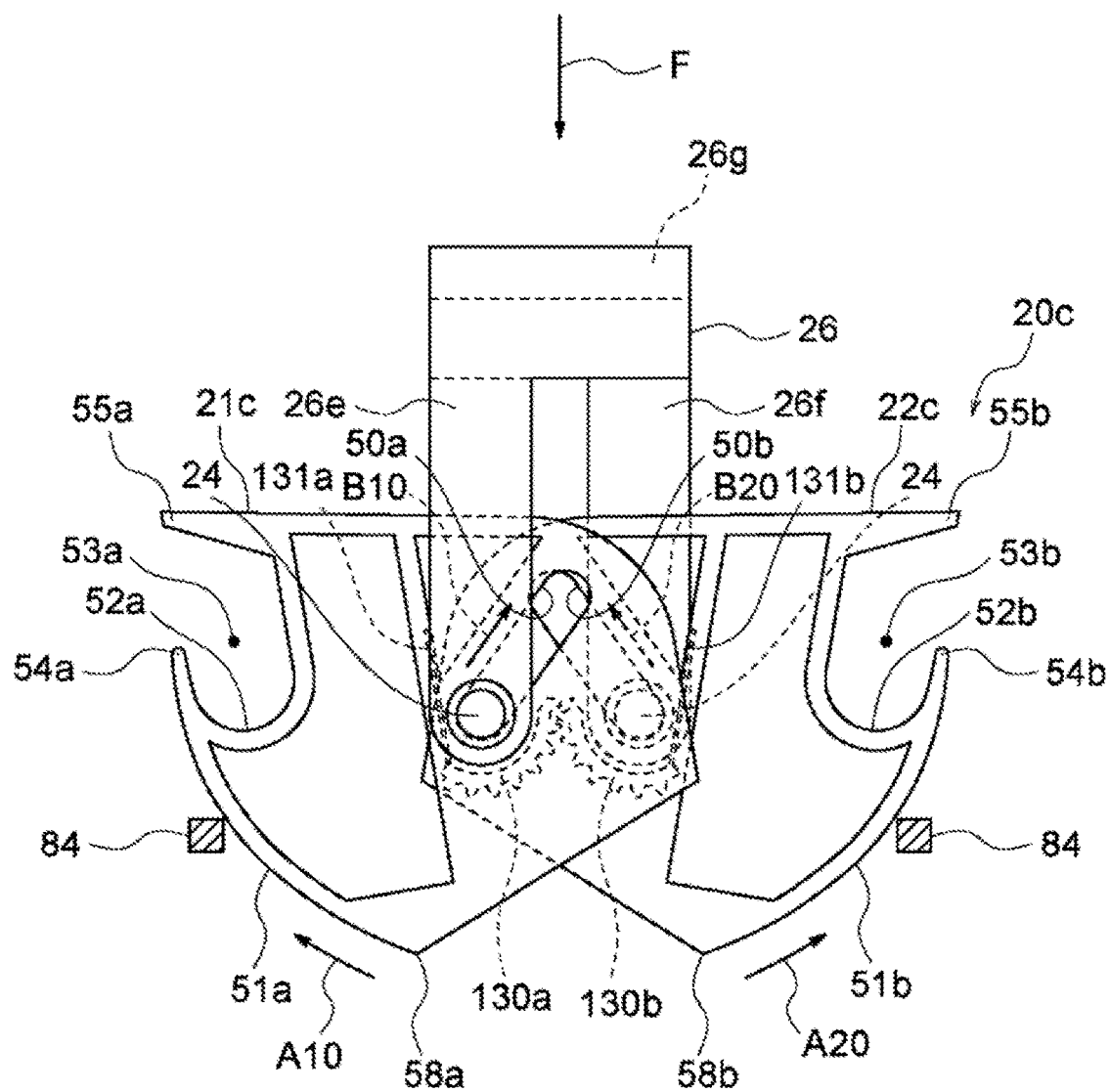
FIG. 43 is a front view showing a third state of the detachable member according to the eighth embodiment.

FIG. 43 is a front view showing a third state of the detachable member 20c of the eighth embodiment. When the detachable member 20c is inserted even further in the direction of the arrow F after the arc-shaped portion 51a of the first coupling member 21c and the arc-shaped portion 51b of the second coupling member 22c achieve contact, the arc-shaped portions 51a, 51b contact the grille 84 so that the arc-shaped portions 51a, 51b are pressed by the grille 84, and as a result, the first coupling member 21c rotates in the direction of the arrow A10, and the second coupling member 22c rotates in the direction of the arrow A20. In other words, the tongue portions 54a, 54b of the first and second coupling members 21c, 22c move in an upward direction.

Moreover, since the fixing shaft 24 is inserted into the elongated hole 50a in the first coupling member 21c, when the arc-shaped portion 51a comes into contact with the grille 84 such that the first coupling member 21c rotates in the direction of the arrow A10, the first coupling member 21 moves in the direction of the arrow B10 along the extension direction of the elongated hole 50a while sliding along the fixing shaft 24. Similarly, since the fixing shaft 24 is inserted into the elongated hole 50b in the second coupling member 22c, when the arc-shaped portion 51b comes into contact with the grille 84 such that the first coupling member 22 rotates in the direction of the arrow A20, the second coupling member 22c moves in the direction of the arrow B20 along the extension direction of the elongated hole 50b while sliding along the fixing shaft 24. As a result, the first gear 130a of the first coupling member 21c and the second gear 130b of the second coupling member 21b intermesh. When the detachable member 20c is then inserted even further in the direction of the arrow F, the first coupling member 21c rotates in the direction of the arrow A10 and the second coupling member 22c rotates in the direction of the arrow A20 while the first gear 130a and the second gear 130b remain intermeshed.

Figure 44:
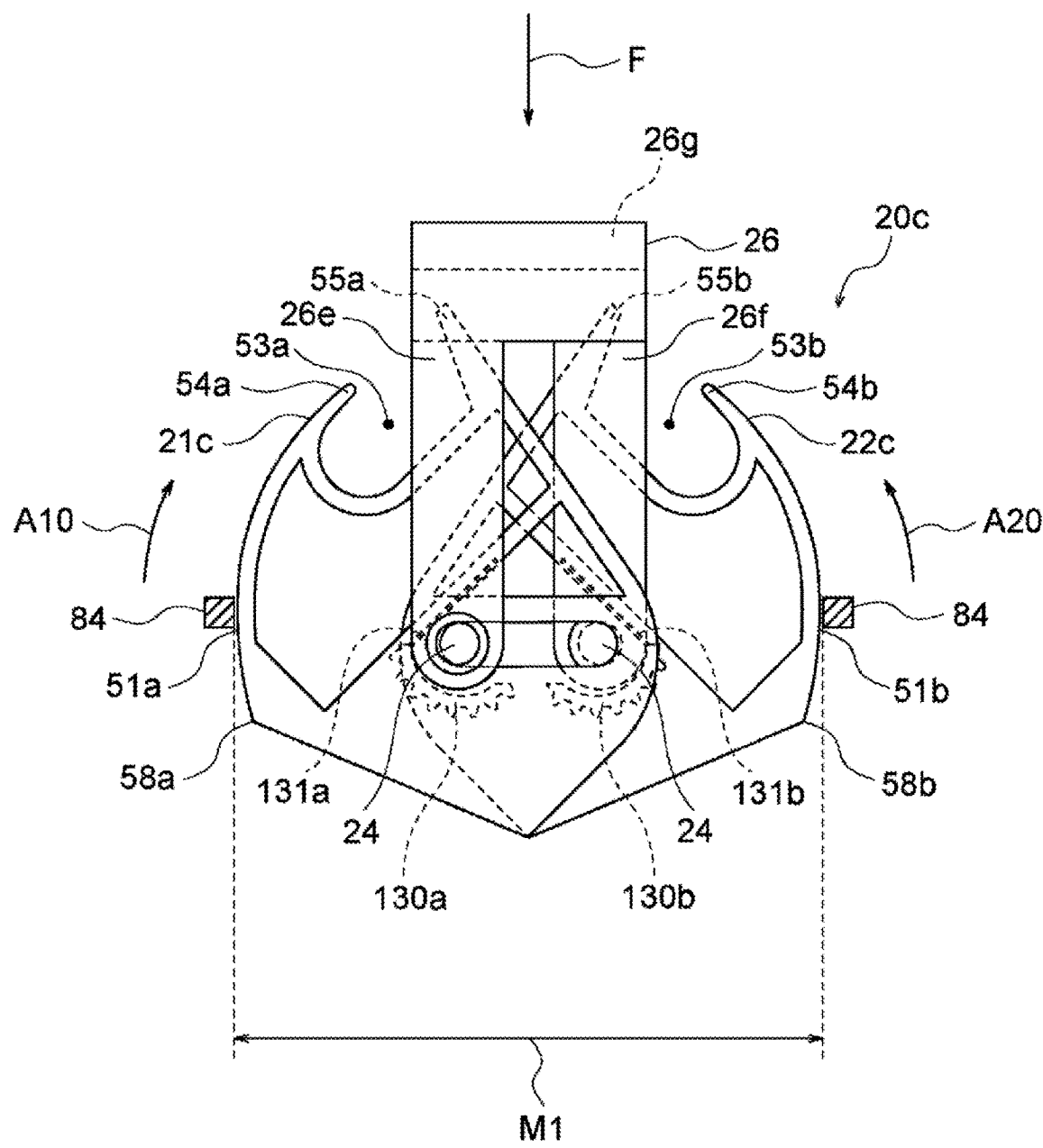
FIG. 44 is a front view showing a fourth state of the detachable member according to the eighth embodiment.

FIG. 44 is a front view showing a fourth state of the detachable member 20c of the eighth embodiment. When the detachable member 20 is inserted even further in the direction of the arrow F, the first coupling member 21 rotates further in the direction of the arrow A10. As a result, the intermeshing between the first gear 130a and the second gear 130b is released. Further, the second coupling member 22 rotates in the direction of the arrow A20. As a result, the horizontal direction distance between the respective central portions of the arc-shaped portion 51a and the arc-shaped portion 51b of the detachable member 20, indicated by the arrow M1, reaches a minimum. The distance indicated by the arrow M1 is equal to or smaller than the interval between adjacent bars of the grille 84, and therefore the detachable member 20 can pass through the gap between adjacent bars of the grille 84.

Figure 45:
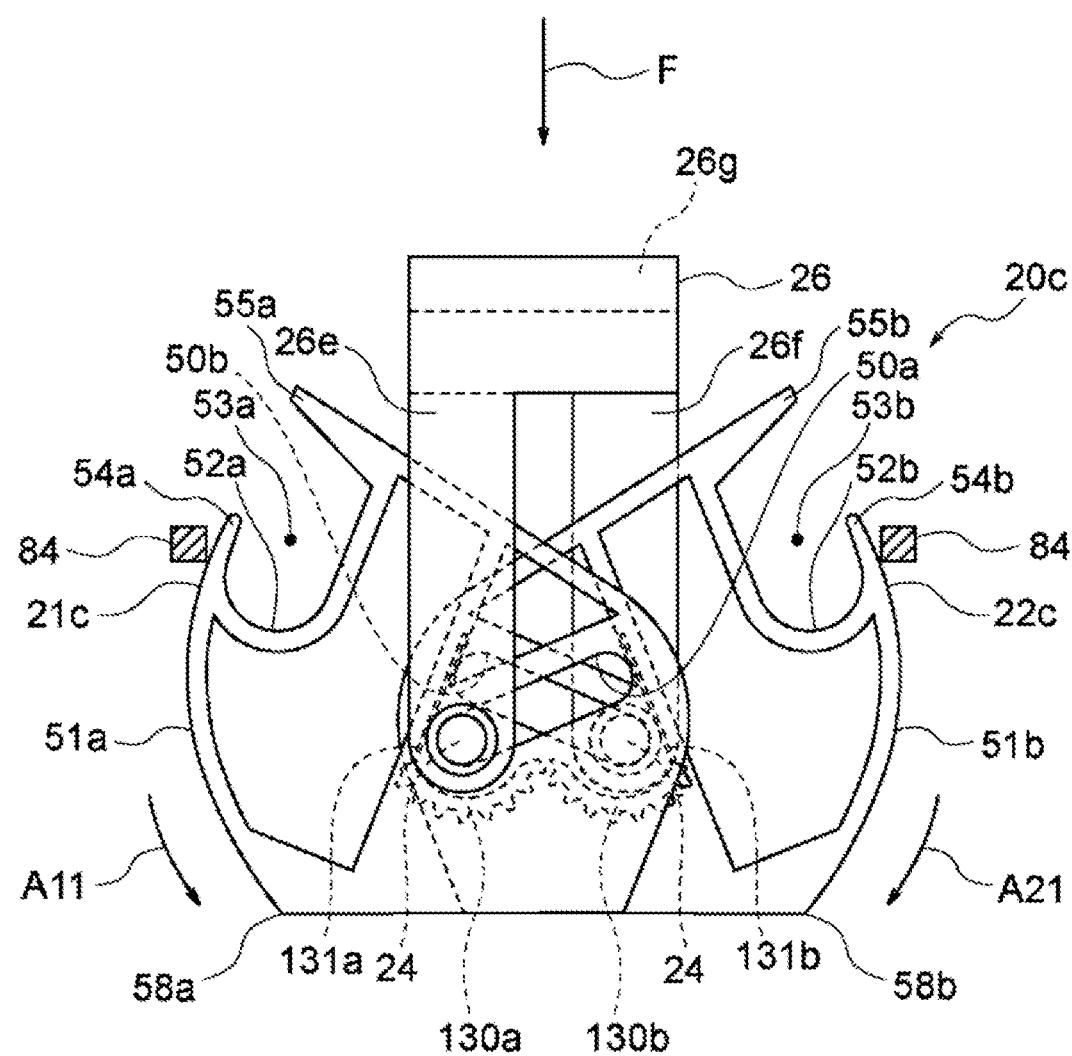
FIG. 45 is a front view showing a fifth state of the detachable member according to the eighth embodiment.

FIG. 45 is a front view showing a fifth state of the detachable member 20c of the eighth embodiment. When the detachable member 20 is inserted even further in the direction of the arrow F, the first coupling member 21c rotates in the direction of the arrow A11 in accordance with the positional relationship between the arc-shaped portion 51a of the first coupling member 21c and the grille 84. Further, the second coupling member 22c rotates in the direction of the arrow A21 in accordance with the positional relationship between the arc-shaped portion 51b of the second coupling member 22c and the grille 84. Next, when the detachable member 20 is inserted even further in the direction of the arrow F, the tongue portion 54a of the first coupling member 21c moves in a downward direction while contacting the grille 84, and the tongue portion 54b of the second coupling member 22c moves in a downward direction while contacting the grille 84.

Figure 46:
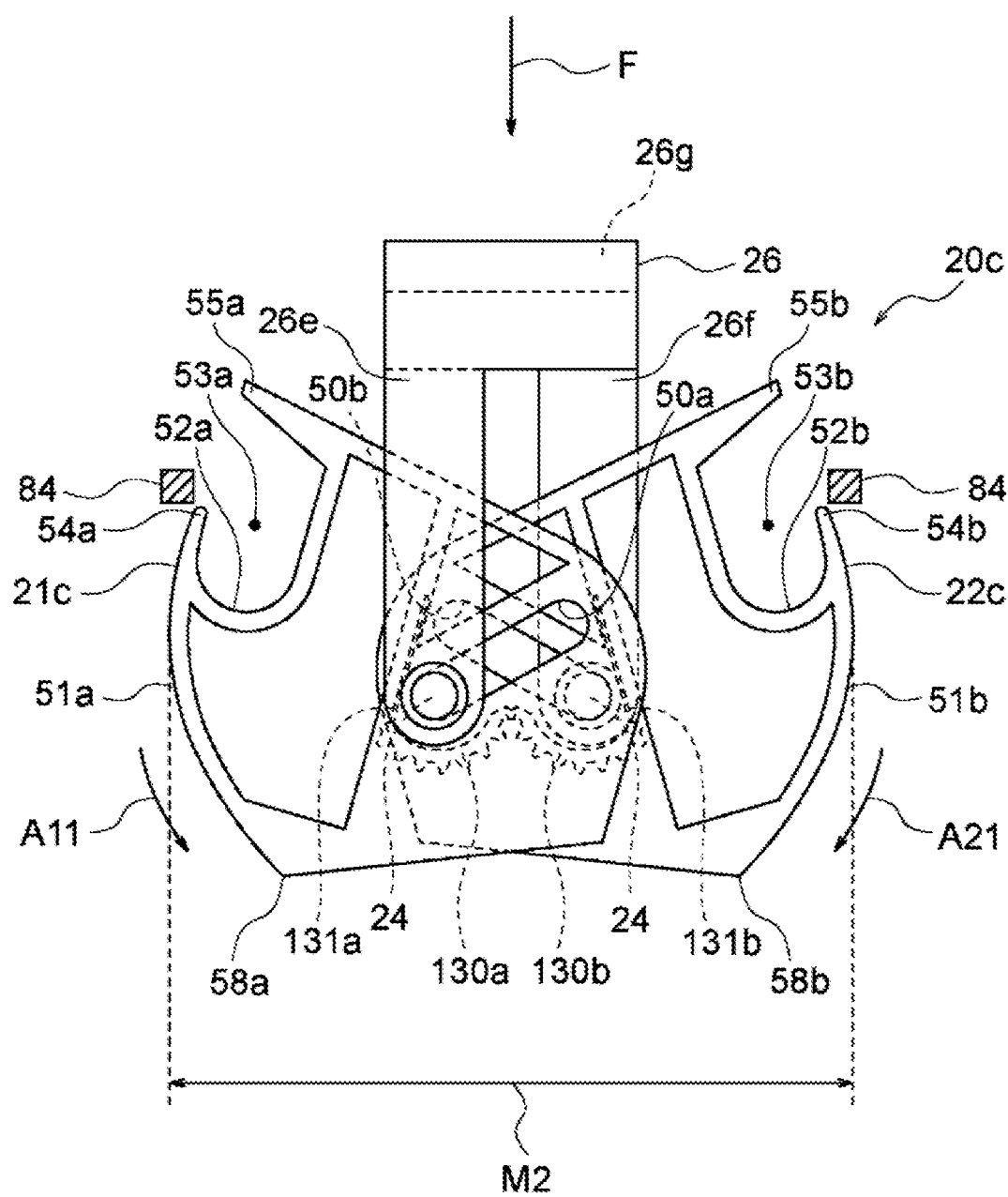
FIG. 46 is a front view showing a sixth state of the detachable member according to the eighth embodiment.

FIG. 46 is a front view showing a sixth state of the detachable member 20c of the eighth embodiment. When the detachable member 20 is inserted even further in the direction of the arrow F, the tongue portion 54a of the first coupling member 21c moves to the lower side of the grille 84 such that the grille 84 and the tongue portion 54a separate from each other, and the tongue portion 54b of the second coupling member 22c moves to the lower side of the grille 84 such that the grille 84 and the tongue portion 54b separate from each other. At this time, the horizontal direction distance between the respective central portions of the arc-shaped portion 51a and the arc-shaped portion 51b of the detachable member which is indicated by an arrow M2, becomes larger than the interval between adjacent bars of the grille 84.

Figure 47:
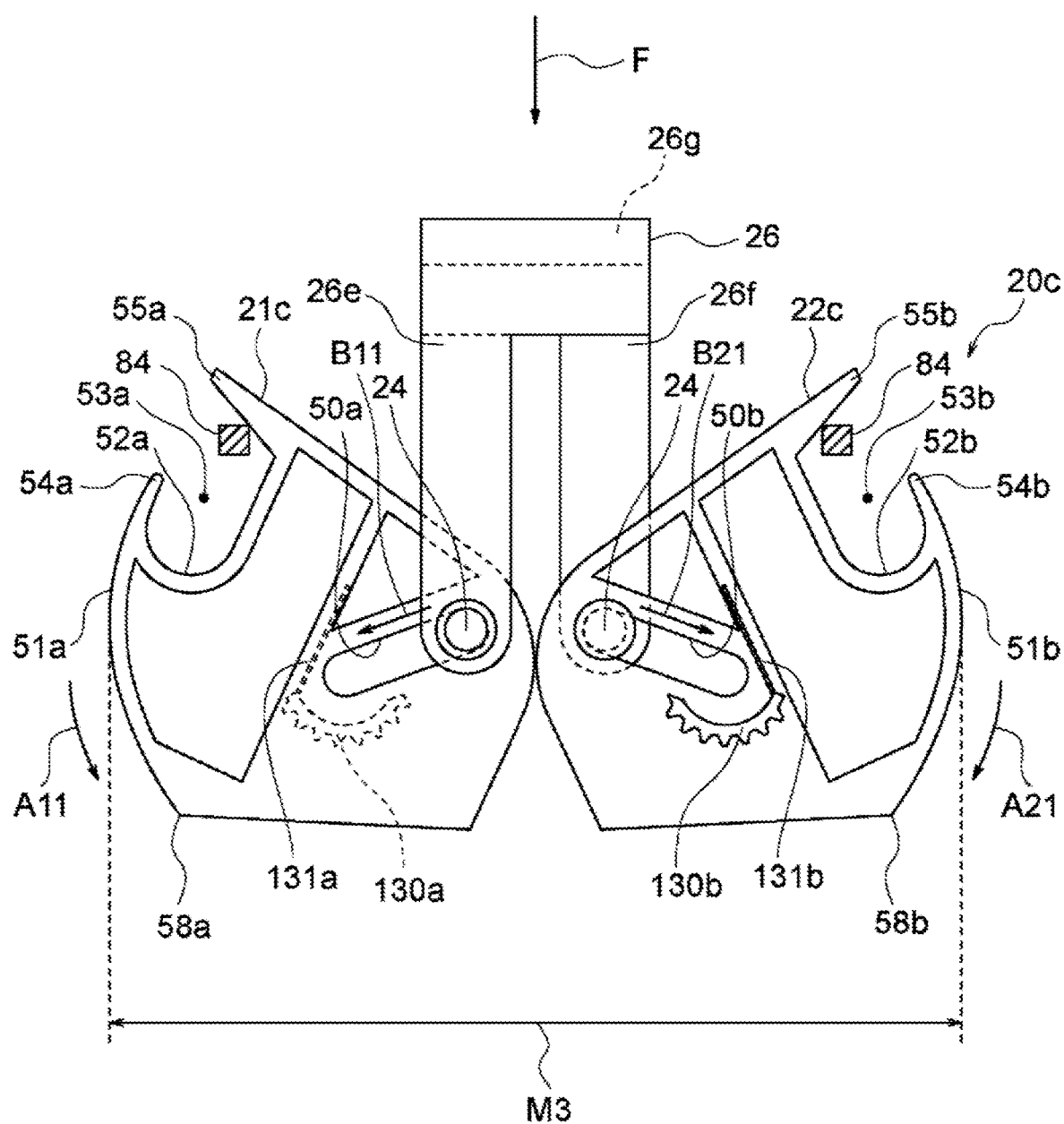
FIG. 47 is a front view showing a seventh state of the detachable member according to the eighth embodiment.

FIG. 47 is a front view showing a seventh state of the detachable member 20c of the eighth embodiment. After the grille 84 and the tongue portion 54a separate from each other, the first coupling member 21c moves in the direction of the arrow B11 while the elongated hole 50a slides along the fixing shaft 24, and the second coupling member 22c moves in the direction of the arrow B21 while the elongated hole 50b slides along the fixing shaft 24. Thus, the first coupling member 21 and the second coupling member 22 move further in the direction for increasing the horizontal direction distance between the respective central portions of the arc-shaped portion 51a and the arc-shaped portion 51b of the detachable member indicated by an arrow M3. Moreover, the release arm 55a of the first coupling member 21c contacts the grille 84 so as to be supported thereby, and the release arm 55b of the second coupling member 22c contacts the grille 84 so as to be supported thereby.

When the release arm 55a of the first coupling member 21c is in contact with the grille 84 so as to be supported thereby and the release arm 55b of the second coupling member 22c is in contact with the grille 84 so as to be supported thereby, the coupling device 10c (see FIG. 38) is provisionally coupled to the grating 81 (see FIG. 7). Next, in order to fully fix the first height difference filling member 60 to the grating 81 using the coupling device 10 and fully fix the second height difference filling member to the grating 81 using the coupling device 10, a height difference filling member coupling member, not shown in the figures, that is connected to the connecting member 26 via a joint member, not shown in the figures, is pulled up toward the vertical direction upper side.

Figure 48:
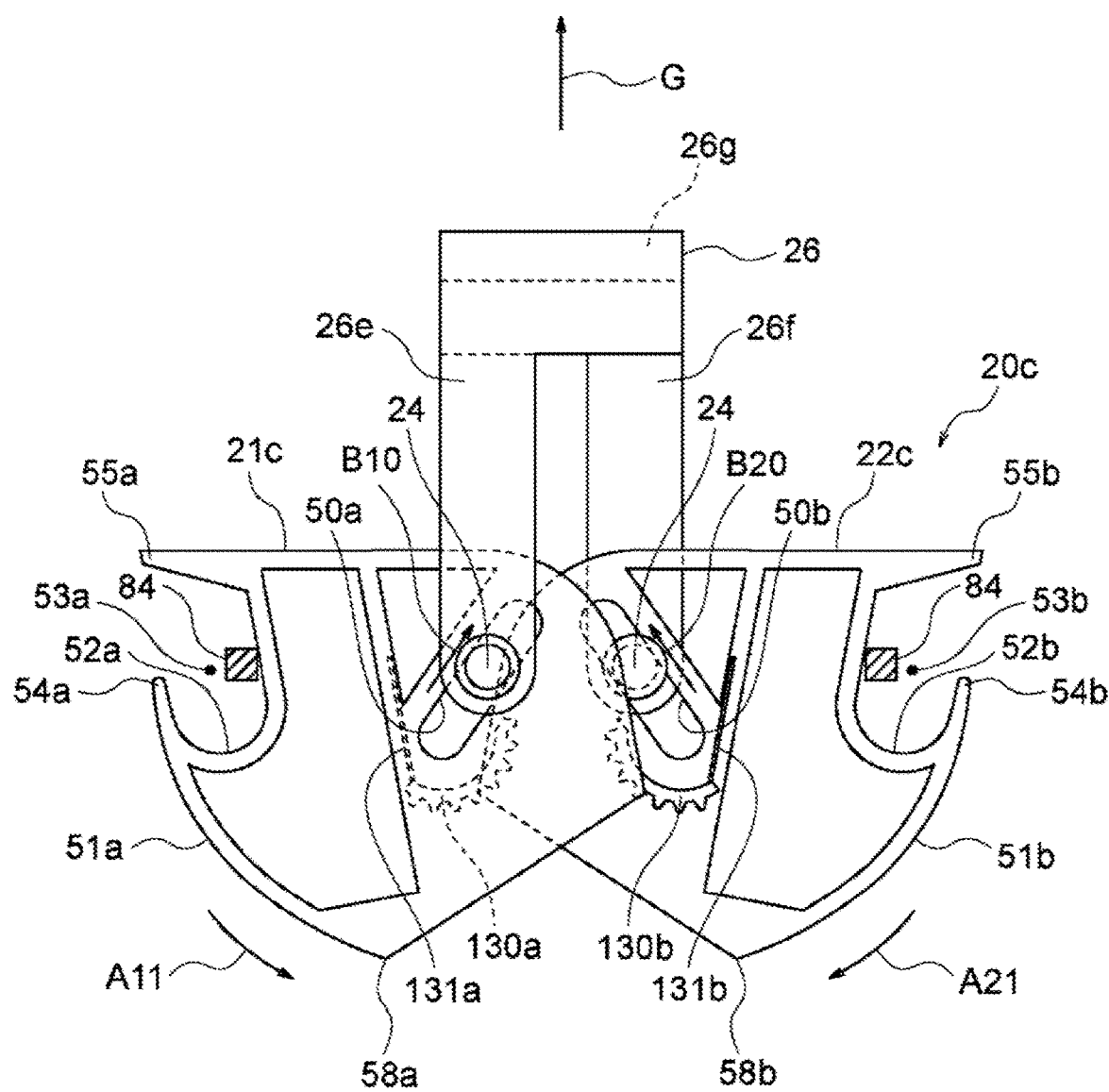
FIG. 48 is a front view showing an eighth state of the detachable member according to the eighth embodiment.

FIG. 48 is a front view showing an eighth state of the detachable member 20c of the eighth embodiment. When the height difference filling member coupling member is pulled up in the direction of the arrow G, i.e., toward the vertical direction upper side, from a state in which the release arm 55a of the first coupling member 21c is in contact with the grille 84 and the release arm 55b of the second coupling member 22c is in contact with the grille 84, the detachable member 20c is pulled up in the direction of the arrow G. As a result, the first coupling member 21c is pressed by the grille 84 so as to rotate in the direction of the arrow A11 and move in the direction of the arrow B10. Further, the second coupling member 22c is pressed by the grille 84 so as to rotate in the direction of the arrow A21 and move in the direction of the arrow B20. Next, when the detachable member 20c is pulled up further in the direction of the arrow G, the grille 84 moves from the opening portion 53a of the first coupling member 21c into the semicircular arc portion 52a, and the grille 84 moves from the opening portion 53b of the second coupling member 22 into the semicircular arc portion 52b.

Figure 49:
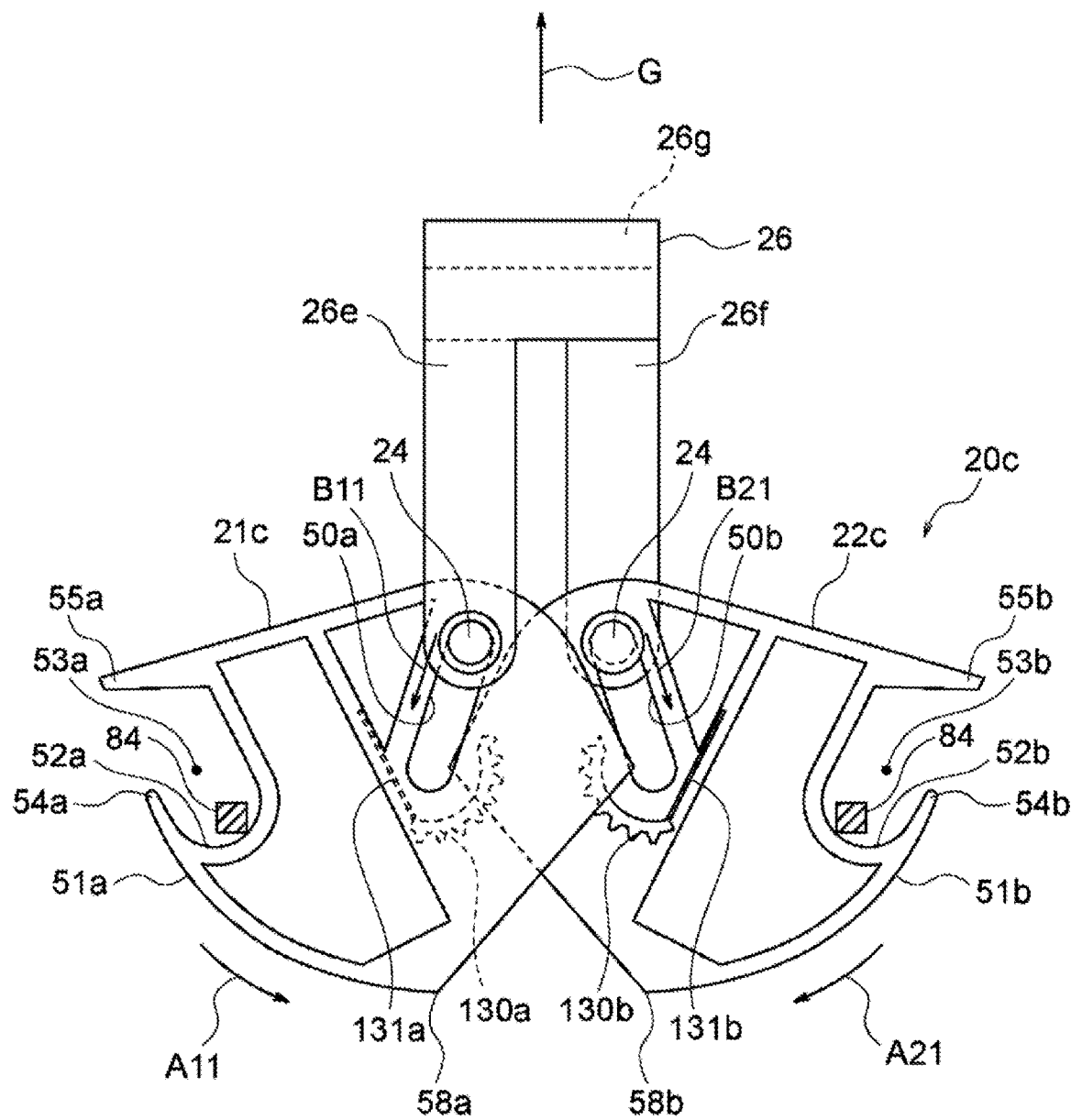
FIG. 49 is a front view showing a ninth state of the detachable member according to the eighth embodiment.

FIG. 49 is a front view showing a ninth state of the detachable member 20c of the eighth embodiment. When the detachable member 20c is pulled up even further in the direction of the arrow G, the first coupling member 21c rotates in the direction of the arrow A11, and the second coupling member 22c rotates in the direction of the arrow A21. In other words, the tongue portions 54a, 54b of the first and second coupling members 21, 22 move downward. As a result, the grille 84 is supported by and coupled to the semicircular arc portion 52a of the first coupling member 21c, and the grille 84 is supported by and coupled to the semicircular arc portion 52b of the second coupling member 22c. In other words, the grille 84 is suspended from the semicircular arc portion 52a and the semicircular arc portion 52b. By coupling the height difference filling member coupling member of the coupling device 10c to the first and second height difference filling members 60, 70 (see FIG. 7) in this state, the first and second height difference filling members 60, 70 and the grating 81 are coupled by the coupling device 10c.

Next, a method for releasing the coupling formed by the coupling device 10c between the first height difference filling member 60 (see FIG. 7) and the grating 81 and a method for releasing the coupling formed by the coupling device 10c between the second height difference filling member 70 and the grating 81 will be described. Note that the method for releasing the coupling formed by the coupling device 10c between the first height difference filling member 60 and the grating 81 and the method for releasing the coupling formed by the coupling device 10c between the second height difference filling member 70 and the grating 81 are identical, and therefore the methods will be described together using FIGS. 50 to 55.

Figure 50:
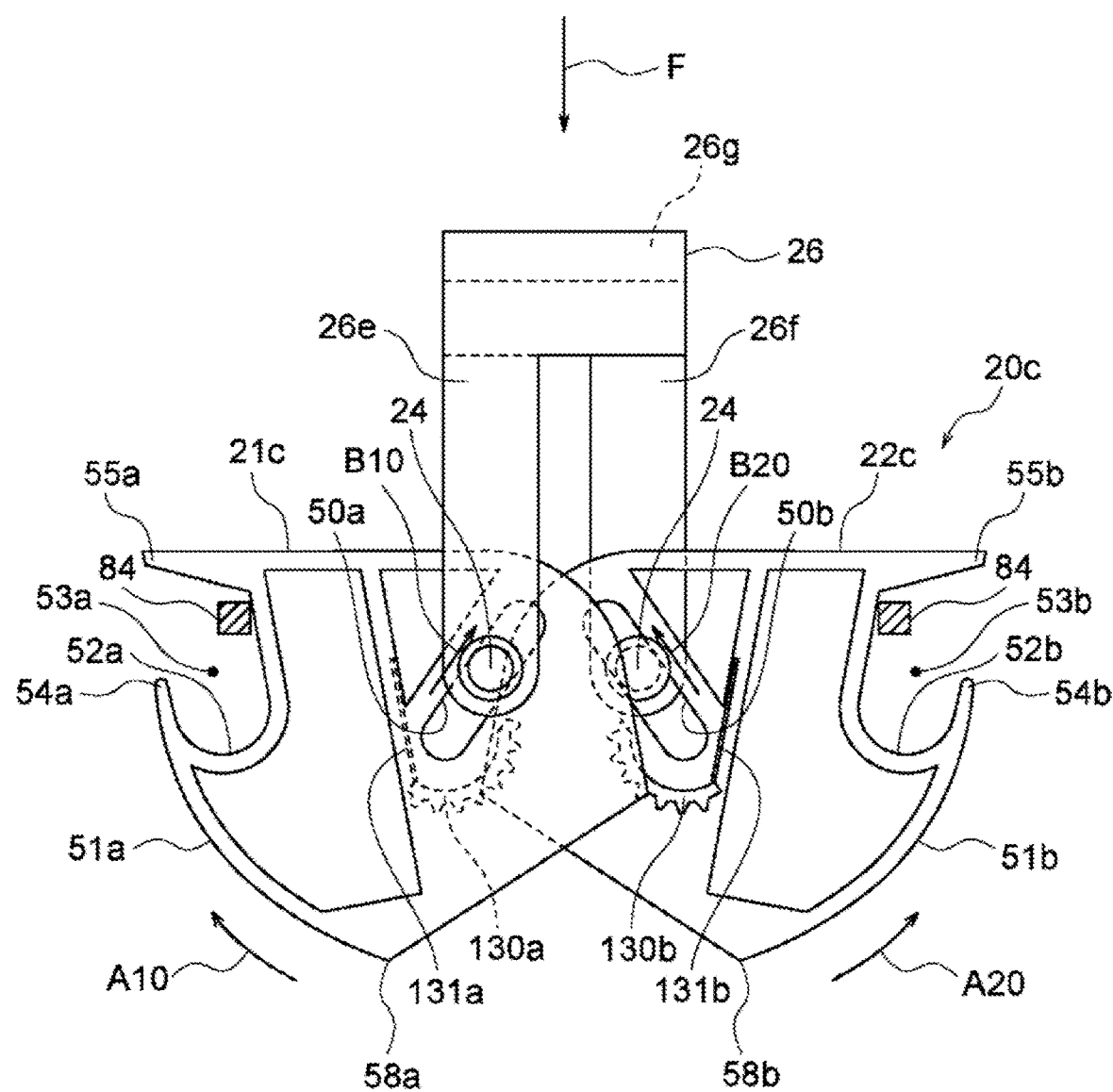
FIG. 50 is a front view showing a tenth state of the detachable member according to the eighth embodiment.

FIG. 50 is a front view showing a tenth state of the detachable member 20c of the eighth embodiment. When the height difference filling member coupling member, not shown in the figures, of the coupling device 10c is detached from the first and second height difference filling members 60, 70 and the detachable member 20c moves in the direction of the arrow F, i.e., toward the vertical direction lower side, the first coupling member 21c contacts one bar of the grille 84 and the second coupling member 22c contacts the adjacent bar of the grille 84. Accordingly, the first coupling member 21c rotates in the direction of the arrow A10 and moves in the direction of the arrow B10, and the second coupling member 22c rotates in the direction of the arrow A20 and moves in the direction of the arrow B20.

Figure 51:
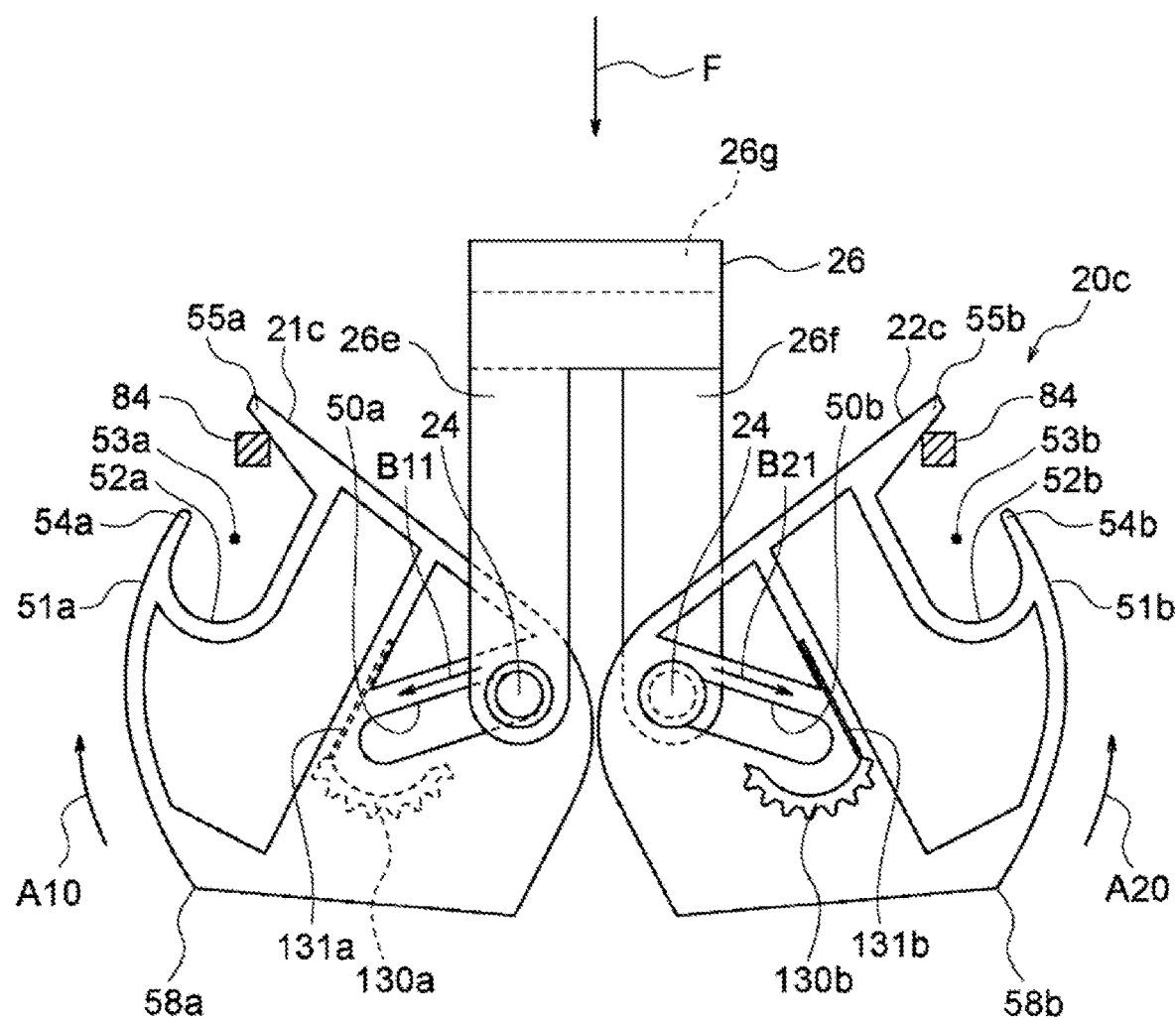
FIG. 51 is a front view showing an eleventh state of the detachable member according to the eighth embodiment.

FIG. 51 is a front view showing an eleventh state of the detachable member 20c of the eighth embodiment. When the detachable member 20 moves further in the direction of the arrow F, the release arm 55a of the first coupling member 21c comes into contact with the grille 84 so as to be pressed and lifted up from the lower side toward the upper side, whereby the first coupling member 21c rotates further in the direction of the arrow A10. Further, the release arm 55b of the second coupling member 22c comes into contact with the grille 84 so as to be pressed and lifted up from the lower side toward the upper side, whereby the first coupling member 22c rotates further in the direction of the arrow A20. As a result, the couplings between the first and second coupling members 21c, 22c and the grille 84 are released.

Figure 52:
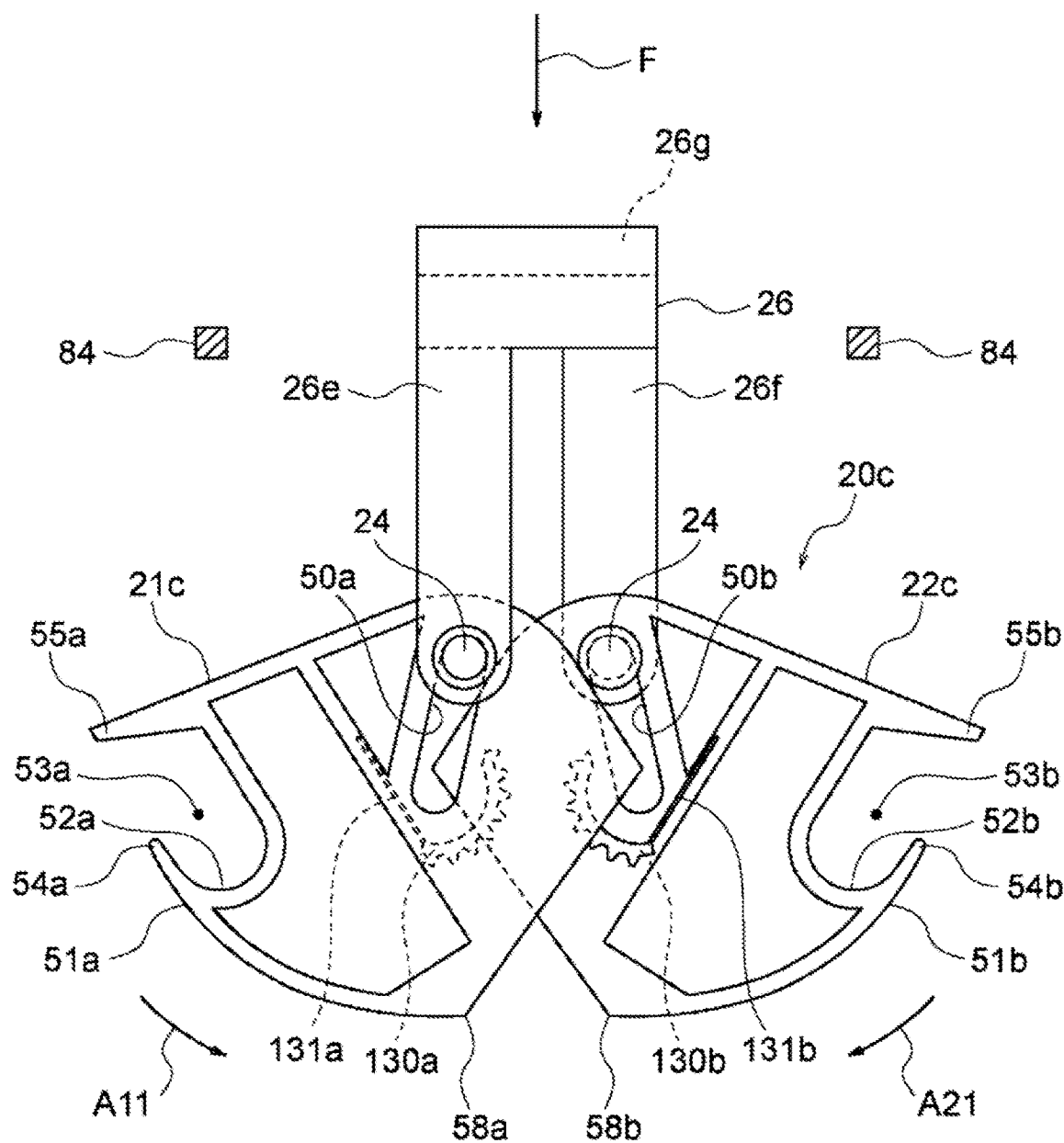
FIG. 52 is a front view showing a twelfth state of the detachable member according to the eighth embodiment.

FIG. 52 is a front view showing a twelfth state of the detachable member 20c of the eighth embodiment. When the detachable member 20c moves to the vertical direction lower side of the grille 84, the release arm 55a and the release arm 55b separate from the grille 84 so as to no longer be supported by the grille 84. As a result, the first coupling member 21c rotates in the direction of the arrow A11 and the second coupling member 22c rotates in the direction of the arrow A21, whereby the detachable member 20c enters the initial state.

Figure 53:
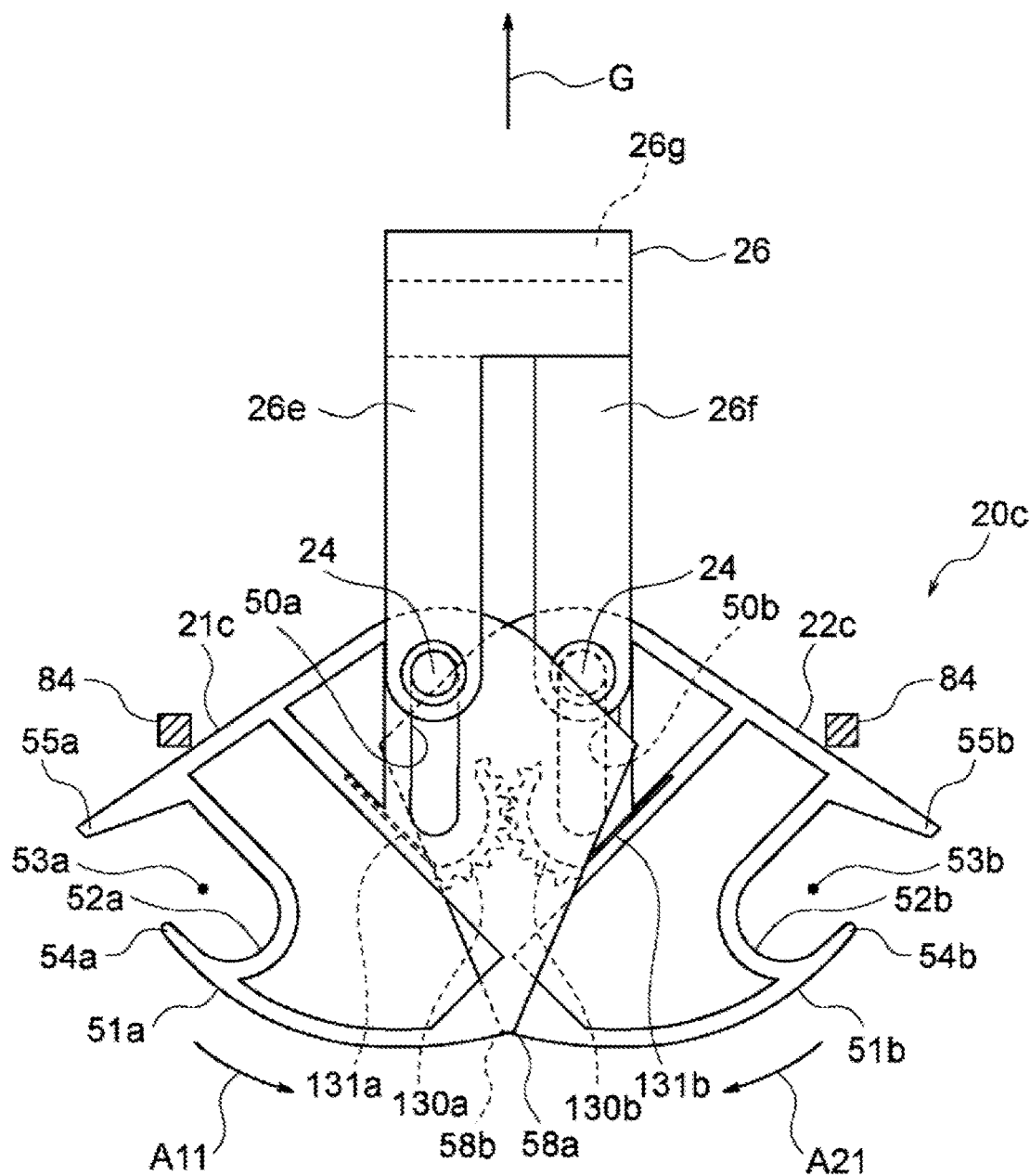
FIG. 53 is a front view showing a thirteenth state of the detachable member according to the eighth embodiment.

FIG. 53 is a front view showing a thirteenth state of the detachable member 20c of the eighth embodiment. Next, when the height difference filling member coupling member is pulled up in the direction of the arrow G, i.e., toward the vertical direction upper side, the detachable member 20c is pulled up in the direction of the arrow G. As a result, the release arm 55a of the first coupling member 21c comes into contact with the grille 84, and the release arm 55b of the second coupling member 22c comes into contact with the grille 84. Moreover, the first gear 130a of the first coupling member 21c and the second gear 130b of the second coupling member 22c intermesh.

Figure 54:
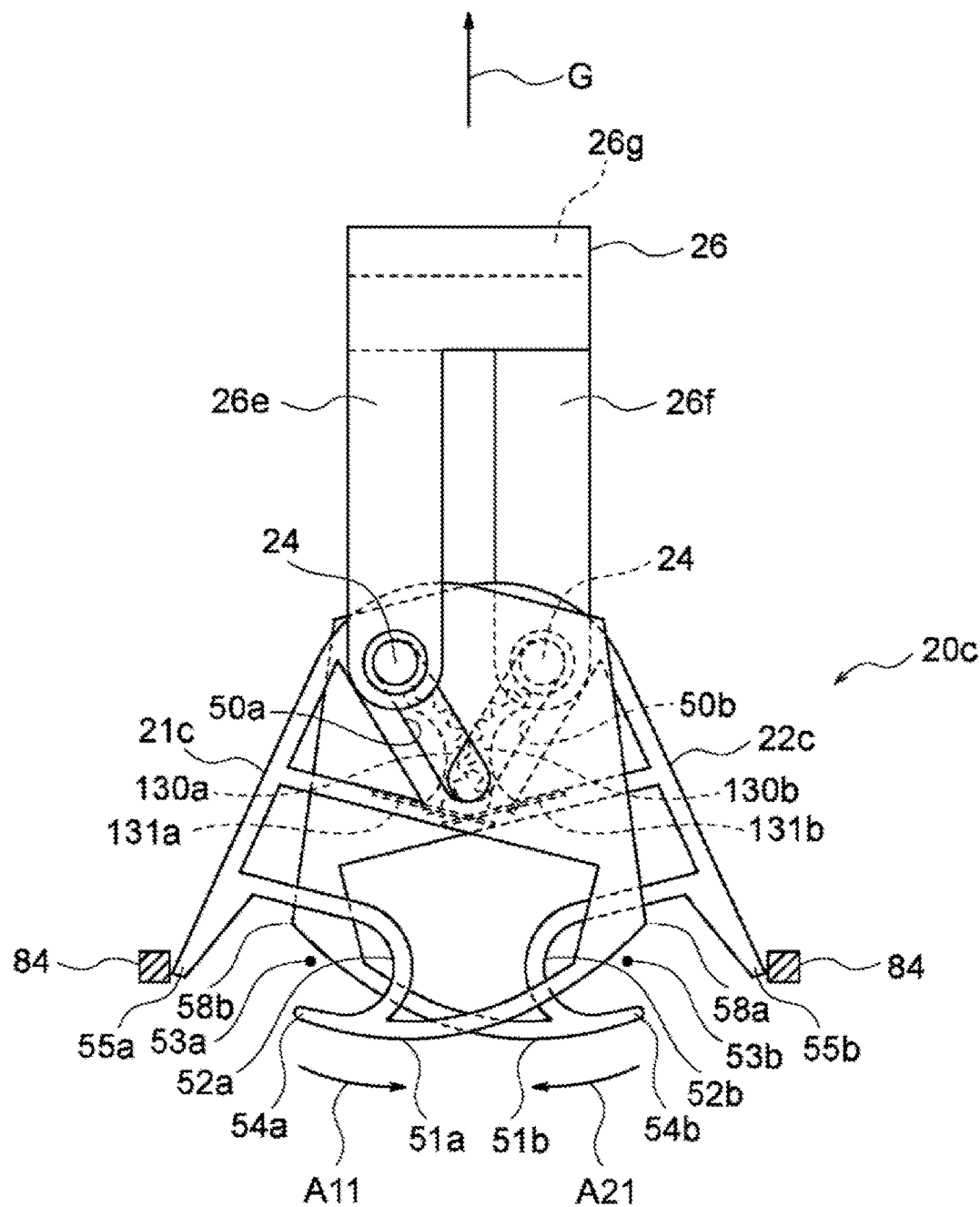
FIG. 54 is a front view showing a fourteenth state of the detachable member according to the eighth embodiment.

FIG. 54 is a front view showing a fourteenth state of the detachable member 20c of the eighth embodiment. When the detachable member 20c is pulled up even further in the direction of the arrow G, the release arm 55a of the first coupling member 21c is pressed toward the lower side by the grille 84 so as to move toward the lower side, whereby the first coupling member 21c rotates in the direction of the arrow A10. Further, the release arm 55b of the second coupling member 22c is pressed toward the lower side by the grille 84 so as to move toward the lower side, whereby the second coupling member 22c rotates in the direction of the arrow A20. At this time, the first coupling member 21c and the second coupling member 22c rotate while the first gear 130a and the second gear 130b are pressed by each other in an intermeshed state.

The first gear 130a and the second gear 130b pressed against each other move in directions indicated by the arrows C1, C2 (see FIG. 39), i.e., directions extending along the slits 131a, 131b, and therefore rotation of the first coupling member 21c and second coupling member 22c is not impeded by the intermeshing between the first gear 130a and second gear 130b. Next, when the detachable member 20c is pulled up even further in the direction of the arrow G, the release arms 55a, 55b pass through the grille 84 such that contact thereof with the grille 84 is released.

Figure 55:
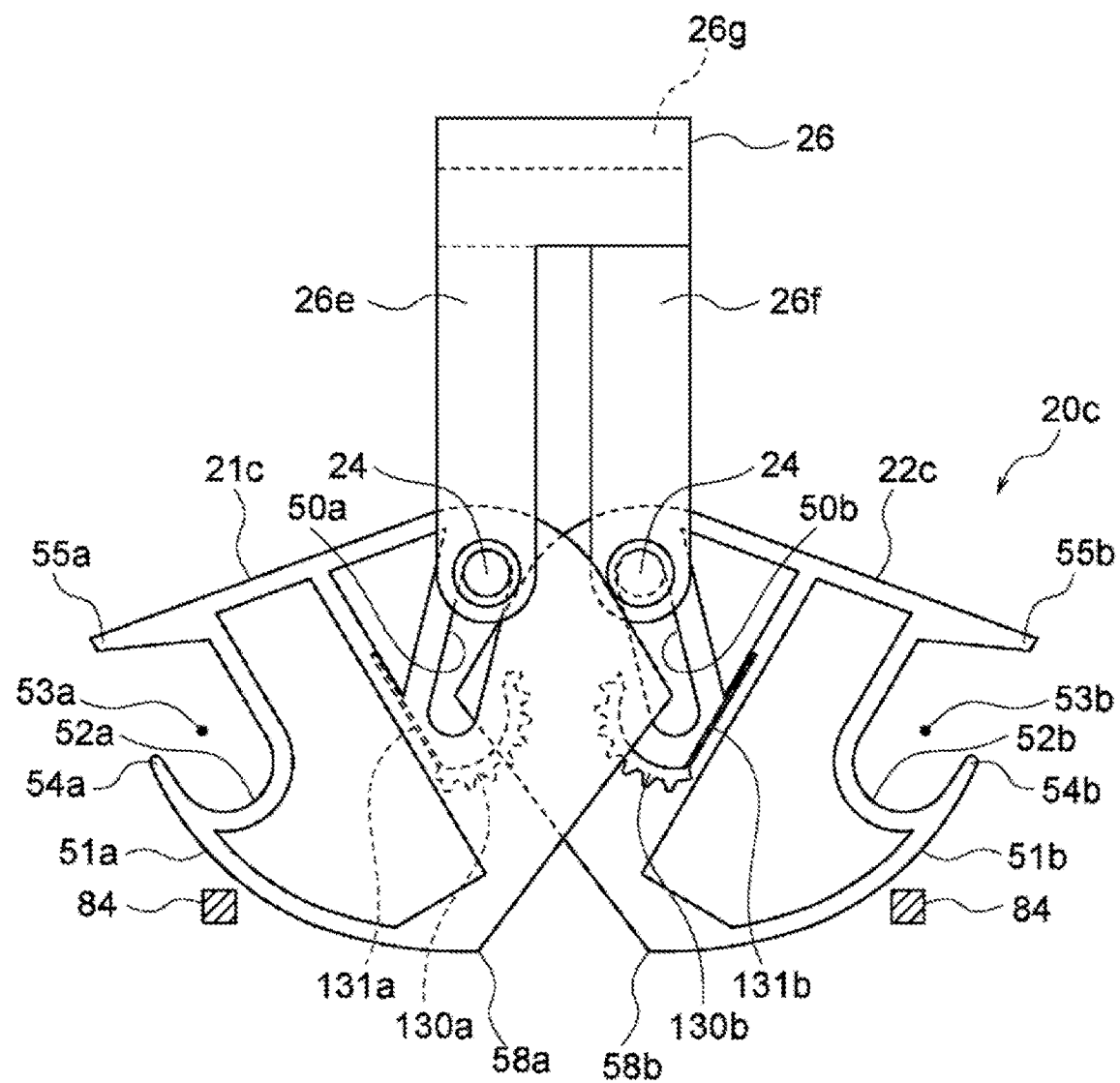
FIG. 55 is a front view showing a fifteenth state of the detachable member according to the eighth embodiment.

FIG. 55 is a front view showing a fifteenth state of the detachable member 20c of the eighth embodiment. When the contact between the release arms 55a, 55b and the grille 84 is released, the detachable member 20c enters the initial state. Next, the height difference filling member coupling member, not shown in the figures, is pulled up in the direction of the arrow G, i.e., toward the vertical direction upper side, whereby the couplings formed by the coupling device 10c between the first and second height difference filling members 60, 70 (see FIG. 7) and the grating 81 are released.

Hence, in the eighth embodiment, the first coupling member 21c includes the first gear 130a and the second coupling member 22c includes the second gear 130b, and the first gear 130a and second gear 130b are capable of meshing with each other when the first coupling member 21c and second coupling member 22c rotate about the fixing shaft 24 or move relative to the fixing shaft 24. Thus, the first coupling member 21c and second coupling member 22c can be rotated in conjunction with each other, and as a result, the first coupling member 21c and second coupling member 22c can be operated with stability.

Moreover, the first and second gears 130a, 130b are capable of moving in the directions of the arrows C1, C2, which are directions extending along the slits 131a, 131b, and therefore rotation of the first coupling member 21c and second coupling member 22c is not impeded by the intermeshed first and second gears 130a, 130b in the fourteenth state (see FIG. 54) of the detachable member 20c.

Furthermore, the first and second gears 130a, 130b are biased in the downward direction by the elastic members 132a, 132b, and therefore, when the intermeshing between the first gear 130a and the second gear 130b is released, the first gear 130a and the second gear 130b both automatically return to their initial positions so that the first gear 130a and second gear 130b can mesh with each other the next time the first and second coupling members 21c, 22c rotate and move.

Note that in the eighth embodiment, the first and second gears 130a, 130b are biased in the downward direction by the elastic members 132a, 132b, but the first and second gears 130a, 130b may be biased in an upward direction.

Ninth Embodiment

Next, a coupling device according to a ninth embodiment of this invention will be described. The coupling device according to the ninth embodiment differs from the first embodiment in that a telescopic mechanism is provided on the upper side of the connecting member.

Figure 56:
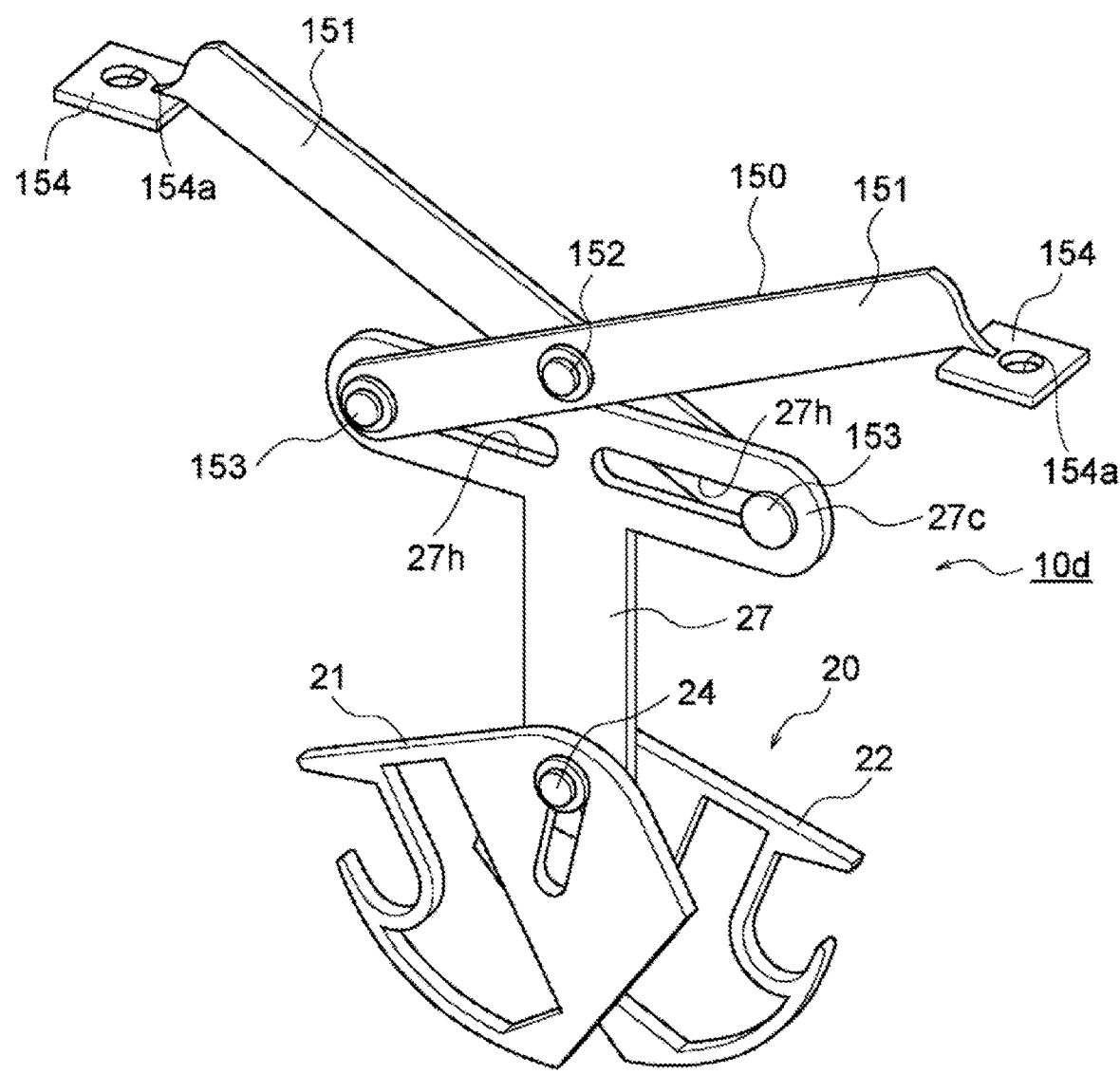
FIG. 56 is a schematic view of a coupling device according to a ninth embodiment.

FIG. 56 is a schematic view of a coupling device 10d according to the ninth embodiment. An upper portion 27c of a connecting member 27 extends in the horizontal direction. Two connecting member elongated holes 27h are provided in the upper portion 27c so as to extend in the extension direction of the upper portion 27c.

A telescopic mechanism 150 is attached to the upper portion 27c of the connecting member 27. The telescopic mechanism 150 has a cross unit structure in which two rectilinear metal plates 151 intersect at and are rotatably connected by a fulcrum 152, and is formed to be free to expand and contract. A sliding fitting 153 is provided on an end portion of each metal plate 151 on the vertical direction lower side so as to connect the metal plate 151 to the corresponding connecting member elongated hole 27h. The sliding fitting 153 slides through the connecting member elongated hole 27h while remaining connected to the connecting member elongated hole 27h. A plate-shaped attachment portion 154 with a bolt hole 154a provided therein, the bolt hole 154a being formed so as to be oriented in the vertical direction, is formed on the other end portion of each metal plate 151 on the vertical direction upper side. Thus, the attachment portion 154 can be bolted to a fixing subject, not shown in the figure, constituting the second coupling subject member. All other configurations are identical to the first embodiment. Note that the telescopic mechanism 150 constitutes the third coupling member.

Figure 57:
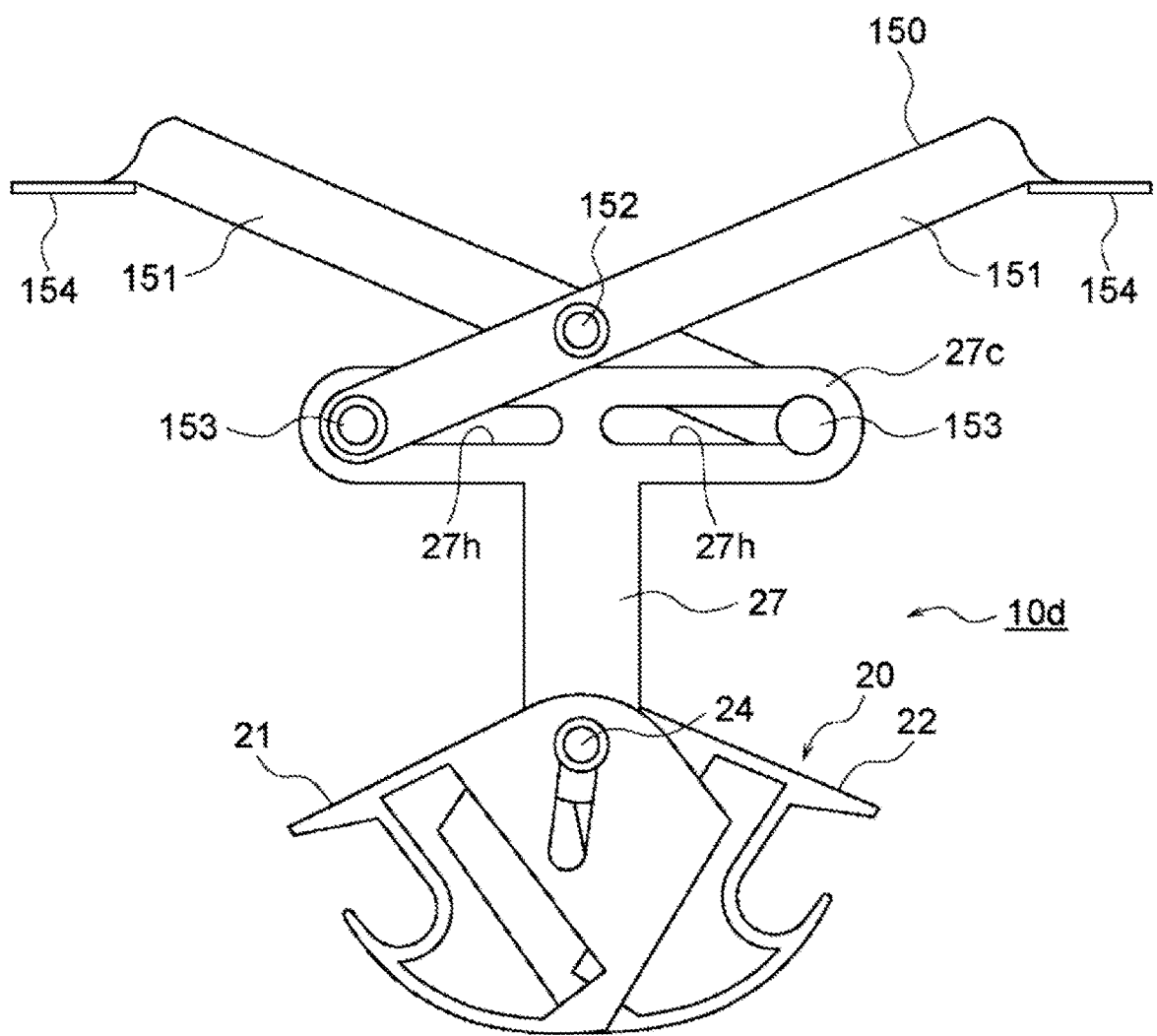
FIG. 57 is a front view showing a first state of the coupling device shown in FIG. 56.
Figure 58:
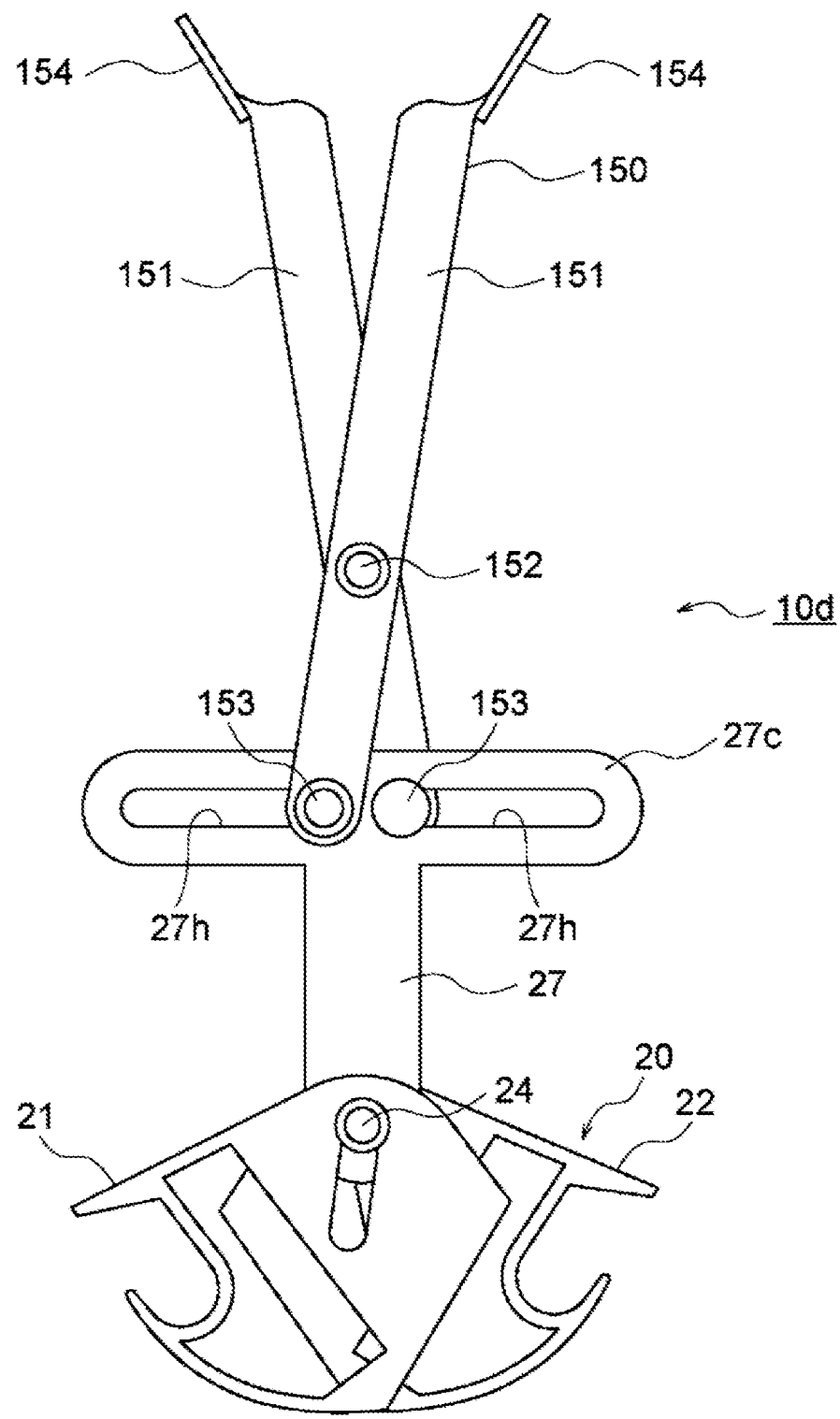
FIG. 58 is a front view showing a second state of the coupling device shown in FIG. 56.

Next, an operation of the coupling device 10d according to the ninth embodiment will be described. FIG. 57 is a front view showing the coupling device 10d with the telescopic mechanism 150 in a contracted state. FIG. 58 is a front view showing the coupling device 10d with the telescopic mechanism 150 in an expanded state. The coupling device 10d includes the telescopic mechanism 150 having a cross unit structure, which is attached to the upper portion 27c of the connecting member 27. Hence, by causing the telescopic mechanism 150 to contract, as shown in FIG. 57, and expand, as shown in FIG. 58, relative to a fixing subject, not shown in the figures, to which the attachment portions 154 of the telescopic mechanism 150 are attached, the position of the detachable member 20 of the coupling device 10d can be freely adjusted.

By employing the telescopic mechanism 150 as the third coupling member of the ninth embodiment, as described above, the position of the detachable member 20 relative to the second coupling subject member can be freely adjusted.

Note that in the ninth embodiment, the attachment portions 154 of the telescopic mechanism 150 include the bolt holes 154a, and the attachment portions 154 are bolted to the attachment subject, but this invention is not limited thereto, and the attachment portion 154 may be provided with a well-known attachment mechanism other than the bolt holes 154a, such as a clip-form fitting, for example.

Furthermore, in the third to ninth embodiments of this invention, identical arc-shaped portions to those of the first embodiment are used as the contact portions of the first and second coupling members, but identical rectilinear portions to those of the second embodiment may be used as the contact portions instead.

Tenth Embodiment

Next, a coupling device according to a tenth embodiment of this invention will be described. The tenth embodiment differs from the fifth embodiment in that a detachable member is provided on a rope engagement member that engages with a rope connected to a drone.

Figure 59:
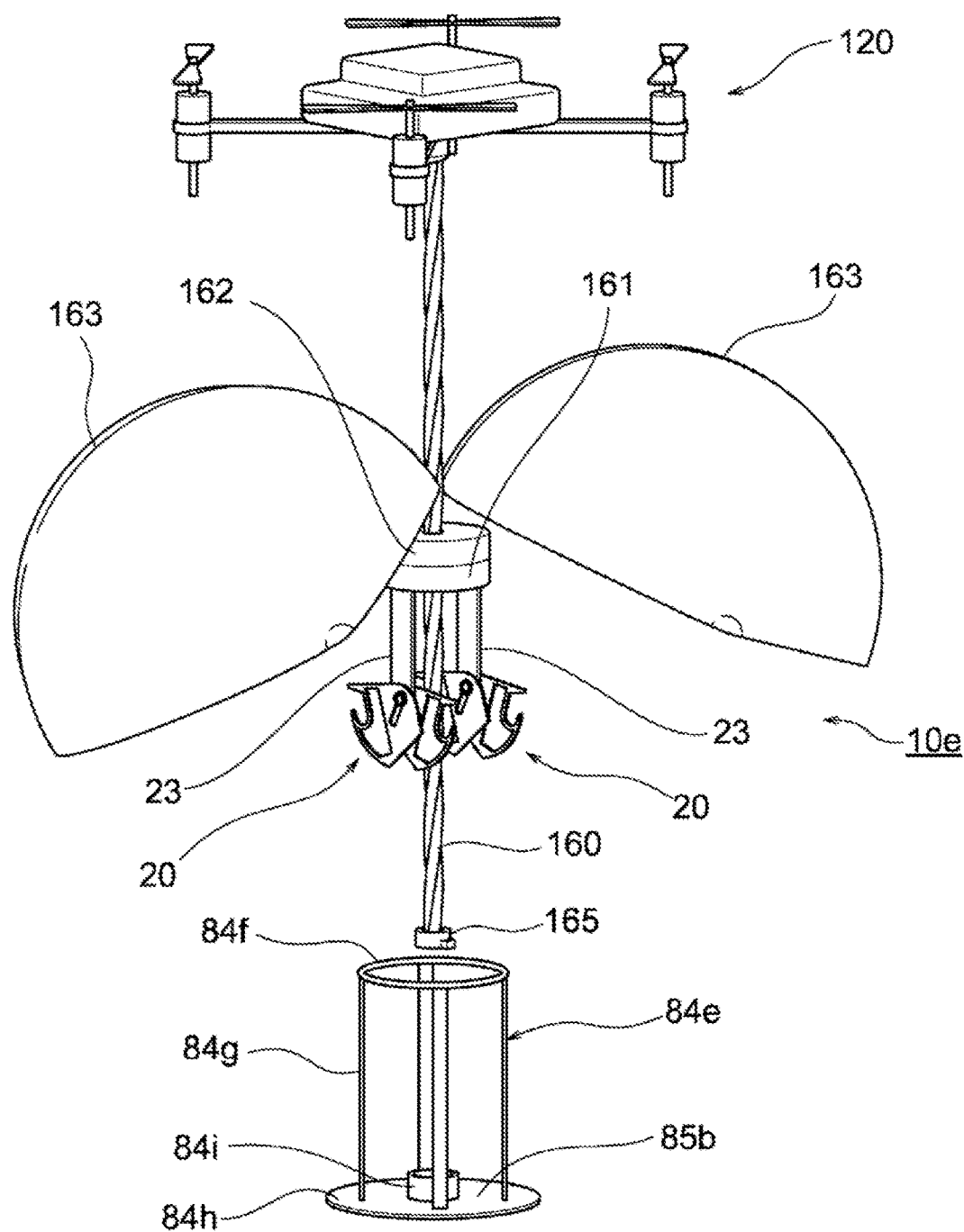
FIG. 59 is a schematic view of a coupling device according to a tenth embodiment.

FIG. 59 is a schematic view of the coupling device of the tenth embodiment. A coupling device 10e is attached to a wire rope 160 that is connected to the lower portion of the drone 120 so as to extend toward the vertical direction lower side. The wire rope 160 is a vertically extending wire rope formed by twisting together a plurality of strands. Further, the wire rope 160 is wound in and extended in the vertical direction by a motor, not shown in the figure, in the interior of the drone 120. Note that the wire rope 160 constitutes the third coupling member.

The coupling device 10e includes a rope engagement member 161. The rope engagement member 161 is formed such that the wire rope 160 can be inserted into a central portion thereof and the strands forming the outer shape of the wire rope 160 can be engaged with the central portion. Further, the rope engagement member 161 includes a fall prevention stopper, not shown in the figure, for stopping the rope engagement member 161 from falling down along the wire rope 160. Furthermore, two detachable members 20 are provided on a lower portion of the rope engagement member 161 symmetrically about the central portion and parallel to each other. The connecting members 23 of the detachable members 20 are connected to the lower portion of the rope engagement member 161. An annular clamping member 162 is connected to an upper portion of the rope engagement member 161 so as to be free to rotate relative to the rope engagement member 161.

A suspension fitting 84e is attached to the suspension subject 85 to be suspended from the detachable member 20 of the coupling device 10e of the tenth embodiment. The suspension fitting 84e is formed by connecting an annular suspension member 84f, which is disposed on the vertical direction upper side so as to extend along the horizontal direction, to a circular bottom plate 84h of the suspension subject 85 by means of a vertical member 84g extending in the vertical direction. Further, the annular suspension member 84f is formed to have a diameter that enables the detachable members 20 to be coupled to the annular suspension member 84f. Furthermore, a bottom plate fixing member 84i formed from a ferromagnetic material such as iron is provided in a central portion of the bottom plate 84h. The suspension subject 85 itself may be a load to be transported by the drone 120, or the load to be transported by the drone 120 may be carried on the bottom plate 84h. Note that the annular suspension member 84f constitutes the first coupling subject member, and the bottom plate fixing member 84i constitutes a subject fixing member.

Figure 60:
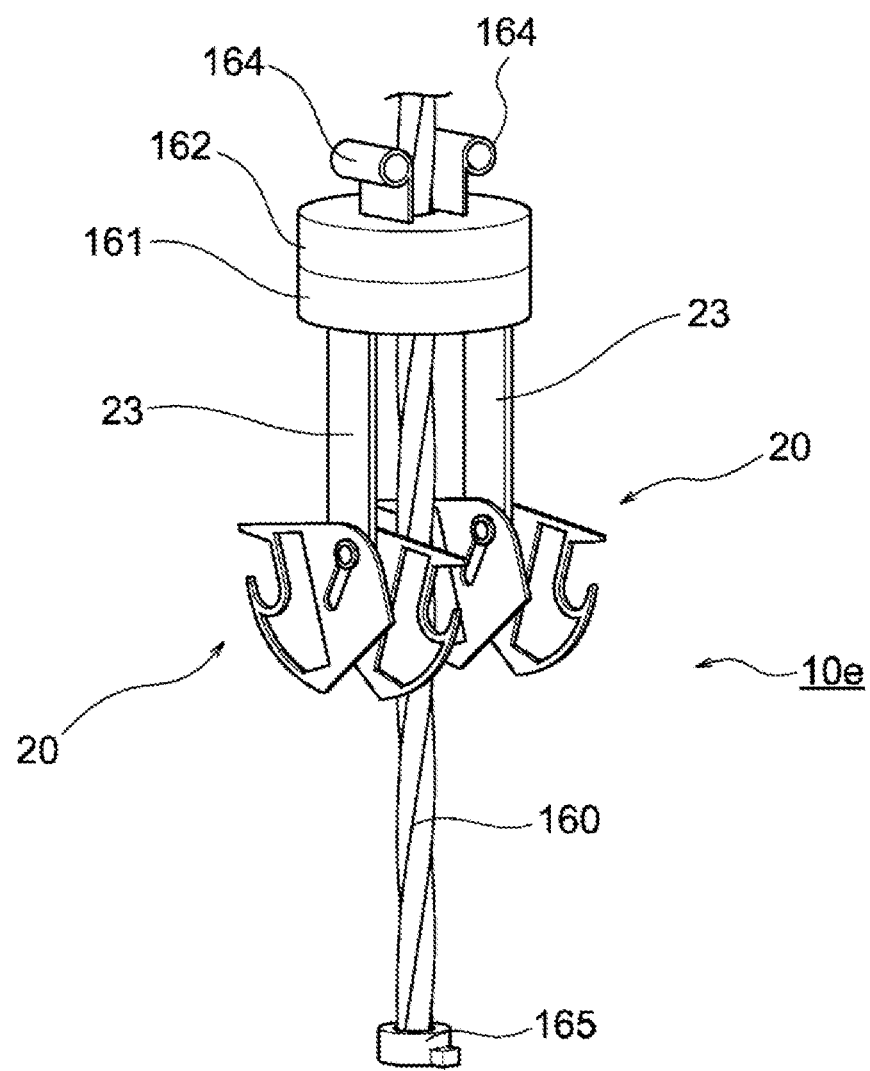
FIG. 60 is an enlarged view of the coupling device according to the tenth embodiment.

FIG. 60 is an enlarged view of the coupling device 10e. Note that in order to facilitate description, a capsule member 163 is not shown in FIG. 60. Two tubular hinge portions 164 that are coupled to the capsule member 163 so as to make the capsule member 163 openable and closeable are provided parallel to each other on the upper portion of the clamping member 162. Referring back to FIG. 59, the capsule member 163 is a rugby ball-shaped elliptical capsule that is connected to the hinge portions 164 by an upper portion thereof, whereby the capsule member 163 can be opened and closed by a capsule opening/closing device such as an actuator, not shown in the figure, along a long axis direction using the hinge portions 164 as a fulcrum. Further, the capsule member 163 is configured to be capable of housing the rope engagement member 161, the clamping member 162, and the detachable members 20 when closed. Furthermore, as will be described in detail below, when the suspension subject 85 is suspended from the detachable members 20, the capsule member 163 can house the suspension subject 85. A rope fixing member 165 formed from an electromagnet is provided on a lower end portion of the wire rope 160.

Figure 61:
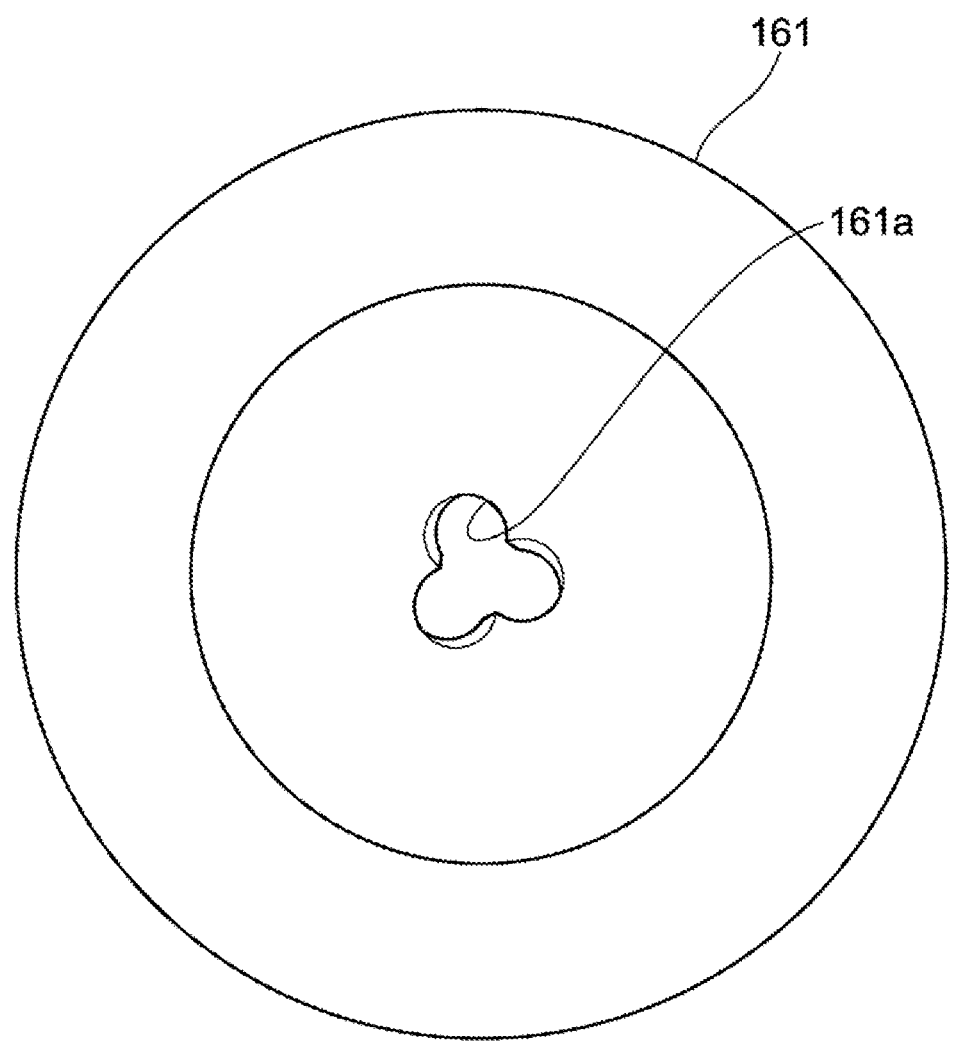
FIG. 61 is a plan view of a rope engagement member shown in FIG. 60.

FIG. 61 is a plan view of the rope engagement member 161. An engagement hole 161a with which the outer diameter portion of the strands of the wire rope 160 (see FIG. 60) can engage is provided in a radial central portion of the rope engagement member 161.

Figure 62:
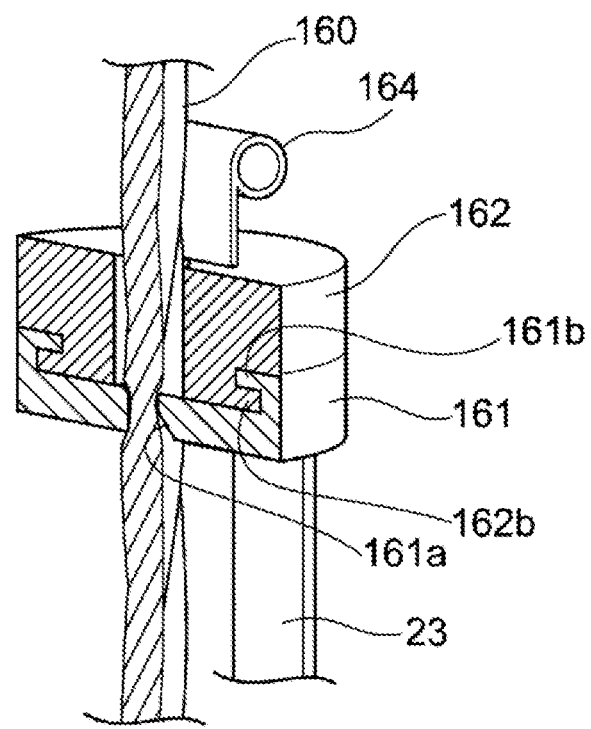
FIG. 62 is a vertical direction sectional view of the rope engagement member and a clamping member shown in FIG. 60.

FIG. 62 is a vertical direction sectional view of the rope engagement member 161 and the clamping member 162. The engagement hole 161a in the rope engagement member 161 and the outer diameter portion of the wire rope 160 are engaged. However, an inner diameter portion of the clamping member 162 is not engaged with the outer diameter portion of the wire rope 160. Further, an annular projecting portion 161b extending in a radial direction of the rope engagement member 161 and an annular projecting portion 162b extending in a radial direction of the clamping member 162 are fitted to each other. Thus, the clamping member 162 is formed to be free to rotate relative to the rope engagement member 161 engaged with the wire rope 160. All other configurations are identical to the fifth embodiment.

Figure 63:
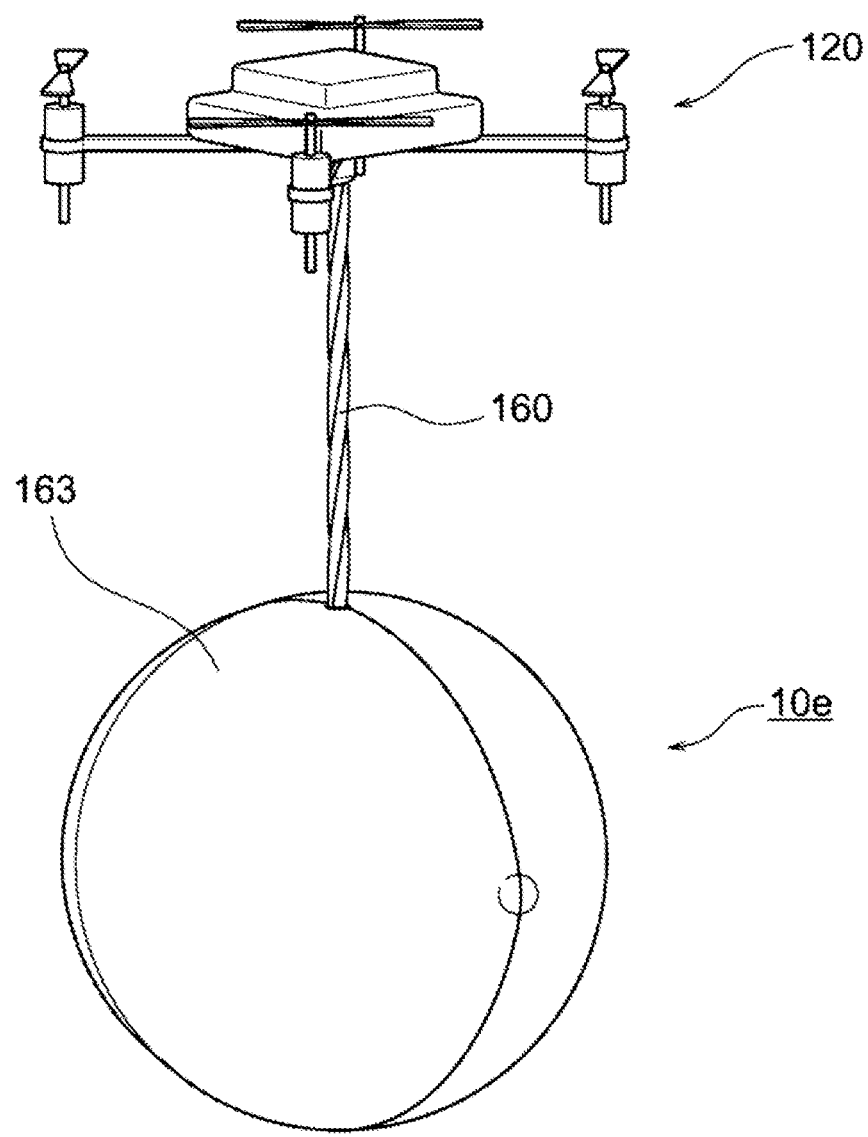
FIG. 63 is a schematic view of the coupling device according to the tenth embodiment before a suspension subject is suspended therefrom.

Next, an operation of the coupling device 10e of the tenth embodiment will be described. FIG. 63 is a schematic view of the coupling device 10e before the suspension subject 85 is suspended from the coupling device 10e. Before the suspension subject 85 is suspended, the capsule member 163 of the coupling device 10e is closed. After the operator operates the drone 120 so that the drone 120 sufficiently approaches the suspension subject 85 from above, the operator performs a suspension start operation to open the capsule member 163, as shown in FIG. 59.

Next, the drone 120 lowers the wire rope 160 toward the vertical direction lower side. At this time, the rope fixing member 165, which is constituted by an electromagnet, is electrified so as to generate magnetic force. When the wire rope 160 is lowered such that the rope fixing member 165 approaches the bottom plate fixing member 84i, the rope fixing member 165 is attracted and fixed to the bottom plate fixing member 84i, which is constituted by a ferromagnetic material, by the magnetic force. As a result, the wire rope 160 is positioned above the suspension subject 85.

Next, when the drone 120 lowers the wire rope 160, since the rope engagement member 161 is engaged to the wire rope 160, as shown in FIG. 62, the rope engagement member 161, the detachable members 20 connected thereto, and the clamping member 162 descend together with the wire rope 160. At this time, the capsule member 163g is open, and therefore large air resistance is generated in the capsule member 163 such that the speed at which the wire rope 160, the rope engagement member 161, and the detachable members 20 descend is appropriately reduced. Next, as a result of lowering the wire rope 160, the detachable members 20 come into contact with the annular suspension member 84f. When the detachable members 20 are lowered further, the detachable members 20 are coupled to the annular suspension member 84f. As a result, the suspension subject 85 is suspended from the detachable members 20.

Next, when the drone 120 raises the wire rope 160 in response to a transportation start operation performed by the operator, the suspension subject 85 suspended by the detachable members 20 ascends. Next, when the operator performs an operation to close the capsule member 163 after the suspension subject 85 has ascended to a predetermined altitude, the capsule member 163 is closed, whereby flight preparation on the drone 120 for transporting the suspension subject 85 is completed. When the capsule member 163 receives wind while the drone 120 is in flight, the pointed portion thereof faces the direction of travel so that air resistance is naturally reduced by the shape thereof. Thus, the air resistance of the coupling device 10e and the suspension subject 85 can be reduced while the drone 120 is in flight.

Next, after the drone 120 has flown to a location for unloading the suspension subject 85, the capsule member 163 is opened, as shown in FIG. 59, in response to a transportation completion operation performed by the operator. Next, the drone 120 stops electrifying the rope fixing member 165 so as to halt the generation of magnetic force. As a result, the fixture between the rope fixing member 165 and the bottom plate fixing member 84i is released. Next, the drone 120 lowers the detachable members 20 toward the vertical direction lower side by lowering the wire rope 160 toward the vertical direction lower side. Next, after the lowered suspension subject 85 touches the ground, the wire rope 160 is lowered further so as to release the coupling between the detachable members 20 and the annular suspension member 84f, whereby the suspension subject 85 is disposed in a transportation target location.

As described above, the coupling device 10e of the tenth embodiment further includes the rope engagement member 161 connecting the at least two detachable members 20, the wire rope 160 is a vertically extending rope formed by twisting together a plurality of strands, the suspension fitting 84e includes the annular suspension member 84f configured such that the suspension subject 85 is connected to the lower portion thereof and the detachable members 20 can be attached to and detached from the upper portion thereof, and the rope engagement member 161 is engaged to the strands forming the outer shape of the wire rope 160. Therefore, coupling and uncoupling of the detachable members 20 connected to the drone 120 and the suspension subject 85 can be performed easily. Further, the rope fixing member 165 is provided on the lower end portion of the wire rope 160, and the bottom plate fixing member 84i that can be coupled to the rope fixing member 165 is provided on the lower portion of the suspension subject 85. Thus, positioning for coupling the detachable members 20 to the suspension subject 85 can be performed easily.

Furthermore, the capsule member 163 is attached to the upper side of the rope engagement member 161 so as to be openable and closeable and formed to be capable of housing the rope engagement member 161 and the detachable members when closed, and therefore the air resistance of the coupling device 10e and the suspension subject 85 can be reduced while the drone 120 is in flight.

Eleventh Embodiment

Next, a coupling device according to an eleventh embodiment of this invention will be described. The eleventh embodiment differs from the tenth embodiment in that a tubular member for positioning the coupling device is further provided.

Figure 64:
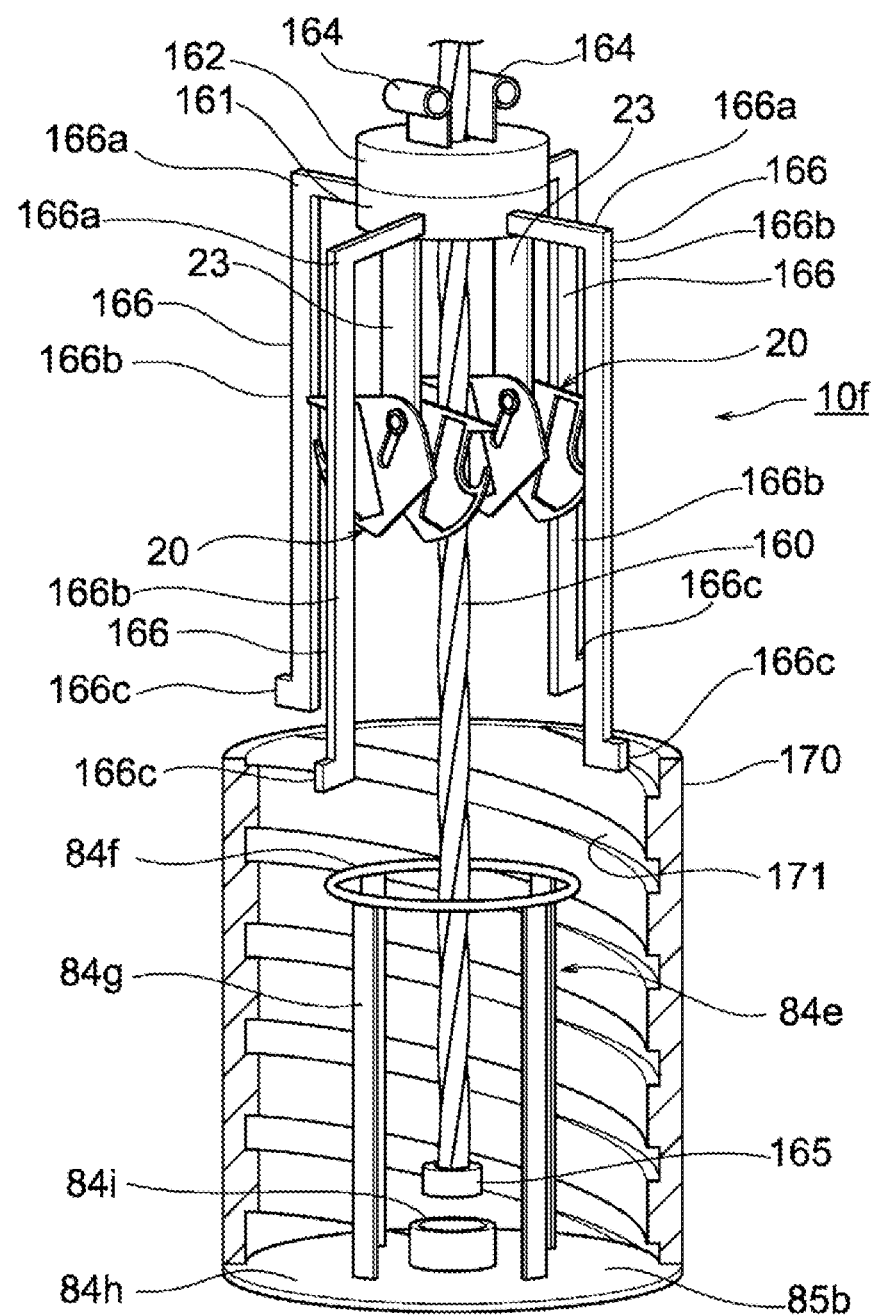
FIG. 64 is a partial sectional view of a coupling device according to an eleventh embodiment.

FIG. 64 is a partial sectional view of a coupling device 10f of the eleventh embodiment. A tubular member 170 that extends in the vertical direction and houses the suspension fitting 84e is provided on an outer peripheral portion of a suspension subject 85b. The bottom plate 84h is also used as a bottom portion of the tubular member 170. A screw portion 171 in which a right-hand thread is tapped is formed in a side wall on the inside of the tubular member 170.

Four guide rails 166 are attached to the rope engagement member 161 at 90-degree angular intervals in a circumferential direction. The guide rails 166 each include a horizontal rail 166a connected to the rope engagement member 161 so as to extend in the horizontal direction, a vertical rail 166b connected to the horizontal rail 166a so as to extend toward the vertical direction lower side, and a rectangular parallelepiped-shaped rail projection portion 166c provided on a lower end portion of the vertical rail 166b so as to project outward in a radial direction. The rail projection portion 166c is formed to be screwable and unscrewable to and from the screw portion 171 on the inner surface of the tubular member 170. All other configurations are identical to the tenth embodiment.

Next, an operation of the coupling device 10f according to the eleventh embodiment will be described. After the operator operates the drone 120 so that the drone 120 sufficiently approaches the suspension subject 85 from above, the operator performs a suspension start operation to open the capsule member 163, as shown in FIG. 59. When the drone 120 lowers the wire rope 160 in order to couple the detachable members 20 to the suspension fitting 84e, the guide rails 166 connected to the rope engagement member 161, as shown in FIG. 64, the rail projection portions 166c, and the rope fixing member 165 descend. When the rope fixing member 165 approaches the bottom plate fixing member 84i, the rope fixing member 165 is attracted and fixed to the bottom plate fixing member 84i, which is formed from a ferromagnetic material, by magnetic force. As a result, the wire rope 160 is positioned above the suspension subject 85.

Next, the fall prevention stopper of the rope engagement member 161 is released. As a result, the rope engagement member 161 descends while rotating in the horizontal direction around the strands of the wire rope 160, and the guide rails 166 connected to the rope engagement member 161 also descend while rotating in the horizontal direction. At this time, the clamping member 162 does not engage with the wire rope 160, and therefore the rope engagement member 161 and the clamping member 162 are free to rotate relative to each other. Accordingly, the clamping member 162 and the capsule members 163 provided on the clamping member 162 descend without rotating as the rope engagement member 161 descends. As the guide rails 166 descend while rotating in the horizontal direction, the rail projection portions 166c of the guide rails 166 are screwed to the screw portion 171 of the tubular member 170. Thus, the detachable members 20 and the suspension fitting 84e can be positioned. At this time, the capsule member 163g is open, and therefore large air resistance is generated in the capsule member 163 such that the speed at which the wire rope 160, the rope engagement member 161, the detachable members 20, and the suspension subject 85 descend is appropriately reduced. Once the rail projection portions 166c have been screwed to the screw portion 171 of the tubular member 170, the fall prevention stopper of the rope engagement member 161 is driven so as to stop the rope engagement member 161 from falling.

Next, an operation performed in the eleventh embodiment after the drone 120 has flown to the location for unloading the suspension subject 85, the capsule member 163 has been opened by the transportation completion operation performed by the operator, and electrification of the rope fixing member 165 has been stopped so as to halt the generation of magnetic force will be described. When the wire rope 160 is raised in order for the drone 120 to move after the suspension subject 85 lowered to the transportation target position touches the ground such that the coupling between the detachable members 20 and the annular suspension member 84f is released and the suspension subject 85 is disposed in the transportation target position, the rail projection portions 166c of the guide rails 166 rotate around the screw portion 171 of the tubular member 170 such that the rail projection portions 166c are unscrewed from the screw portion 171.

As described above, the coupling device 10g of the eleventh embodiment further includes the tubular member 170 that extends in the vertical direction and houses the suspension fitting 84e, the rope engagement member 161 includes the guide rails 166, and the screw portion 171 is formed in the side wall of the tubular member 170 on the inside of the side wall so as to be screwable to the guide rails 166, and thus the detachable members 20 and the suspension fitting 84e can be positioned.

Twelfth Embodiment

Next, a coupling device according to a twelfth embodiment of this invention will be described. The twelfth embodiment differs from the eleventh embodiment in that the shape of the guide rails connected to the rope engagement member has been modified.

Figure 65:
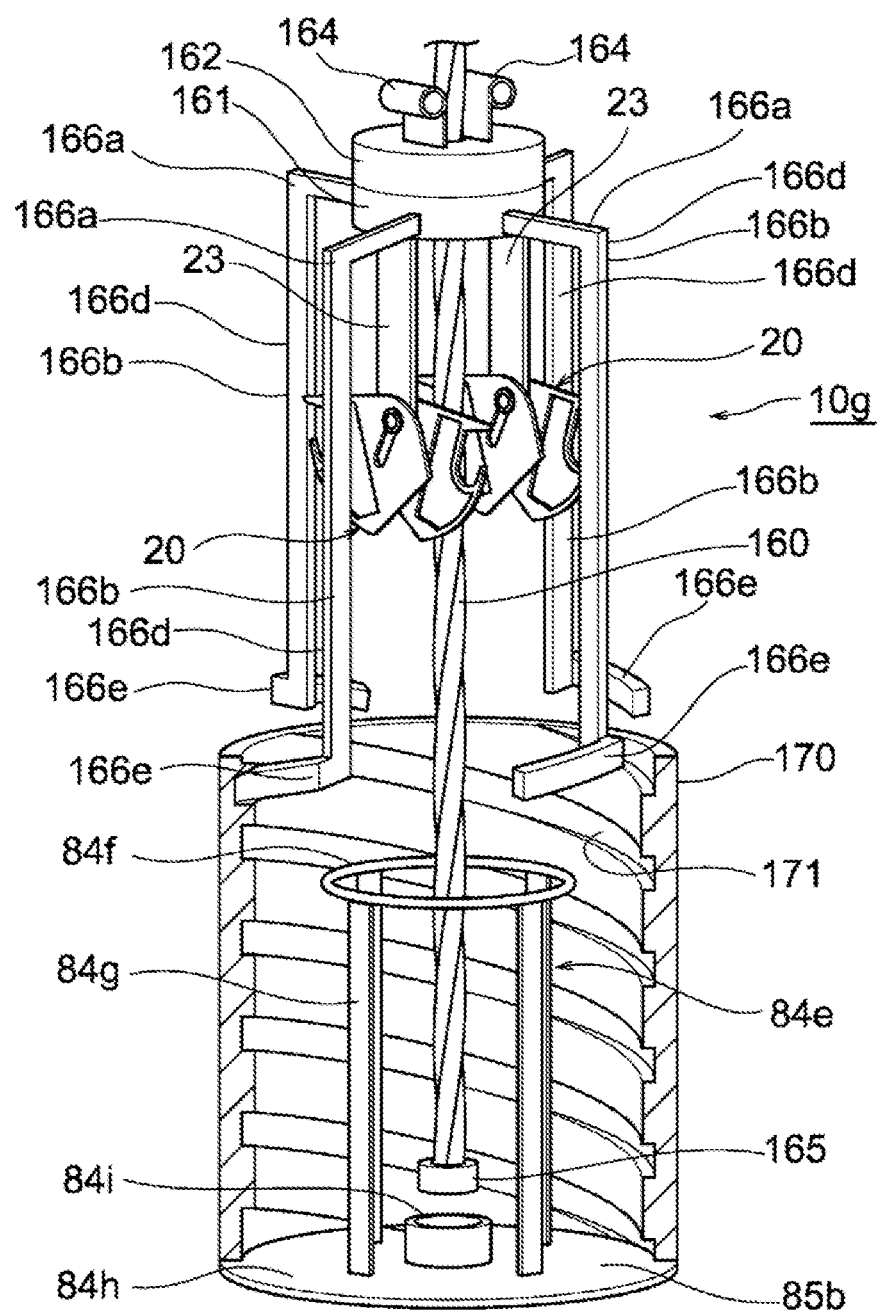
FIG. 65 is a partial sectional view of a coupling device according to a twelfth embodiment.

FIG. 65 is a partial sectional view of a coupling device 10g of the twelfth embodiment. Rail projection portions 166e provided so as to jut out toward the radial direction outside and project around the circumferential direction are formed on the lower end portions of the vertical rails 166b of guide rails 166d provided on the rope engagement member 161 of the coupling device 10g. The rail projection portions 166e are shaped so as to be screwable to and unscrewable from the thread groove of the screw portion 171 on the tubular member 170. All other configurations are identical to the eleventh embodiment.

As described above, in the coupling device 10g of the twelfth embodiment, the rail projection portions 166e provided so as to project around the circumferential direction are formed on the lower end portions of the vertical rails 166b of the guide rails 166d provided on the rope engagement member 161, and therefore, by screwing the rail projection portions 166c to the screw portion 171 of the tubular member 170, the detachable members 20 and the suspension fitting 84e can be positioned.

Thirteenth Embodiment

Next, a coupling device according to a thirteenth embodiment of this invention will be described. The thirteenth embodiment differs from the eleventh embodiment in that the form of the tubular member has been modified.

Figure 66:
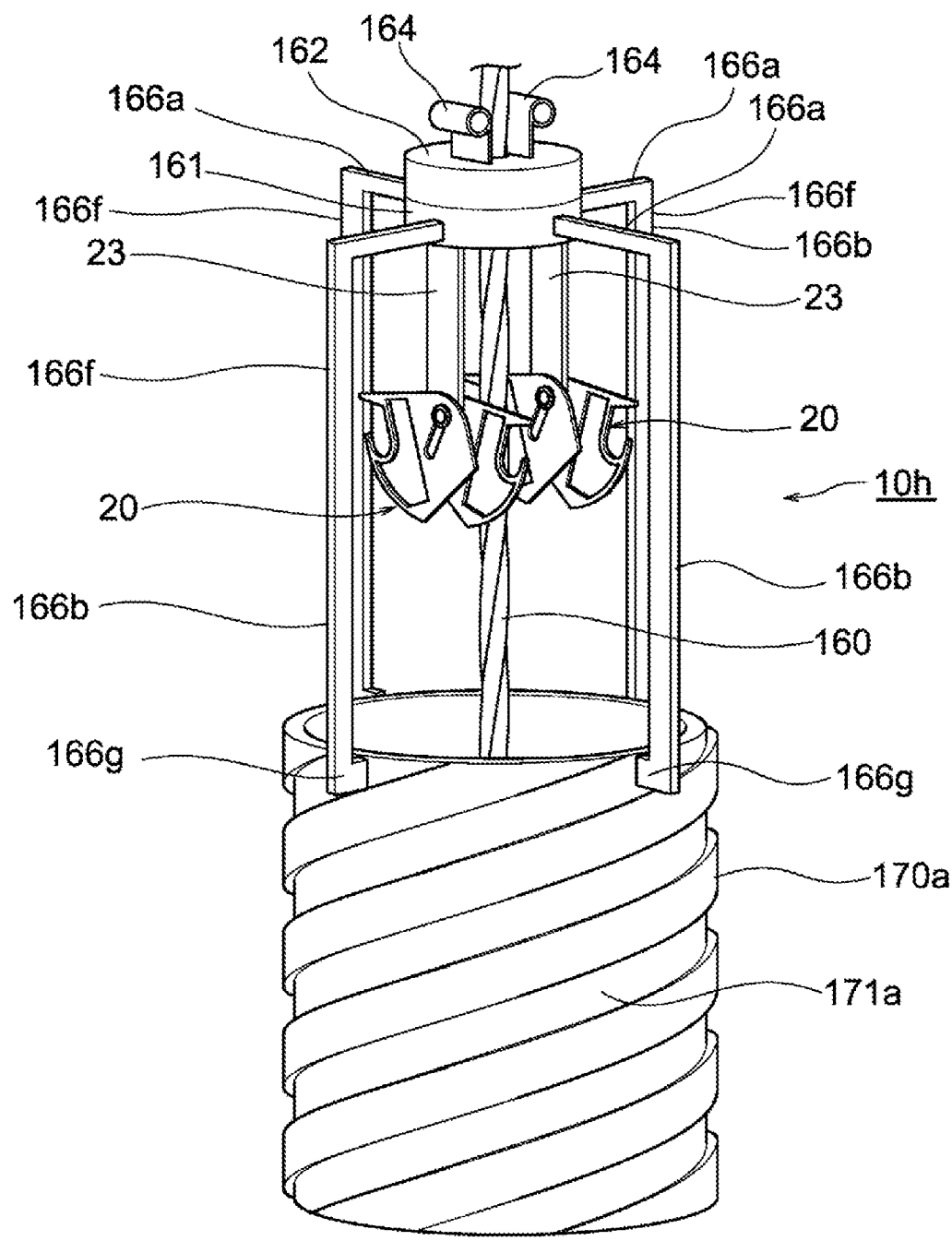
FIG. 66 is a schematic view of a coupling device according to a thirteenth embodiment.

FIG. 66 is a schematic view of a coupling device 10h of the thirteenth embodiment. A screw portion 171a in which a right-hand thread is tapped is formed in a side wall on the outside of a tubular member 170a. Further, although not shown in the figure, the suspension fitting 84e and the suspension subject 85 are provided in the interior of the tubular member 170a. Rectangular parallelepiped-shaped rail projection portions 166g provided so as to project inwardly in the radial direction are formed on the tip end portions of the vertical rails 166b of guide rails 166f provided on the rope engagement member 161. The rail projection portions 166g are shaped so as to be screwable to and unscrewable from the screw portion 171a on the outside side wall of the tubular member 170a. All other configurations are identical to the eleventh embodiment.

As described above, in the coupling device 10h of the thirteenth embodiment, the rectangular parallelepiped-shaped rail projection portions 166g provided so as to project inwardly in the radial direction are formed on the tip end portions of the vertical rails 166b of the guide rails 166f provided on the rope engagement member 161, and the screw portion 171a formed to be screwable to the rail projection portions 166g is formed on the outside side wall of the tubular member 170a. Thus, the detachable members 20 and the suspension fitting 84e can be positioned.

Fourteenth Embodiment

Next, a coupling device according to a fourteenth embodiment of this invention will be described. The fourteenth embodiment differs from the thirteenth embodiment in that the shape of the guide rails connected to the rope engagement member has been modified.

Figure 67:
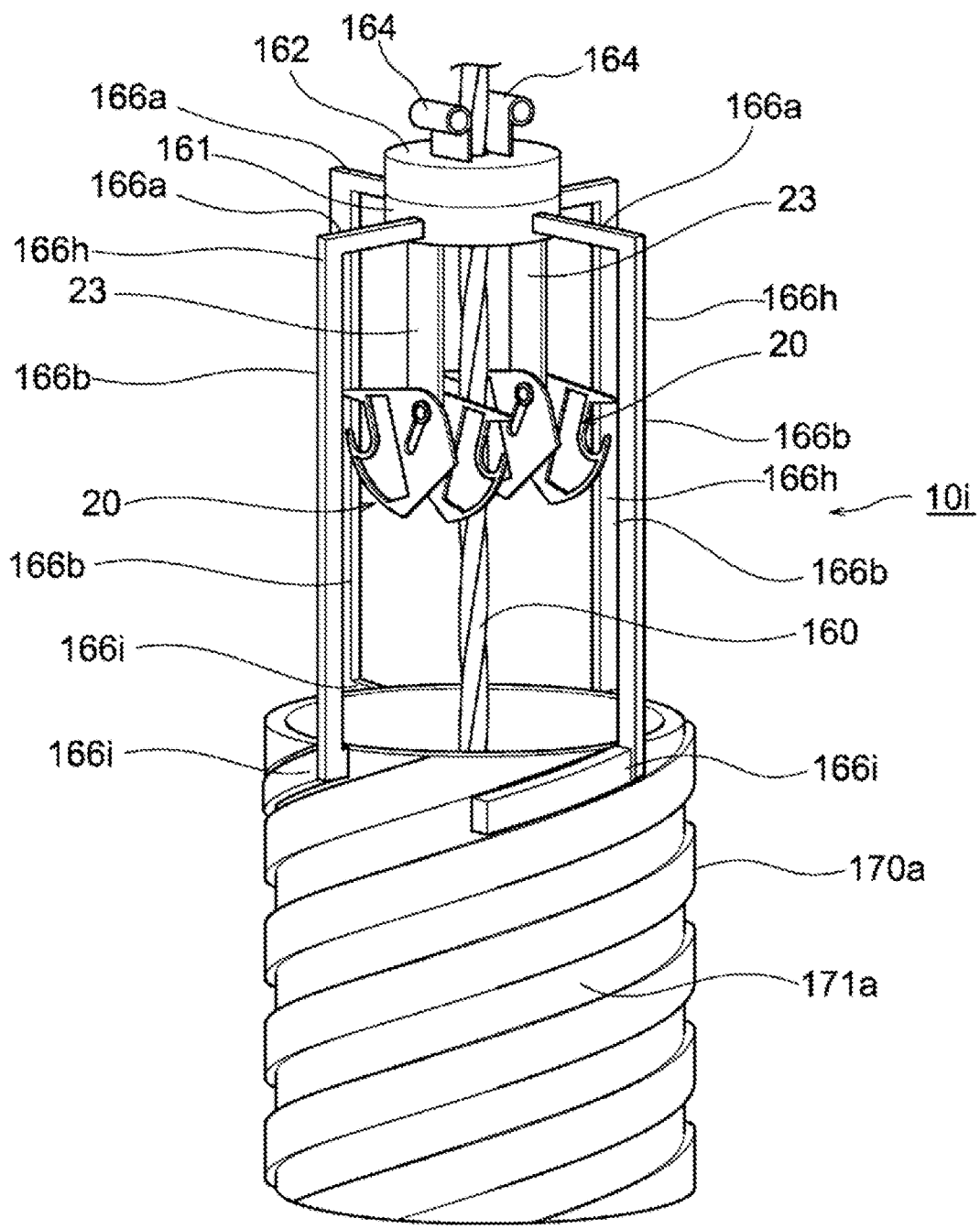
FIG. 67 is a schematic view of a coupling device according to a fourteenth embodiment.

FIG. 67 is a schematic view of a coupling device 10i of the fourteenth embodiment. The screw portion 171a is formed on the outside side wall of the tubular member 170a. Further, although not shown in the figure, the suspension fitting 84e and the suspension subject 85 are provided in the interior of the tubular member 170a. Rail projection portions 166i provided so as to jut out toward the radial direction inside and project around the circumferential direction are formed on the tip end portions of the vertical rails 166b of guide rails 166h provided on the rope engagement member 161. The rail projection portions 166i are shaped to be screwable to and unscrewable from the screw portion 171a on the outside side wall of the tubular member 170a. All other configurations are identical to the thirteenth embodiment.

As described above, in the coupling device 10i of the fourteenth embodiment, the rectangular parallelepiped-shaped rail projection portions 166i provided so as to project inwardly in the radial direction are formed on the lower end portions of the vertical rails 166b of the guide rails 166h provided on the rope engagement member 161, and the screw portion 171a formed to be screwable to the rail projection portions 166i is formed on the outside side wall of the tubular member 170a. Thus, the detachable members 20 and the suspension fitting 84e can be positioned.

Note that the screw portion 171 of the eleventh and twelfth embodiments and the screw portion 171a of the thirteenth and fourteenth embodiments are screw portions in which a right-hand thread is tapped, but may be screw portions in which a left-hand thread is tapped.

Fifteenth Embodiment

Next, a coupling device according to a fifteenth embodiment of this invention will be described. The fifteenth embodiment differs from the tenth embodiment in that the configuration of the rope fixing member on the lower end portion of the wire rope 160 has been modified.

Figure 68:
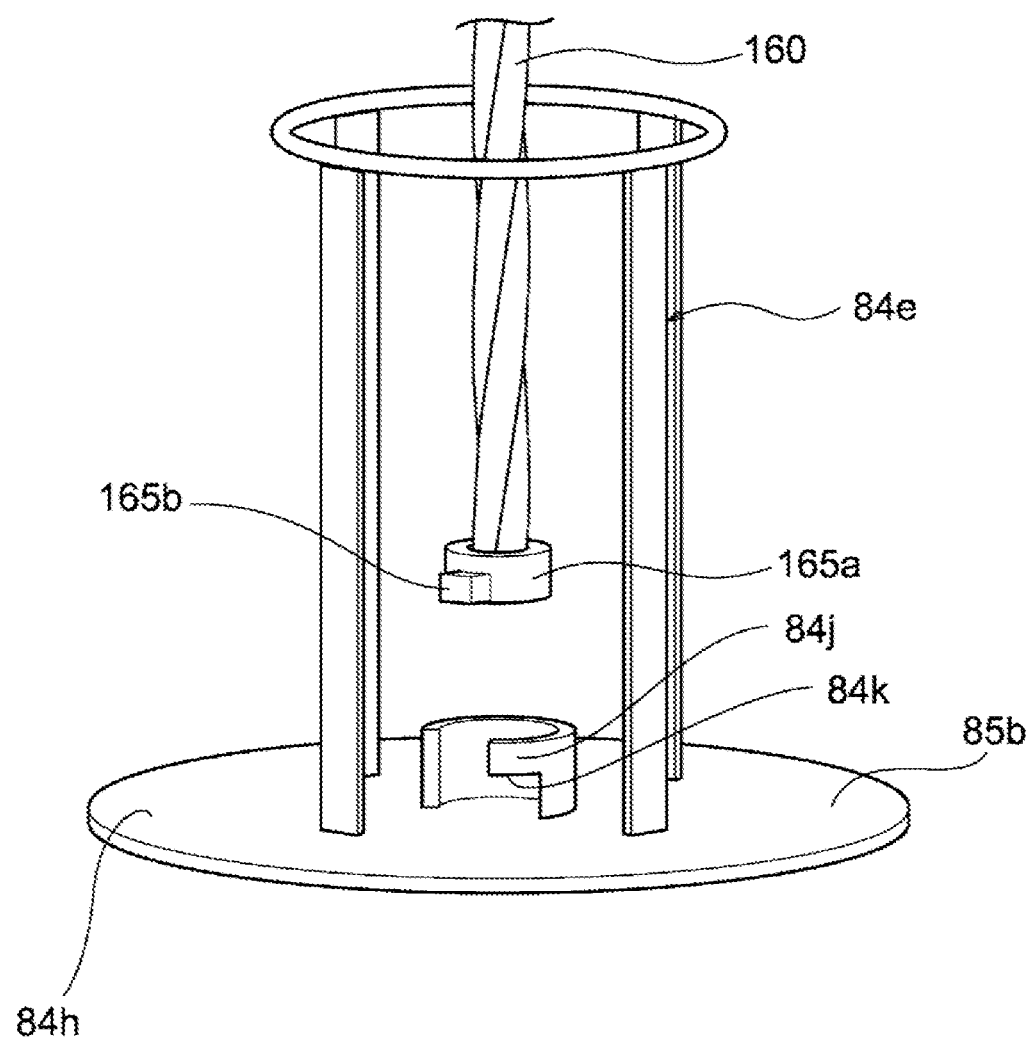
FIG. 68 is a schematic view showing a rope fixing member for a wire rope and a bottom plate fixing member according to a fifteenth embodiment.

FIG. 68 is a schematic view showing the rope fixing member and the bottom plate fixing member of the wire rope 160 according to the fifteenth embodiment. A rope fixing member 165a formed from resin is provided on the lower end portion of the wire rope 160. The rope fixing member 165a includes a fixing member projecting portion 165b that projects outward in the radial direction. Further, a bottom plate fixing member 84j formed from resin is provided on the circular bottom plate 84h of the suspension subject 85. A cutout 84k that extends in the vertical direction, and on the lower portion of the bottom plate fixing member 84j extends in the circumferential direction, is formed in the bottom plate fixing member 84j.

Figure 69:
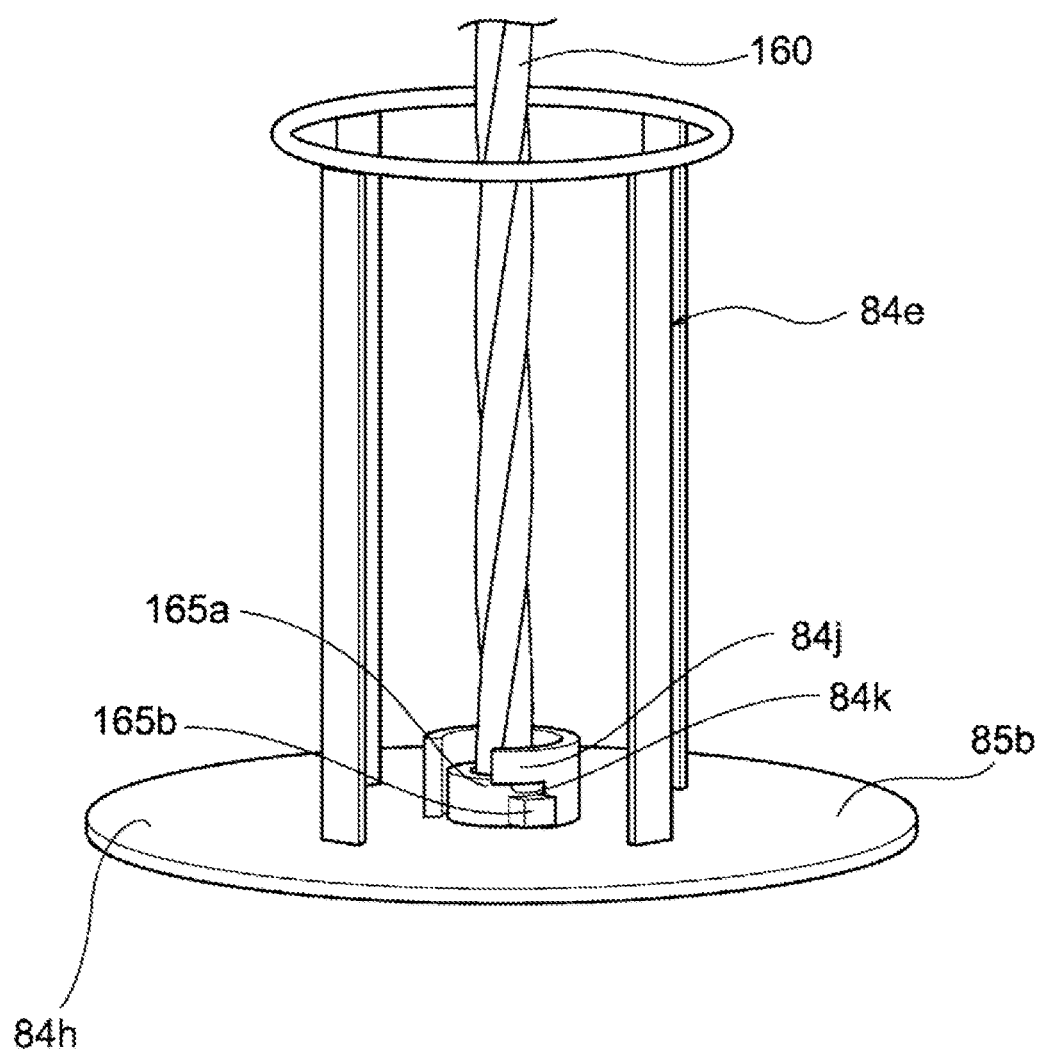
FIG. 69 is a schematic view showing the rope fixing member according to the fifteenth embodiment when fixed to the bottom plate fixing member.

FIG. 69 is a schematic view showing the rope fixing member 165a when fixed to the bottom plate fixing member 84j. When the rope fixing member 165a is to be fixed to the bottom plate fixing member 84j, the wire rope 160 is lowered so that the fixing member projecting portion 165b of the rope fixing member 165a is inserted into the cutout 84k in the bottom plate fixing member 84j. Next, when the drone 120 rotates the wire rope 160 in the horizontal direction, the fixing member projecting portion 165b is fitted to the cutout 84k. As a result, the wire rope 160 is fixed to the bottom plate 84h.

As described above, in the coupling device 10e of the fifteenth embodiment, the rope fixing member 165a provided on the wire rope 160 includes the fixing member projecting portion 165b that projects outward in the radial direction, and the fixing member projecting portion 165b is fitted to the cutout 84k provided in the bottom plate 84h. Thus, the wire rope 160 can be fixed to the bottom plate 84h by a simple configuration.

Note that the configuration of the fifteenth embodiment is not limited to being applied only to the invention of the tenth embodiment, and may also be applied to the eleventh to fourteenth embodiments as desired.

Sixteenth Embodiment

Next, a coupling device according to a sixteenth embodiment of this invention will be described. The sixteenth embodiment differs from the fifteenth embodiment in that the method for attaching the rope fixing member has been modified.

Figure 70:
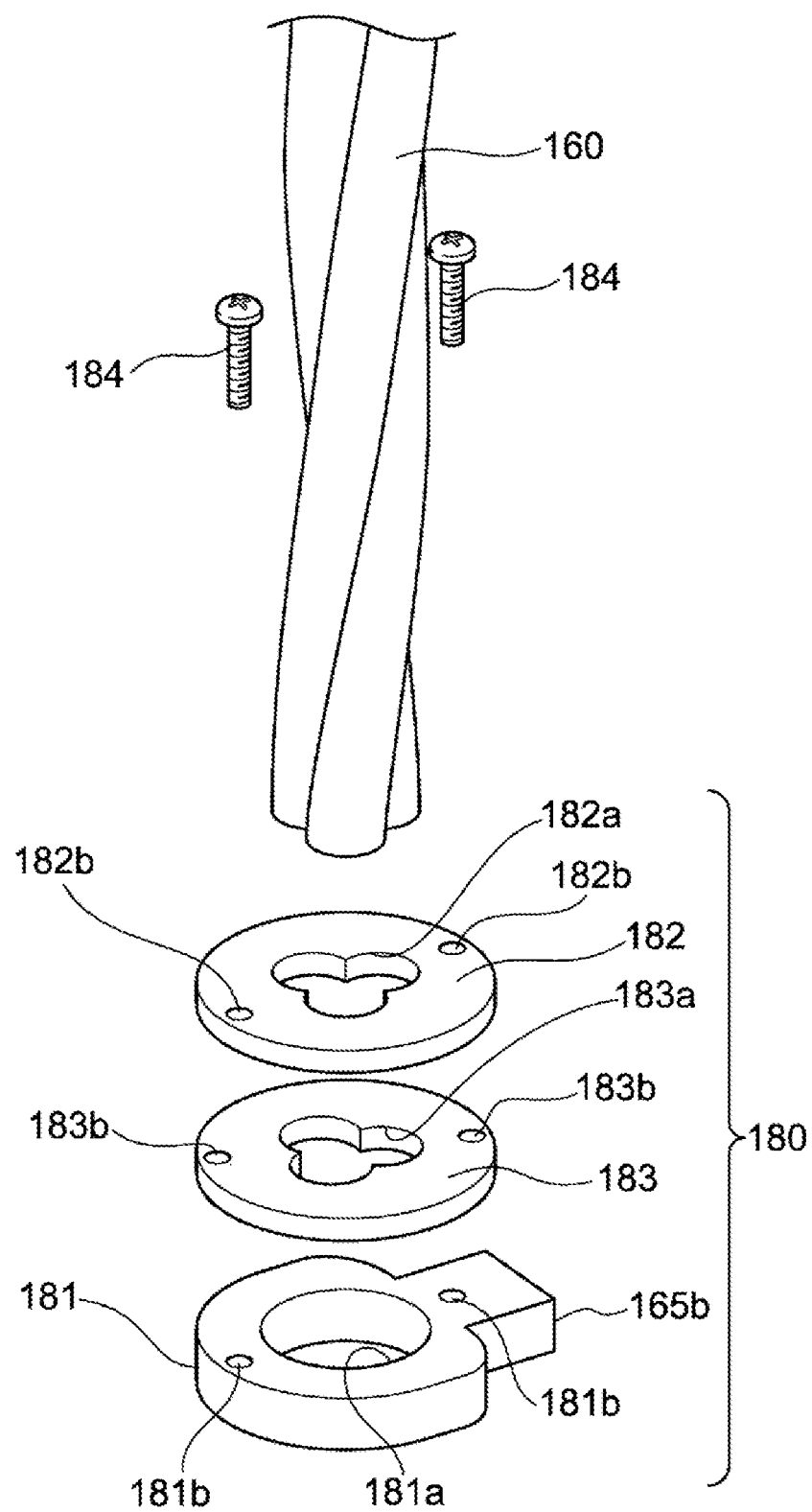
FIG. 70 is an exploded view of a rope fixing member according to a sixteenth embodiment.

FIG. 70 is an exploded view of a rope fixing member 180 according to the sixteenth embodiment. The rope fixing member 180 provided on the lower end portion of the wire rope 160 is constituted by a key portion 181, a first end portion fixing plate 1182, a second end portion fixing plate 183, and screws 184. The key portion 181 has an annular shape and includes a central hole 181a formed in a central portion thereof, the fixing member projecting portion 165b projecting outward in the radial direction, and screw holes 181b extending in the vertical direction.

The first end portion fixing plate 182 and the second end portion fixing plate 183 have the same annular shape and respectively include an engagement hole 182a and an engagement hole 183a that can engage with the strands forming the outer shape of the wire rope 160. The first and second end portion fixing plates 182, 183 also respectively include screw holes 182b and screw holes 183b. All other configurations are identical to the fifteenth embodiment.

Figure 71:
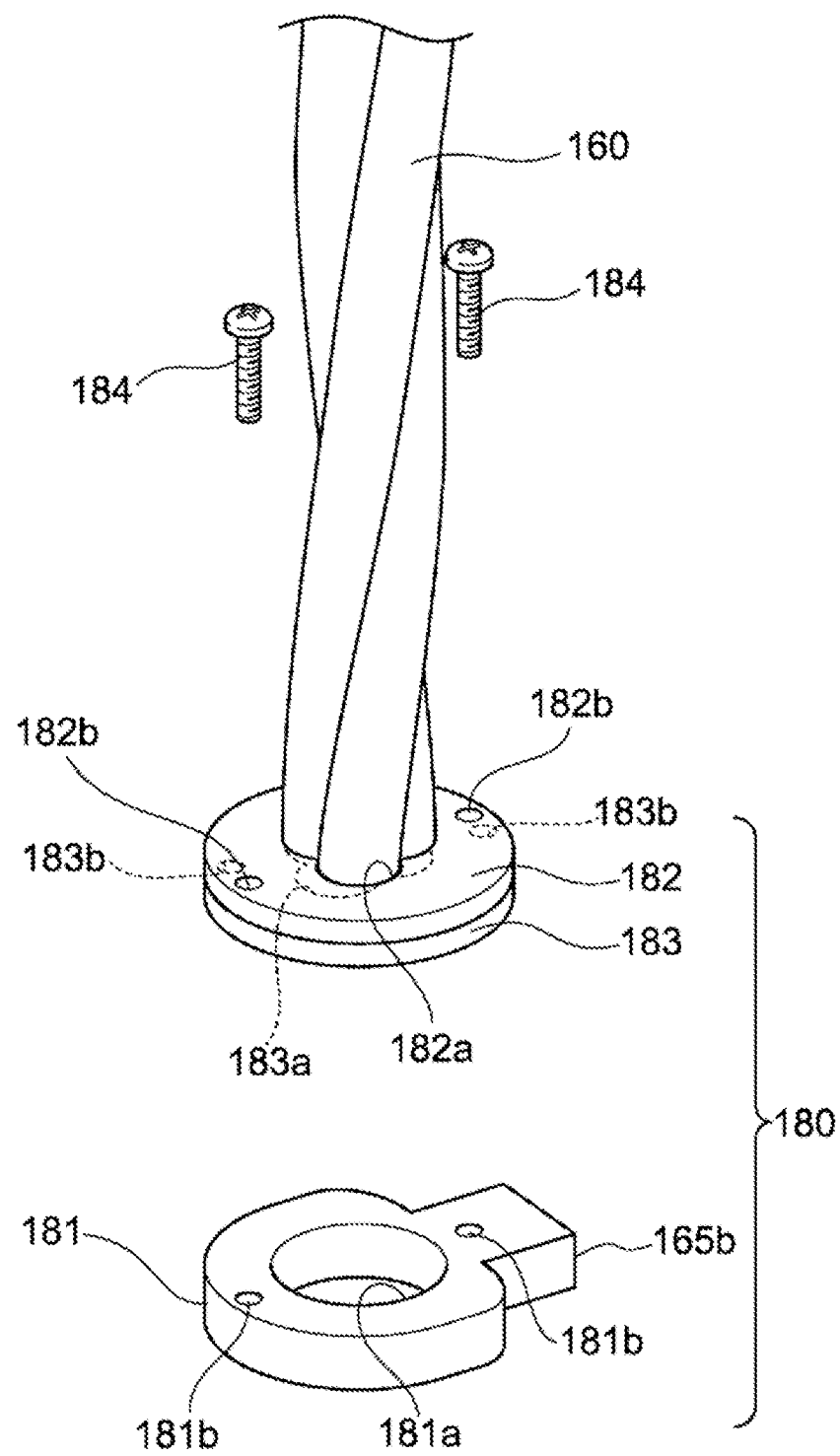
FIG. 71 is a schematic view showing a method for attaching the rope fixing member according to the sixteenth embodiment.

Next, a method for attaching the rope fixing member 180 according to the sixteenth embodiment will be described. FIG. 71 is a schematic view showing the method for attaching the rope fixing member 180 according to the sixteenth embodiment. First, the lower end portion of the wire rope 160 is inserted into the engagement hole 182a in the first end portion fixing plate 182 and the engagement hole 183a in the second end portion fixing plate 183. At this time, a circumferential direction angular difference occurs between the first end portion fixing plate 182 and the second end portion fixing plate 183 engaged to the lower end portion of the wire rope 160 due to twisting of the outer diameter portion of the strands on the lower end portion of the wire rope 160, and as a result, a deviation occurs between the respective circumferential direction positions of the screw holes 182b in the first end portion fixing plate 182 and the screw holes 183b in the second end portion fixing plate 183 when seen from the vertical direction upper side. Note that in FIG. 71, the engagement hole 183a and the screw holes 183b in the second end portion fixing plate 183 are shown as being projected onto positions on the upper surface of the first end portion fixing plate 182.

Figure 72:
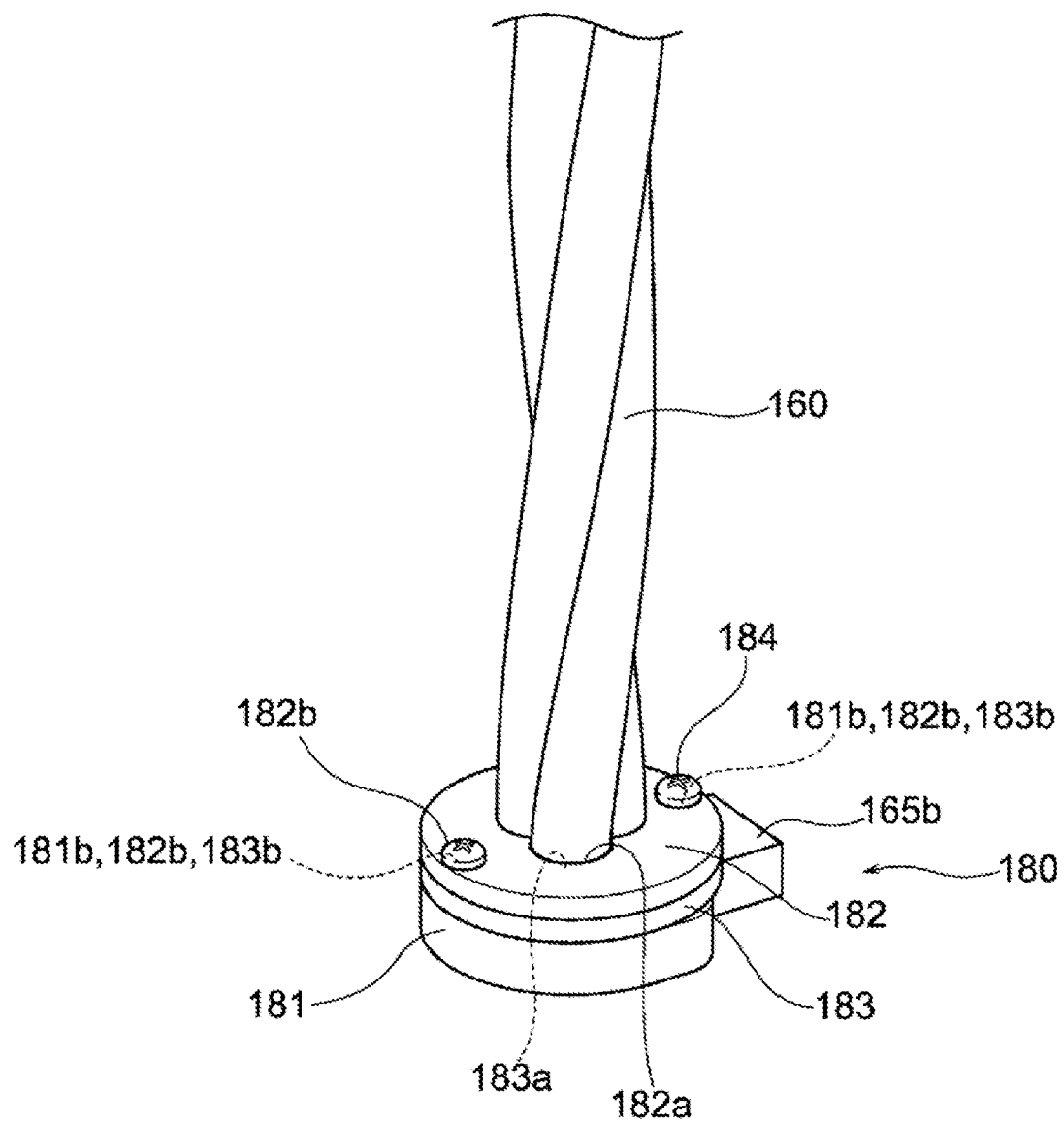
FIG. 72 is a schematic view showing a state in which attachment of the rope fixing member according to the sixteenth embodiment is complete.

Next, the second end portion fixing plate 183 is rotated in the horizontal direction so that the screw holes 182b in the first end portion fixing plate 182 are aligned with the screw holes 183b in the second end portion fixing plate 183. As a result, the engagement hole 183a in the second end portion fixing plate 183 digs into and is fixed to the outer diameter portion of the strands on the lower end portion of the wire rope 160. FIG. 72 is a schematic view showing a state in which attachment of the rope fixing member 180 according to the sixteenth embodiment is complete. As shown in FIG. 72, by inserting the lower end portion of the wire rope 160 into the central hole 181a in the key portion 181 and inserting the screws 184 into the screw holes 182b, the screw holes 183b, and the screw holes 181b, the rope fixing member 180 is fixed and attached.

As described above, in the coupling device 10e of the sixteenth embodiment, the rope fixing member 180 includes the key portion 181, the first end portion fixing plate 182, and the second end portion fixing plate 183, and by rotating the second end portion fixing plate 183 in the horizontal direction so as to fix the second end portion fixing plate 183, the rope fixing member can be fixed to the lower end portion of the wire rope 160 without performing fixing by means of caulking or the like, which requires specialized tools.

Seventeenth Embodiment

Next, a coupling device according to a seventeenth embodiment of this invention will be described. The seventeenth embodiment differs from the eleventh embodiment in that an air brake is further provided.

Figure 73:
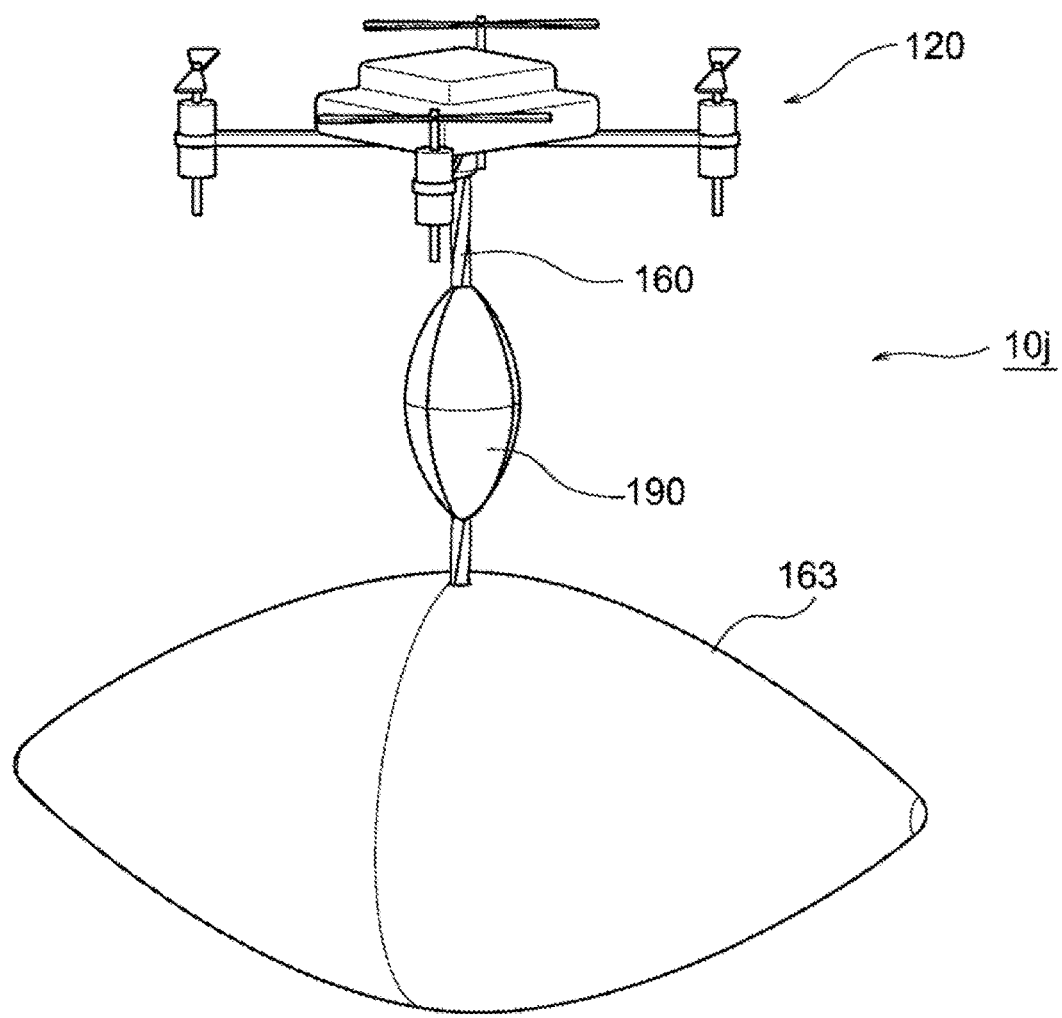
FIG. 73 is a schematic view of a coupling device according to a seventeenth embodiment.

FIG. 73 is a schematic view of a coupling device 10j of the seventeenth embodiment. An air brake 190 is attached to the wire rope 160 between the drone 120 and the capsule member 163. All other configurations are identical to the eleventh embodiment.

Next, an operation of the coupling device 10j of the seventeenth embodiment will be described. As shown in FIG. 73, while the drone 120 is in flight, the air brake 190 is in a non-expanded state, thereby reducing air resistance while the drone 120 is in flight.

Figure 74:
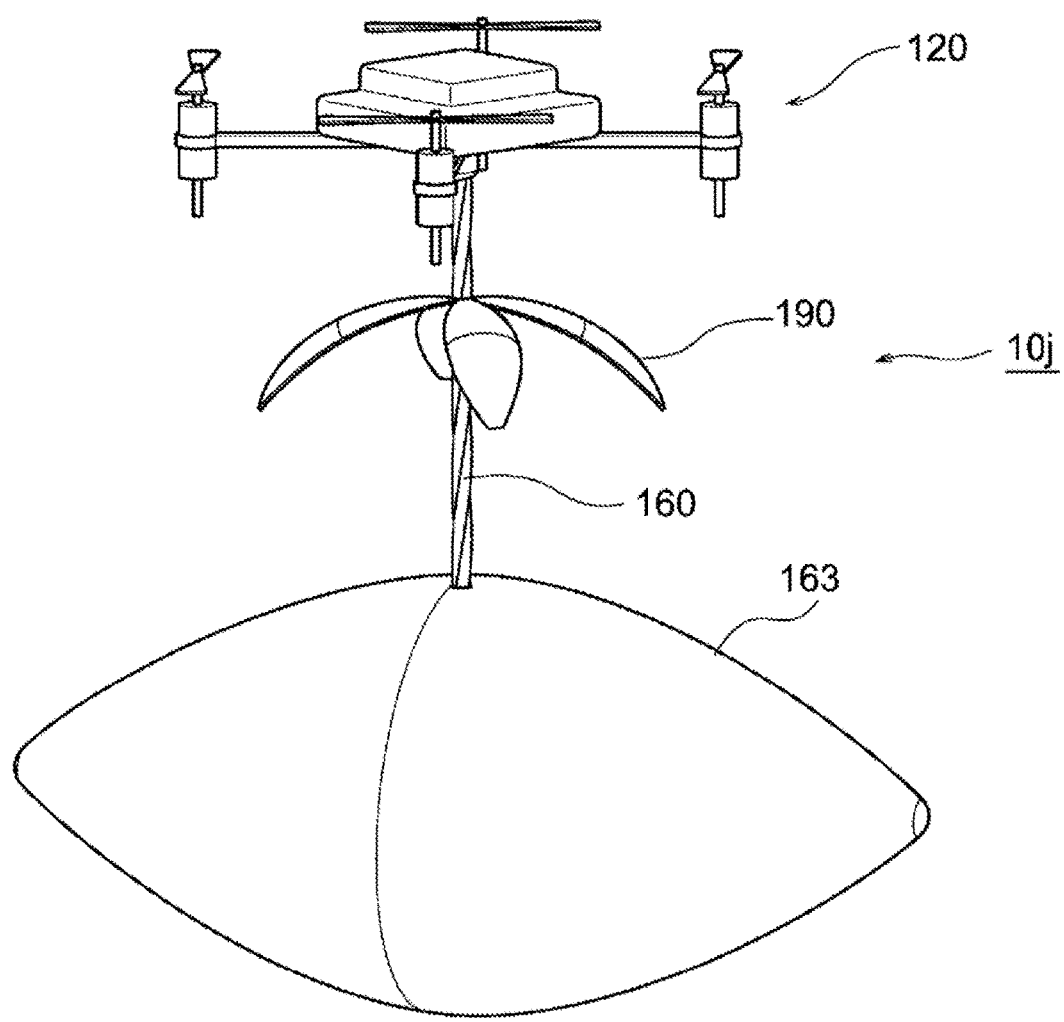
FIG. 74 is a schematic view showing an air brake shown in FIG. 73 in an expanded state.

FIG. 74 is a schematic view showing the air brake 190 of the seventeenth embodiment in an expanded state. When the capsule member 163 is lowered by releasing the fall prevention stopper so as to lower the rope engagement member 161, the air brake 190 is set in an expanded state. In so doing, the descent speed of the capsule member 163 descending in the vertical direction is appropriately reduced by the air brake 190, and as a result, the capsule member 163 can be prevented from colliding with the ground surface or the like so as to cause damage to the suspension subject and so on.

As described above, in the coupling device 10j of the seventeenth embodiment, the descent speed of the capsule member 163 descending in the vertical direction is appropriately reduced by the air brake 190, and as a result, the capsule member 163 can be reliably prevented from colliding with the ground surface or the like so as to cause damage to the suspension subject 85 and so on.

Note that the configuration of the seventeenth embodiment is not limited to being applied only to the invention of the eleventh embodiment, and may also be applied to the tenth and twelfth to sixteenth embodiments as desired.

REFERENCE SIGNS LIST 20, 20a, 20b, 20c Detachable member
21, 21b, 21c First coupling member
22, 22b, 22c Second coupling member
23, 26, 27 Connecting member
24 Fixing shaft
25 Guide bar member
26g Connecting member spacer
30 Height difference filling member coupling member (third coupling member)
40 Joint member
50b Elongated hole
51a, 51b Arc-shaped portion (contact portion)
51c, 51d Rectilinear portion (contact portion)
52a, 52b Semicircular arc portion (hook-shaped portion)
54a, 54b Tongue portion (one end portion)
55b Release arm
58a, 58b Bend portion (other end portion)
60 First height difference filling member (second coupling subject member)
70 Second height difference filling member (second coupling subject member)
81 Grating
83a, 83b Space (height difference)
84 Grille (first coupling subject member)
84a, 84c, 84e Suspension fitting (first coupling subject member)

84f Annular suspension member (annular member)
84i Bottom plate fixing member (subject fixing member)
84k Cutout
85 Suspension subject
100 Boom (second coupling subject member)
103 Hook block (third coupling member)
110 Prize acquiring device (second coupling subject member)
112 Telescopic boom (third coupling member)
120 Drone (second coupling subject member)
130a First gear (first coupling member arc-shaped gear)
130b Second gear (second arc-shaped gear)
140 Spacer
150 Telescopic mechanism (third coupling member)
160 Wire rope (rope, third coupling member)
161 Rope engagement member
163 Capsule member
165 Rope fixing member
165b Fixing member projecting portion
166, 166d, 166f Guide rail
166b Vertical rail
166c, 166e, 166g, 166i Rail projection portion
170, 170a Tubular member
171, 171a Screw portion
180 Rope fixing member
181 Key portion
182 First end portion fixing plate
183 Second end portion fixing plate
190 Air brake

The invention claimed is:

1. A coupling device comprising:
a detachable member that can be attached to and detached from a first coupling subject member;
a first coupling member provided on the detachable member;
a second coupling member provided on the detachable member;
a connecting member provided on the detachable member so as to connect the first coupling member and the second coupling member; and
a third coupling member connected to the detachable member and coupled to a second coupling subject member,
wherein the first coupling member and the second coupling member each include:
an elongated hole;
a contact portion provided on an outer peripheral lower portion of the first coupling member and the second coupling member such that one end portion is positioned on an upper side of another end portion; and
a hook-shaped portion provided on the one end portion of the contact portion so as to be connectable to the first coupling subject member,
the connecting member includes at least one fixing shaft that extends in a horizontal direction and is inserted into respective elongated holes in the first coupling member and the second coupling member,
the first coupling member and the second coupling member are supported so as to be capable of rotating about the fixing shaft and moving relative to the fixing shaft, and
when the detachable member moves toward a lower side while the first coupling member and the second coupling member are not coupled to the first coupling subject member, respective contact portions of the first coupling member and the second coupling member are pressed by the first coupling subject member, whereby the first coupling member and the second coupling member rotate about the fixing shaft such that the one end portion of each of the contact portions moves toward the upper side, and move relative to the fixing shaft in a direction for reducing a distance from the contact portion of the first coupling member to the contact portion of the second coupling member,
when the detachable member then moves further toward the lower side such that the first coupling subject member separates from the respective contact portions of the first coupling member and the second coupling member, the first coupling member and the second coupling member move relative to the fixing shaft in a direction for increasing the distance from the contact portion of the first coupling member to the contact portion of the second coupling member, and
when the detachable member then moves toward the upper side, respective hook-shaped portions of the first coupling member and the second coupling member are connected to the first coupling subject member such that the detachable member is coupled to the first coupling subject member.

2. The coupling device according to claim 1, wherein the first coupling member and the second coupling member each include a release arm that is provided on the upper side of the hook-shaped portion and extends in a direction that intersects a direction extending along the contact portion, and
when the detachable member moves toward the lower side while the respective hook-shaped portions of the first coupling member and the second coupling member are connected to the first coupling subject member, respective release arms of the first coupling member and the second coupling member are pressed toward the upper side from the lower side by the first coupling subject member, whereby the first coupling member and the second coupling member rotate about the fixing shaft such that the release arms move toward the upper side,
when the detachable member then moves further toward the lower side such that the first coupling subject member separates from the respective release arms of the first coupling member and the second coupling member, the first coupling member and the second coupling member rotate about the fixing shaft such that the release arms move toward the lower side, and
when the detachable member then moves toward a vertical direction upper side, the respective release arms of the first coupling member and the second coupling member are pressed toward the lower side by respective coupling subject members, whereby the first coupling member and the second coupling member rotate about the fixing shaft such that the release arms move toward the lower side, with the result that the coupling between the detachable member and the first coupling subject member is released.

3. The coupling device according to claim 1, wherein the first coupling member includes a first arc-shaped gear and the second coupling member includes a second arc-shaped gear, and
the first arc-shaped gear and the second arc-shaped gear are capable of meshing with each other when the first coupling member and the second coupling member rotate about the fixing shaft or move relative to the fixing shaft.

4. The coupling device according to claim 1, wherein the respective contact portions of the first coupling member and the second coupling member are arc-shaped portions.

5. The coupling device according to claim 1, wherein the respective contact portions of the first coupling member and the second coupling member are rectilinear portions.

6. The coupling device according to claim 1, comprising a joint member that has biaxial degrees of freedom and connects the connecting member to the third coupling member,
wherein the first coupling subject member is a grating, and the second coupling subject member is a height difference filling member for filling in a height difference between the grating and a road surface on which the grating is provided.

7. The coupling device according to claim 1, wherein the second coupling subject member is a boom of a crane device.

8. The coupling device according to claim 1, wherein the second coupling subject member is a prize acquiring device.

9. The coupling device according to claim 1, wherein the second coupling subject member is a drone, and at least two detachable members are provided for each drone.

10. The coupling device according to claim 9, further comprising a rope engagement member that connects the at least two detachable members,
wherein the third coupling member is a rope that is formed by twisting together a plurality of strands and that extends in a vertical direction,
the first coupling subject member includes an annular member configured such that a suspension subject is connected to a lower portion thereof and the detachable members can be attached to and detached from an upper portion thereof, and
the rope engagement member is engaged to the strands forming an outer shape of the rope.

11. The coupling device according to claim 10, wherein a rope fixing member is provided on a lower end portion of the rope, and
a subject fixing member that can be coupled to the rope fixing member is provided on a lower portion of the suspension subject.

12. The coupling device according to claim 10, comprising a capsule member that is attached to the upper side of the rope engagement member so as to be openable and closeable, and is formed to be capable of housing the rope engagement member and the detachable members when closed.

13. The coupling device according to claim 10, further comprising a tubular member that extends in the vertical direction and houses the first coupling subject member,
wherein the rope engagement member includes a guide rail, and
a screw portion formed to be screwable to the guide rail is formed in a side wall of the tubular member on at least one of an inner side and an outer side of the side wall.

14. The coupling device according to claim 1, wherein the connecting member includes a guide bar member, and the first coupling subject member includes a guide member for guiding the guide bar member.

15. The coupling device according to claim 1, wherein spacers are provided respectively between the connecting member and the first coupling member and between the connecting member and the second coupling member.

16. The coupling device according to claim 1, wherein the third coupling member is a telescopic mechanism.

17. A coupling method for coupling a coupling subject member using a coupling device comprising:
a detachable member that can be attached to and detached from a first coupling subject member;
a first coupling member provided on the detachable member;
a second coupling member provided on the detachable member;
a connecting member provided on the detachable member so as to connect the first coupling member to the second coupling member; and
a third coupling member connected to the detachable member and coupled to a second coupling subject member,
wherein the first coupling member and the second coupling member each include:
an elongated hole;
a contact portion provided on an outer peripheral lower portion of the first coupling member and the second coupling member such that one end portion is positioned on an upper side of another end portion; and
a hook-shaped portion provided on the one end portion of the contact portion so as to be connectable to the first coupling subject member,
the connecting member includes a fixing shaft that extends in a horizontal direction and is inserted into respective elongated holes in the first coupling member and the second coupling member, and
the first coupling member and the second coupling member are supported so as to be capable of rotating about the fixing shaft and moving relative to the fixing shaft,
the coupling method comprising:
a step in which, when the detachable member moves toward the lower side while the first coupling member and the second coupling member are not coupled to the first coupling subject member, respective contact portions of the first coupling member and the second coupling member are pressed by the first coupling subject member, whereby the first coupling member and the second coupling member rotate about the fixing shaft such that the one end portion of each of the contact portions moves toward the upper side, and move relative to the fixing shaft in a direction for reducing a distance from the contact portion of the first coupling member to the contact portion of the second coupling member;
a step in which, when the detachable member then moves further toward a lower side such that the first coupling subject member separates from the respective contact portions of the first coupling member and the second coupling member, the first coupling member and the second coupling member move relative to the fixing shaft in a direction for increasing the distance from the contact portion of the first coupling member to the contact portion of the second coupling member; and
a step in which, when the detachable member then moves toward the upper side, respective hook-shaped portions of the first coupling member and the second coupling member are connected to the first coupling subject member such that the detachable member is coupled to the first coupling subject member.

* * * * *